(12) United States Patent
Joskin

(10) Patent No.: US 7,570,305 B2
(45) Date of Patent: Aug. 4, 2009

(54) SAMPLING OF VIDEO DATA AND ANALYSES OF THE SAMPLED DATA TO DETERMINE VIDEO PROPERTIES

(75) Inventor: Yves R. Joskin, Esneux (BE)

(73) Assignee: Euresys S.A. (BE)

( * ) Notice: Subject to any disclaimer, the term of this patent is extended or adjusted under 35 U.S.C. 154(b) by 770 days.

(21) Appl. No.: 11/085,818

(22) Filed: Mar. 21, 2005

(65) Prior Publication Data
US 2005/0212970 A1    Sep. 29, 2005

Related U.S. Application Data

(60) Provisional application No. 60/556,840, filed on Mar. 26, 2004.

(51) Int. Cl.
*H03M 1/12* (2006.01)
*H04N 9/455* (2006.01)
*H04N 17/00* (2006.01)
*H04N 9/64* (2006.01)

(52) U.S. Cl. ............ 348/572; 348/525; 348/180; 348/714

(58) Field of Classification Search ........ 348/572, 348/525, 714, 716, 718, 180, 194, 184, 153, 348/159, 231.99, 262; 382/190, 224; 341/122, 341/155, 158, 159; 386/66, 83, 113
See application file for complete search history.

(56) References Cited

U.S. PATENT DOCUMENTS

| | | | | |
|---|---|---|---|---|
| 4,860,103 A | * | 8/1989 | Azam et al. | 348/572 |
| 4,974,058 A | * | 11/1990 | Takayama | 358/530 |
| 5,592,508 A | * | 1/1997 | Cooper | 375/216 |
| 5,784,120 A | * | 7/1998 | Cummins et al. | 348/537 |
| 6,297,851 B1 | * | 10/2001 | Taubman et al. | 348/572 |
| 6,768,385 B2 | * | 7/2004 | Smith | 331/1 A |
| 6,989,869 B2 | * | 1/2006 | Cooper et al. | 348/441 |
| 7,102,692 B1 | * | 9/2006 | Carlsgaard et al. | 348/572 |
| 2006/0087589 A1 | * | 4/2006 | Flannaghan et al. | 348/572 |
| 2006/0262834 A1 | * | 11/2006 | Reznik et al. | 375/148 |

OTHER PUBLICATIONS

"Fusion Media Decoders Product Brief." Downloaded May 19, 2005. *Conexant Systems, Inc.*, Newport Beach, CA. Company website www.conexant.com Available online at: http://www.conexant.com/servlets/DownloadServlet/101600a.pdf?FileId=759.

"SAA7113H: 9-bit video input processor Data Sheet." Jul. 1, 1999. *Philips Semiconductors*, Sunnyvale, CA. Company website www.semiconductors.philips.com.

* cited by examiner

*Primary Examiner*—Victor R Kostak
(74) *Attorney, Agent, or Firm*—Dov Rosenfeld; Inventek

(57) ABSTRACT

A method, an apparatus, and a carrier medium carrying code to implement the method. The method includes accepting blindly video samples of at least one video signal representing lines of video. At least one of the video signals includes horizontal synchronization pulses at a sync tip level. The video samples are formed by blindly sampling the least one video signal in a manner unsynchronized with the video signal or any synchronization signal related to the video signal. The method further includes storing the accepted video samples in a memory that store at least one video line of samples, and analyzing sets of the accepted video samples that include at least one video line to determine video characteristics of the video signal.

72 Claims, 53 Drawing Sheets

| 15 14 13 | 12 | 11 10 | 9 | 8 7 6 5 | 4 3 2 1 0 |
|---|---|---|---|---|---|
| Wake-up Codes | Fail Bit | Fail Codes | Pass Bit | Pass Codes | Transition Codes |
| Wake-up Mask | Fail Mask | | | Pass Mask | |

FIG. 15

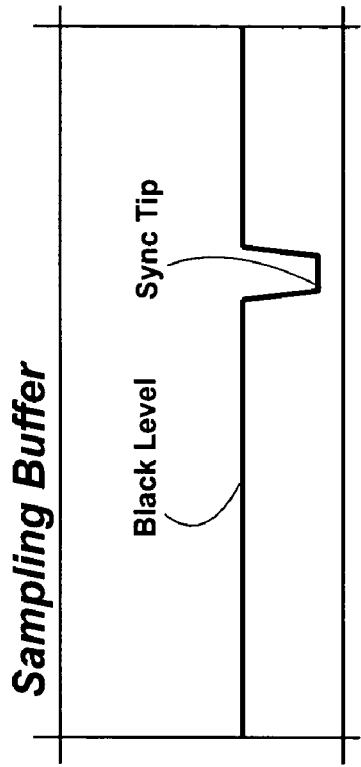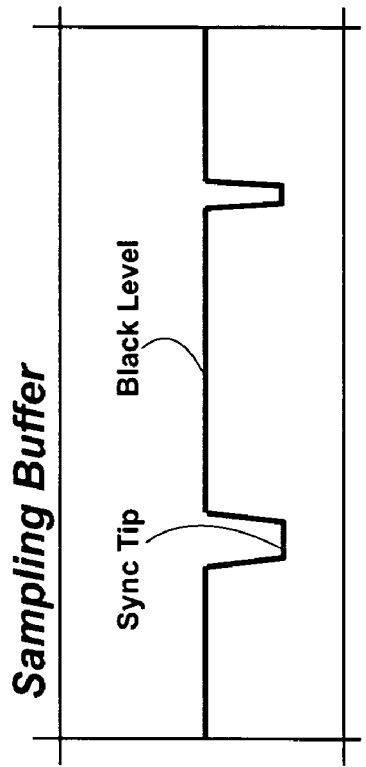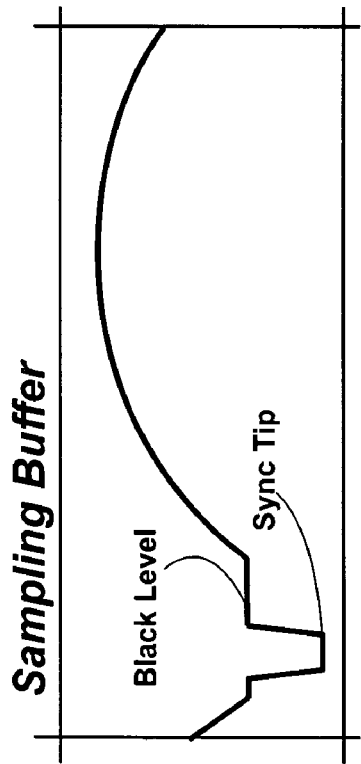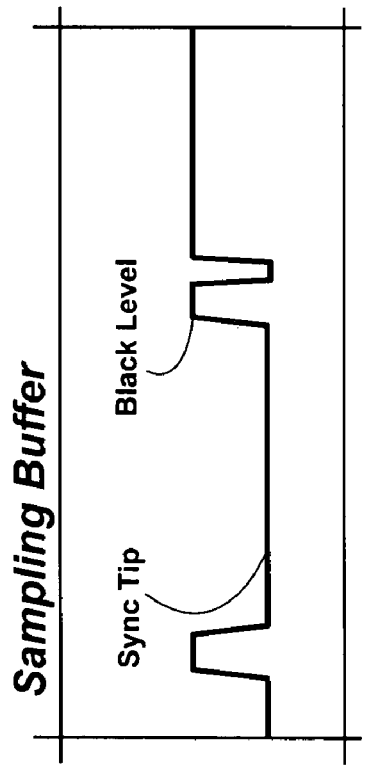
FIG. 17A
FIG. 17B
FIG. 17C
FIG. 17D

Size = 1
Index Range = [0]
Size = 2
Index Range = [0:1]
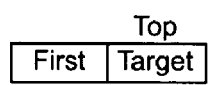
Size = 4
Index Range = [0:3]
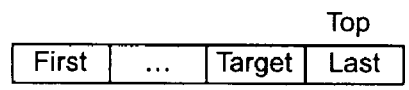
Size = 8
Index Range = [0:3]
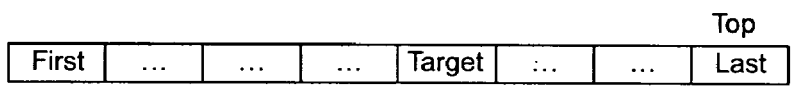
FIG. 46

Build vertical index tables for decoding
    Skip if control not in correspondance with lastly requested standard
    Local index corresponding to vertical coordinate in resampled image
    Local index corresponding to conventional numbering
    Case of interlace
        Count of lines per conventional field, zero-based
        Instantiate tables, zero-based
        Initialize to a null index
        Even field is up if blanking figure is odd
        Top conventional line number
        Update even and odd field coordinates
            Initialize top conventional line number for even field
            Update even field coordinates
            Initialize top conventional line number for odd field
            Update odd field coordinates
            Initialize top conventional line number for odd field
            Update odd field coordinates
            Initialize top conventional line number for even field
            Update even field coordinates
    Case of progressive
        Count of lines per frame, zero-based
        Instantiate tables, zero-based
        Initialize to a null index
        Top conventional line number
        Update coordinates
            Update even field coordinates
            Update odd field coordinates

FIG. 53

SAMPLING OF VIDEO DATA AND ANALYSES OF THE SAMPLED DATA TO DETERMINE VIDEO PROPERTIES

RELATED PATENT APPLICATIONS

The present inventions claims benefit of priority of U.S. Provisional Patent Application Ser. No. 60/556,840 filed Mar. 26, 2004, to inventor Joskin, titled VIDEO FRAME GRABBER APPARATUS AND METHOD, and filed with Attorney/Agent Ref. No. EUR102-P. Such U.S. Provisional Patent Application Ser. No. 60/556,840 is incorporated herein by reference.

BACKGROUND

The present invention relates to video signal capture and video frame grabbers, and in particular to capturing one or more video signals by direct "blind" sampling, e.g., using an analog to digital converter (ADC, A/D converter). "Blindly" means that the structural information contained in the video signal, such as synchronization information, luminance information, color information, DC level (called the black level herein, and also commonly the blanking level), and so forth, is not considered during the sampling process. Thus, the sampling is at a rate that is unsynchronized with the video signal or with any synchronization signal related to the video signal.

FIG. 1A shows a typical prior art frame grabber aimed at industrial vision applications. One feature of frame grabbers for industrial vision is that they can handle video signals that do not conform to any particular video standard, e.g., that do not contain video frames that have a particular number of video lines and video signals that otherwise conform to some standard. A frame, for example, may consist of only a single video line. Another important feature is that the devices provide for asynchronous capture, e.g., for grabbing a frame at any time. This is a feature useful in machine vision where the image of a moving object is desired. The capture of such an image may then be triggered asynchronously at the time some detector provides a trigger that the object is in the field of view of a video camera.

As a result of these requirements, a typical industrial frame grabber, such as shown in FIG. 1A, includes many components designed to handle the asynchronous nature of the signal, and also to handle the non-standard sizes of video images for capture by the grabber.

Much of the signal processing of the frame grabber is carried out by special purpose hardware. The analog video signal, prior to digitization by an analog-to-digital converter (A/D converter, ADC) is conditioned by a common mode noise rejection circuit, e.g., an op-amp, and by an anti-alias (low-pass) filter matched to the sampling frequency of the ADC. Often, the DC level is restored (a process called clamping), and gain and offset adjustments are applied prior to digitization. The digitization occurs according to the synchronization information either in the video signal itself, or, in some cases, provided as a separate synchronization signal. In particular, horizontal synchronization is detected, either from the signal itself, as with composite signals, or from a separate digital synchronization signal. Similarly, vertical synchronization is detected from the signal. The digitization of the signal is tied in to the desired synchronization.

An analog phase lock loop (PLL) circuit is typically included to keep track of the video rate.

Because of the non-standard nature of the video signal, and because of the need to provide asynchronous reset, there are few if any standard components available to perform all the functions described above, even though such combinations of functions may be common for more standard video signals. PLL circuits are known for their delicate, even chaotic behavior, and in industrial frame grabbers, excellent performance is typically required of such circuits. As a result, typical industrial frame grabbers are relatively expensive.

Thus, there is a need for a frame grabber and a method of processing video signals in such a frame grabber that has a relatively low part count, and that does not necessarily need accurate analog PLL circuits to achieve a relatively high level of performance.

FIG. 1B shows a typical prior art frame grabber aimed at video surveillance using, for example, a plurality of standard (low-cost) video cameras. Such frame grabbers typically process standard composite video signals, e.g., PAL or NTSC signals that are of standard size and characteristics. There therefore are many standard components made and mass produced for processing such signals, e.g., for decoding, including carrying out the horizontal and vertical synchronization and otherwise decoding the content of composite video signals. Conexant Systems, Inc., of Red Bank, N.J. and Newport Beach, Calif., for example, make a line of video decoders that accept standard video and convert the standard video to digital information, including decoding the synchronization video information. See for example, the Conexant Bt878A product, which is a single-chip solution for analog standard signal capture onto a PCI bus designed to be interoperable with any other PCI multimedia devices at the component or board level.

Typical prior art systems for handling such standard systems, if digital, include digital circuits that perform similar functions to those performed by older analog circuits. For example, if clamping is not included at the analog side of the ADC, digital clamping is carried out following digitization. Furthermore, these circuits typically decode in real time, and so, if there is a decoding error, they typically lose their place in the video field or frame, and need to wait for the next vertical blanking interval before they can successfully start decoding.

One of the requirements of video surveillance is the ability to rapidly switch between a plurality of video sources. FIG. 1B shows a fast switching selector that selects one of the cameras' respective output signals for processing. When switching from one source to the next occurs, the prior art decoder, whether digital or analog, may need up to 10 ms or even 20 ms to regain synchronization, and this is in the order of a video field to a frame, so such a switching time effectively reduces the frame rate from each camera, e.g., by a factor of two.

Indeed, digital prior art decoders typically require several fields to regain synchronization, i.e., of line, field, and parity). For example, above-mentioned Conexant's BT878, takes 8 fields to recover without further synchronization information, i.e. 160 ms in PAL.

Thus there is a need for a frame grabber that can accept a plurality of video signals and switch between them relatively fast, preferably close to instantaneously such that no frames are lost. In particular, there is a need for a frame grabber that can recover synchronization relatively fast without having to wait for the next vertical blanking interval.

There further is a need in the art for a design that is applicable to both video surveillance application with a plurality of cameras such that there is virtually instantaneous switching, and to industrial vision applications that can accommodate video signals that do not conform to any standard, and that can accommodate a variety of synchronization and asynchronous reset methods.

Many prior art decoders are known that digitize video to form raw digitized data, then process the digitized data along a processing chain. Once processed, the raw data is no longer available. These prior art systems digitize data and essentially process the data in real time on the fly in an analogous manner to what an analog decoding process would do. There may be some buffering to handle processing delays, and, e.g., if there is transfer from the decoding to another device such as a computer on another bus, to deal with any latencies. With such systems, should one desire several different decoded digital signals, e.g., at different resolutions, based on the same raw data, a plurality of decoders would need to be used.

There is a need in the art for a video decoder that maintains raw digitized data even after the data is decoded, such that several final images, each possibly different than the other, may be built from the raw data using the decoded information.

Furthermore, because many prior art systems perform clamping early in the processing chain, such systems have difficulty dealing with an input signal that includes the signals from several video sources, multiplexed in time, with each source having a different black level, also called blanking level. A typical blanking circuit has a certain time constant such that when there is a switch in the black level, there may be some time before the proper DC level is restored. This delay in turn may cause loss of synchronization. Similarly, such signals have variation in the sync tip level. Such synchronization signal amplitude variations from source to source are as important as the DC black level variations. For example, in many prior art decoders, including in the above-mentioned Conexant BT878, the synchronization amplitude is used as an indication of the effective video signal amplitude, and the automatic gain control (AGC) is based on it. The time constant involved in recovering the sync amplitude, and subsequent AGC, affects the switching time just as DC clamping time constant do. Thus, there also is a need to determine the sync tip level line-to-line.

Industrial cameras are known that provide what is called a pixel clock. This is a digital signal synchronized with the instants of time when each pixel is generated by the sensor inside the camera. It would be advantageous to be able to provide sufficient horizontal accuracy without necessarily using a pixel clock.

SUMMARY

One aspect of the invention includes direct and blind sampling an analog video signal at a known and stable frequency. "Blind sampling" means that the structural information contained in the video signal, such as synchronization, luminance, color, and so forth, is not considered during the sampling process. Thus, the sampling is in a manner that is unsynchronized with the video signal or any synchronization signal related to the video signal. The sampling frequency is chosen high enough to adequately match the spectral contents of the signal.

The samples from the sampling are stored in a front-end memory that stores at least one line of video information. An analysis process analyzes sets of samples from the front end memory, each set including at least one video line's samples. The analysis determines properties of the video line, including the horizontal position of the line. The analysis is at a rate that can keep up with the rate of storing the samples of the (at least one) video line in the memory, such that the method can decode video in real time.

A resampling process generates video information from the samples in the front-end memory at a desired resampling frequency that may be different from the direct sampling frequency.

Using aspects of the present invention achieves a remarkable level of performance in terms of jitter and of stability. One aspect of the present invention is that there are no analog PLL (Phase Locked Loop) circuits involved. Such circuits are known for their delicate, even chaotic behavior.

Using aspects of the present invention provides excellent accuracy and reproducible performance for measurement and recovery of video levels, both in term of DC level (also called DC offset) and amplitude (e.g., gain).

Some video signals, e.g., those generated by playing back magnetic tape video recorders, e.g., VCRs, have poor timing stability. One aspect of the invention includes compensate for such instability through a line-by-line adaptation of the resampling frequency and phase.

Another aspect of the invention is applying filtering of the horizontal phase of the video signal to reduce jitter in the frequency and phase to generate a relatively accurate pixel clock after resampling. video signals.

Embodiments of the invention are applicable to monochrome and composite color

Thus, one application of the present invention is a range of frame grabbers whose main purpose is to act as an analog frame grabber for analog monochrome or RGB signals. Another application of the present description is decoding composite video signals. While much of the description deals with composite monochrome video, extension to composite color signals, e.g., PAL or NTSC, is straightforward from the description provided herein.

One application for such decoding of composite signals is that of a video-surveillance frame grabber. One feature that aspects of the present invention provide for such an application is the capability to handle a video signal that includes several time-multiplexed video signals from separate sources, and to "switch" from one video source to another one without any substantial delay, even when the different sources have different black (blanking) levels. There presently exists no known solution to realize this other than to have a separate decoder for each video source.

Other aspects, advantages, and applications will be clear from this document, the drawings, and the claims.

One aspect of the invention is a method to recover synchronization information from an analog video signal by blindly sampling the video signal and analyzing the samples by an analysis that may be embodied as a computer program, as programmable logic, as a DSP, and so forth.

One aspect of the invention is a decoder and a decoding method that can deal with a variety of kinds of video signals, e.g., a composite signal, a signal with one or ore separate synchronization signals, a signal to be digitized with asynchronous reset, a signal that contains a multiplexed sequence of different video signals with possibly different black levels, a set of parallel video signals each from a different video source, and so forth, with the same decoder and decoding method able to handle and properly decode all such signals.

One aspect of the invention is a decoder and a decoding method for dealing with a signal that includes a multiplexed sequence of different video signals, properly decoding each video signal in the multiplexed stream, with a negligible switching delay such that the frame rate per video signal is not degraded.

One aspect of the invention is providing an ability to recover video lines of any duration (potentially variable) from a given frame of data, the recovering being with high accuracy without using a pixel clock.

Another aspect is a system that provides some or all of the above capabilities that is economical to construct, e.g., using a relatively small number of electronic components.

Another aspect of the invention is provides some or all of the above capabilities in the case that the input video data is not clamped prior to digitizing, such that unclamped digitized video data is available for decoding.

Yet another aspect of the invention is the maintaining of a buffer containing a plurality of lines of the digitized raw data while extracting video information from the stored digitized raw data without modifying the data itself, such that the extracted video information can be used with the raw data to form any one, or more than one video image from the raw data without destroying such raw data.

Another aspect of the invention is a level analysis process carried out on the unclamped digitized video data to determine the black level and the horizontal synchronization pulse level (the sync tip level) from such raw data, such that data with different black levels may be accommodated. Another aspect of the invention is the use of the determined black level and sync tip level to detect and determine the location in the digitized raw data of the horizontal synchronization pulse to achieve horizontal synchronization. Yet another aspect of the invention is the updating of the determined black level and sync tip level as more analysis is carried out on the raw digitized data.

Yet another aspect of the invention is the searching of vertical synchronization information using the raw data obtained from blindly digitizing one or more video signals. Once vertical synchronization is achieved, another aspect of the invention is that the line number and corresponding position in the raw data of such video line number is available, such that the position of any line both horizontally and vertically is known for the raw data. Once this state is achieved, another aspect of the invention is that the raw data may be reconstructed at any resolution, even sub-sample resolution. Several such reconstruction processes may be carried out on the same raw data to achieve a plurality of reconstructed video images with different sizes and resolutions.

Because the raw data is maintained during the analysis process, another aspect of the invention is the improving of the determined black level and sync tip levels, and the improving of the location of these levels using both past and future values, e.g., using filters that are symmetric around a point in time. Because a typical prior art system processes the data in the fly, any processes need to be strictly causal in that "future" values cannot be used to update a current value of any quantity.

Another aspect of the invention is the adaptation to lines of different length, as may occur, for example, with an unstable signal such as that provided by a video tape recorder (a VCR).

Another aspect of the invention is rapid recovery, even in the middle of an image frame or field. If the horizontal positioning of any line is lost, one aspect of the invention can recover the horizontal positioning in as few as one, more typically two, or perhaps three additional lines, assuming that there is indeed horizontal synchronization information in the raw data.

Another aspect of the invention is once the raw data has been analyzed such that not only horizontal, but also vertical positioning of each line has been extracted and is known about the raw data, the inventive line analyzer keeps track of the current line number and field parity. If, for example, the input data is switched at some point from a first video source to another video source, when the data is switched back to the first video source, such switching can occur at the same vertical point for the first video source, such that there is no need to wait until the start of new field to re-synchronize that first video source, as is necessary in many prior art decoders. This aspect, when included, provides virtually instantaneous switching from one source to another to achieve a high frame rate per video source in a signal that includes a set of multiplexed video signals. Furthermore, in the case of asynchronous reset to capture a single frame, such a reset may occur anywhere in a frame. There is no need to wait for a vertical banking region.

Yet another aspect of the invention provides sufficient horizontal accuracy in the decoding without necessarily using a pixel clock. A camera without a pixel clock is typically less expensive. Furthermore, there usually are problems associated with distributing a pixel clock, including cross talk and the need for expensive cables.

Yet another aspect of the invention is how separate synchronization signals are dealt with. Typical industrial cameras may provide a horizontal and/or vertical timing reference using one or more separate electrical wires. Such a horizontal and/or vertical timing reference is then provided as a train of logic pulses on the separate line.

One aspect of the invention includes treating each such a horizontal and/or vertical timing signal as "just another" analog video signal that is digitized. The inventive method and apparatus extracts the edge locations of the pulses, using the very same method as the one described herein, from composite analog video signals. Such decoding is provided "free" since the apparatus and method described herein already provides this capability for video lines that include such synchronization information.

When such an additional synchronization signal is included, the apparatus includes an additional A/D converter for each such signal to be analyzed using the methods described herein. Because such horizontal and/or vertical timing logic signals may exhibits steep edges not compatible with the direct sampling frequency, an appropriate anti-aliasing low-pass filter (in general, an analog signal conditioning filter) is included for each such line before the separate ADC.

BRIEF DESCRIPTION OF THE DRAWINGS

FIG. 15 shows the assignment of bits in an exemplary state register that describes the state of line analysis, according to an embodiment of the invention.

FIGS. 17A-17D show four examples that illustrate possibilities of what may be contained in a sampling buffer line record, according to an aspect of the invention.

FIGS. 23A and 23B show in simplified form a video line in the vertical banking region with and without an equalization pulse, respectively, while

FIG. 46 defines the meaning of the central record of the LIFO for various even LIFO sizes in some embodiments of the invention.

FIG. 53 shows the pseudocode for a computer program to build vertical indexing tables to help generate a complete image, according to an aspect of the invention.

DETAILED DESCRIPTION OF THE EMBODIMENTS

Glossary

Figure 1A:
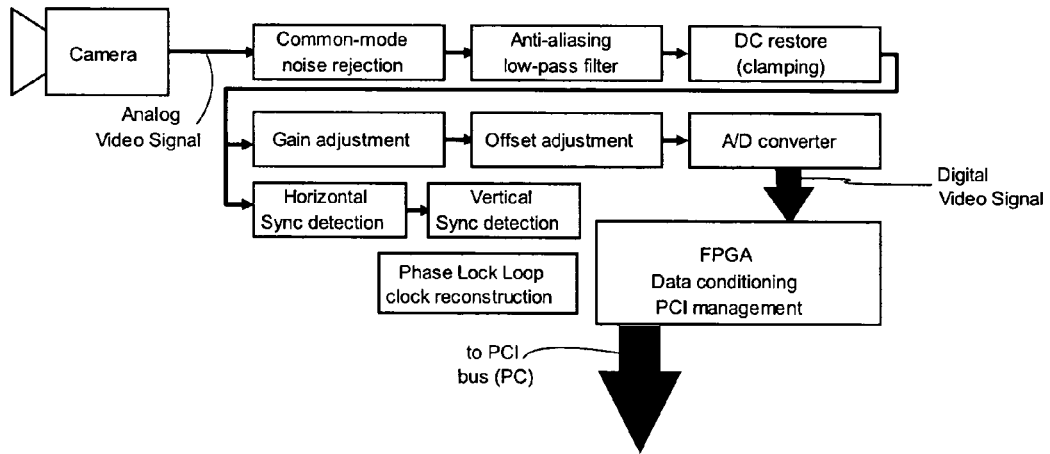
FIG. 1A shows a typical prior art frame grabber aimed at industrial vision applications.
Figure 1B:
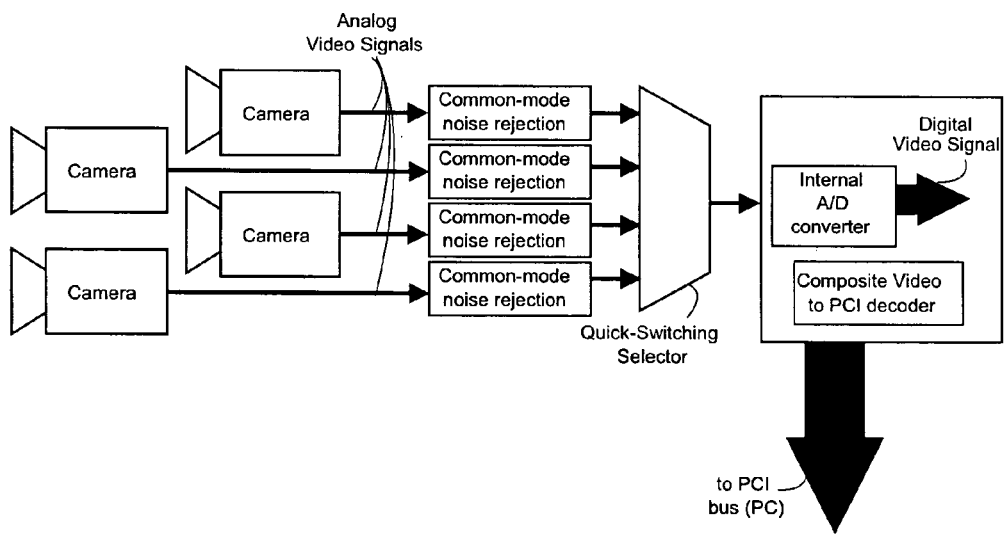
FIG. 1B shows a typical prior art frame grabber aimed at video surveillance using, for example, a plurality of standard (low-cost) video cameras.
Figure 2:
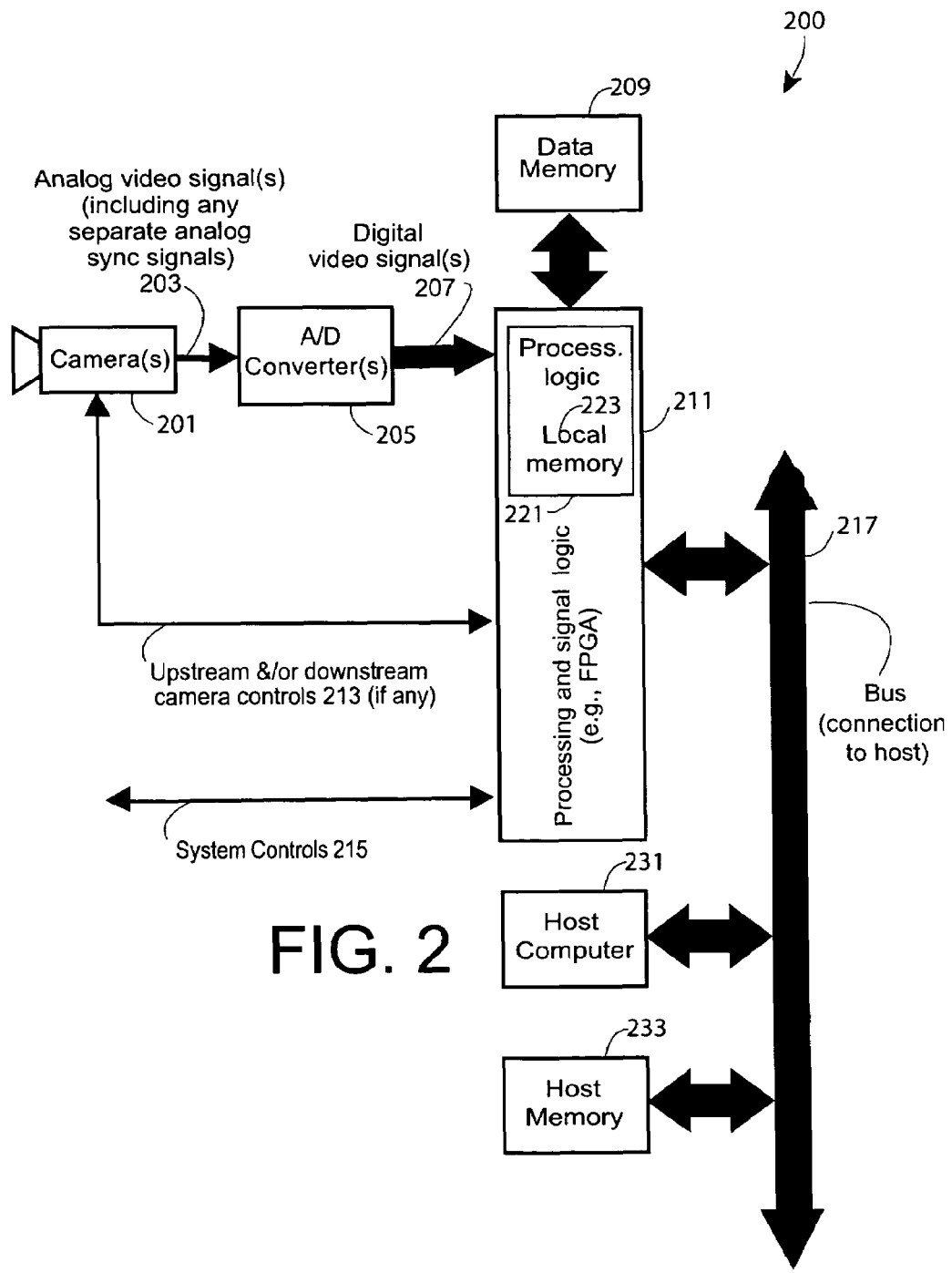
FIG. 2 shows the general architecture of several embodiments of the invention.

ALA Absolute Line Address in sampling buffer
ASL Analog Sampling Levels of sampling process
ASN Analog Sampling Number of bits of sampling process
ASR Analog Sampling Rate of blind sampling
ASS Analog Sampling Span (range) for digitizing
BLK Black level (measured)
BLK_F Black level (filtered)
BLK_Q Black level (quantized)
CPN Coarse Period Number of bits of subsampling
CPS Coarse Period Size of subsampling
CSL Coarse Sampling Levels (number of levels) for level analysis
CSN Coarse Sampling Number of bits for level analysis
CVN Convolution Number of steps for creating a sub-sampled value
DRL Digital Resampling Levels (luminance)
DRN Digital Resampling Number of bits (luminance)
DRP Digital Resampling Period (resampled pixel)
DRP_P Digital Resampling Period as pointing unit
DRP_R Digital Resampling Period relative to total line length
DRR Digital Resampling Rate
EFN Edge Filter Number of bits
EFS Edge Filter Size in pointing units
ELD Effective Line Duration (filtered noiseless) in pointing units
ELS Effective Leading Synchronization in pointing units
EMN Even line number Minimum (first active line in even field)
EMX Even line number Maximum (last active line in even field)
HPD_P Half synchronization Pulse Duration
KAS Kernel Attenuation Shift
KUV Kernel Unitary Value (weight of the kernel)
LAC Levels Averaging Coefficient
LCS Line Classification Status
LSE_P Leading Synchronization Edge
LVD Level Detection: measure value of right part of line
LVD_Q Level Detection Quantized: one of N/A, Out, Sync, Blank, Video
MGD Measuring Gate Duration for level measuring
MGP Measuring Gate Position for level measuring
MNS_R Minimum Synchronization amplitude relative to nominal sync level
MXS_R Maximum Synchronization relative to nominal sync level
NAS Next Analysis State after state transition
OMN Odd line number Minimum (first active line in odd field)
OMX Odd line number Maximum (last active line in odd field)
PAS Previous Analysis State before state transition
RAS_P Resampled Active Start: position of 1st pixel in current sampling buffer
RHA Resampled Horizontal All: number of resampled pixels in video line
RHD Resampled Horizontal Display: no. of resampled pixels in resampled line
RHL Resampled Horizontal Leading: sync edge to start of active line
RHL_R Resampled Horizontal Leading: relative to total line size
RHT Resampled Horizontal Trailing: end of active line to sync edge
RVA Resampled Vertical All: lines in video signal
RVD Resampled Vertical All: lines in resampled image
RVL Resampled Vertical Leading: vertical sync to the resampled image start
RVTL Resampled Vertical Trailing: resampled image end to vertical sync
SAN Scanning Accuracy Number of bits
SBP Standard Burst Pulse in seconds
SBS Standard Black Setup: Nominal black level ampl. above the black level
SHP Shape of the interpolation filter
SPD_P Synchronization Pulse Duration in pointing units
SPN Scanning pointer in bits
SSA Standard (nominal) Synchronization Amplitude
SSB Standard Sync to Burst (location of color burst)
SSN Sub Sampling Number of steps
SSS Sub-Sampling Steps
STR State Transition when leaving line analysis
SVA Standard Video Amplitude (of luminance)
SVN Sampled Video addressing Number of bits
SVS Sampled Video Size of sampling buffer in samples
TAC Timing Averaging Coefficient in lines of smoothing phase
TIP Tip of synchronization (measured)
TIP_Q Tip of synchronization (one of N/A, Out, Sync, Blank, Video)
TLD_P Total Line Duration in pointing units
TSE_P Trailing Synchronization Edge in buffer in pointing units
URG User Required Gain (a ratio)
URO User Required Offset (a ratio)
VCC Valid Coarse Count (as number of samples)
WUS Wake-Up Style for line analysis General Architecture FIG. 2 shows the general architecture 200 of several embodiments of the invention. At least one video camera 201 or other source of analog video signals provides a set of at least one video signals 203, and a corresponding set of analog-to-digital converters (ADCs) 205 to digitize the video signal(s) 203 in a blind manner, i.e., not synchronized with any synchronization signal in or related to the synchronization of the video signal(s), and similarly not related to any other video information in the signal, such as the DC level.

At least one of the "video signals" 203 in FIG. 2 is an actual video signal that includes video information, and, as described above, in some cases, one of the video signals 203 may actually be a synchronization signal that is being treated as a video signal.

The ADCs 205 are matched to the characteristics of the video signal(s), e.g., are sampled at a high enough sampling rate, and in the case of sampling of digital logic signals, might include an appropriate pre-conditioning filter.

In one embodiment, the analog signal is blindly sampled at a constant and stable frequency over a voltage range covering the entire range of the analog signal. One aspect of the invention is that the signals are not corrected for different black (blanking, DC) levels to allow for several time-multiplexed signals with different black levels to be analyzed.

The digitized data 207 are immediately recorded into a data memory subsystem 209 deep enough to contain at least one, and typically several video lines. This memory 209 is called the front-end memory herein, and serves as an elastic buffer—a first-in-first-out (FIFO) buffer for all the subsequent processes. Such processes are introduced below, and described in more detail in this description. There is one FIFO set up for each video source.

One aspect of the invention is that the raw data is analyzed for information related to the video structure in the data without the data itself being modified in the FIFO. Once the video information about the data is extracted, such video information is used in a resampling process that builds video data at a desired resolution from the raw data for each video source. The analysis is at a rate that can keep up with the rate of storing the samples of the (at least one) video line in the memory, such that a method or apparatus embodiment of the invention can decode video in real time.

In those embodiments that interface to a bus subsystem 217 for connection to a host computer 231 having host memory 233, the resampling process may lead to the transfer of the resampled data through the bus 217, e.g., a PCI bus, to the host computer memory 233. Note that some embodiments may include a separate bus interface subsystem. Note that PCI transfers may include unavoidable associated latencies, and the FIFOs are expected to accommodate such latencies.

The processes that occur for data in the front-end memory 209, including the processes to extract information related to the video properties, and including the resampling processes, are carried out by processing and signal logic 211 that includes processing logic 221 forming a decoder for the data in the front-end memory 209. In one embodiment, the processes provided by the processing part 221 of logic 211 include the line analysis that extracts the video properties, post-line-analysis temporal filtering to refine some of the extracted properties about the video content, resampling to generate the resampled image for output, and post-processing, e.g., to modify the dynamic range of the resampled video data. Each of these is described below.

Different embodiments may implement the processing and signal logic 211 differently. One embodiment implements the processing and signal logic 211 using at least one field programmable gate array (FPGA). Another embodiment uses one or other programmable processors such as a microcontroller or microprocessor, and associated logic devices, and yet another uses one or more DSP devices. Yet another uses custom integrated circuits. Note that these approaches are not mutually exclusive. Those in the art understand that these days, part of a FPGA can implement the logic of a microcontroller device, a microprocessor, or a DSP device.

Furthermore, different embodiments may implement the processing part 221 of logic 211 differently. One embodiment implements the processing logic 221 using a microcontroller as part of at least one field programmable gate array, together with custom logic implemented in that FPGA. A local memory 223 is included for storing the program of the microcontroller, and for storing data structures used for the processing. Another uses one or more DSP devices, and yet another uses one or more other programmable processors such as a microprocessor or microcontroller. Yet another uses custom logic.

In one embodiment, processing and signal logic 211 includes signal logic that switches or routes signals as required, and further, that provides signal controls.

In some embodiments, there may be one or more camera control signals 213, including upstream camera controls and/or downstream camera controls. By upstream camera controls are meant control signals sent to the camera. Included are external camera synchronization control signals to set the horizontal and or vertical synchronization signals to provide for synchronizing a plurality of cameras. Also included in this category are asynchronous reset signals, exposure control, and so forth. By downstream camera controls are meant those control signals generated by the camera. Included are separate synchronization signals such as separate horizontal and or vertical synchronization signals. Also included in this category are any pixel clock signal and other signals provided by the camera to indicate information about the video signal.

Note that some of the block diagrams show separate synchronization signals coming from the camera, others include such separate camera-generated synchronization signals as one of the video signals, since, in one aspect of the invention, such separate synchronization signals are digitized as if they were video signals, while yet others assume that such separate synchronization signals are included in the downstream camera control signals Those in the art will understand which case holds from the context and description herein.

In some embodiments, there also may be one or more system control signals 215. By system control signals are meant those control signals to or from the system with which the frame grabber is being used, and that, in the case of input control signals, provide signals as to when to trigger or how to synchronize the frame grabbing with one or more aspects of the external system, and in the case of output control signals, provide indications to the external system of when events occur in the frame grabber and/or camera.

Such provision of system control signals and of upstream and/or downstream camera control signals is common in frame grabbers, e.g., high-end industrial control frame grabbers.

Figure 3:
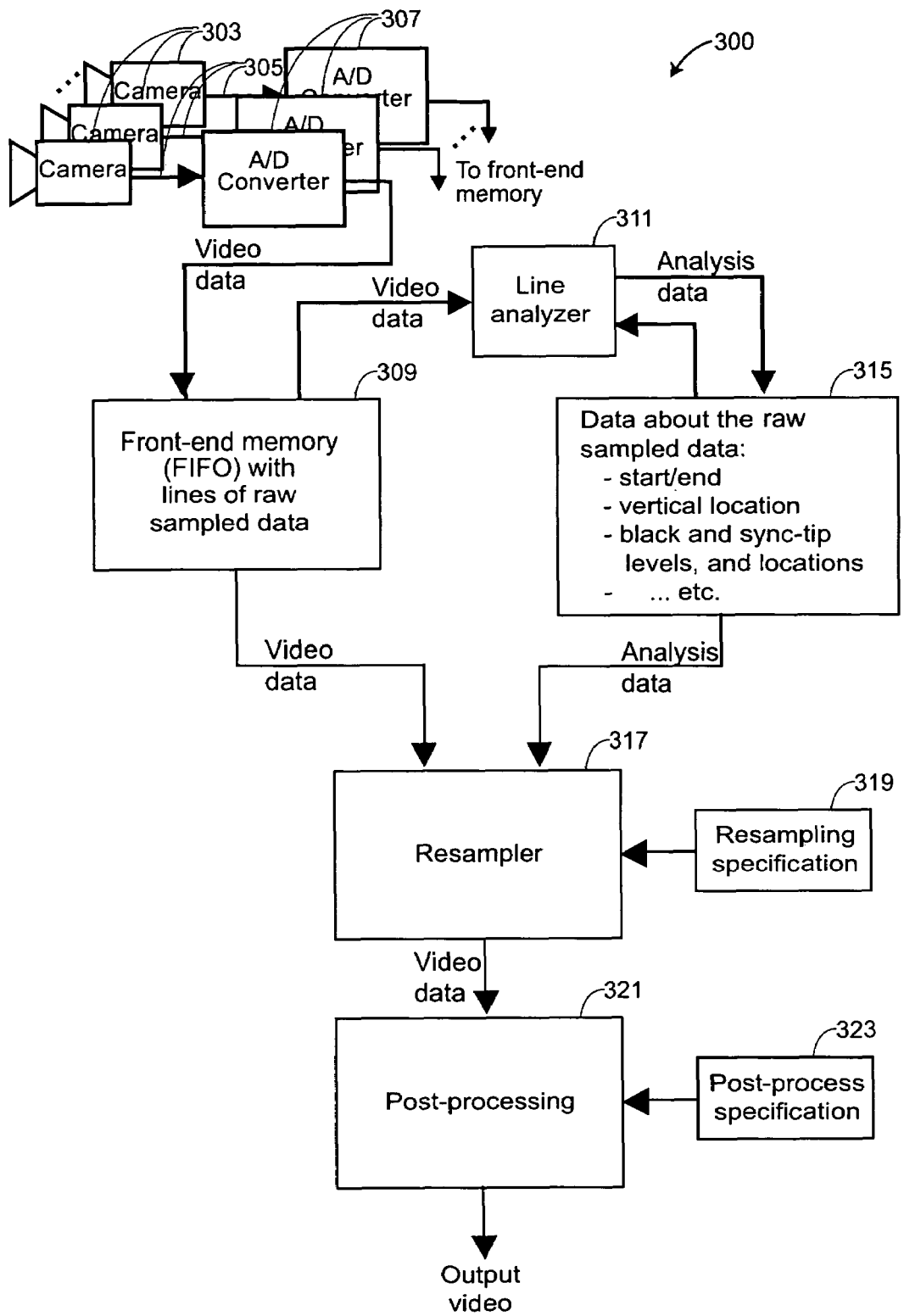
FIG. 3 shows a more detailed functional block diagram that describes the embodiments. Three video sources are shown.

FIG. 3 shows a functional block diagram of a system 300 that describes embodiments of the present invention. At least one source of video—several sources in the form of several video cameras 303 are shown—provide a set of one or more video signals 305. For the purposes of FIG. 3, each camera produces video and in some cases also separate horizontal and/or vertical synchronization signals, in the form of digital pulses or otherwise. The video signals 305 are blindly digitized by the respective ADCs 307 and input into a front-end memory 309, in the form of a FIFO buffer for each video source. Each FIFO 309 can hold a few video lines: a number high enough such that if there is a problem, e.g., synchronization is lost, the next line is still available. Furthermore, the number of lines is sufficient to deal with any latencies and/or asynchronicities at the output stage, e.g., at the transfer via an external bus such as a PCI bus.

In prior art systems, the video data is clamped, i.e., the DC level is restored, either on the analog signal prior to digitization, or as an early step in the digital processing. One aspect of the invention is that the DC level is not separately restored. This provides for having a video source made up from the video of several cameras multiplexed in time. Each of these cameras may have a different black level, and further, the switching between cameras may cause a clamping circuit to have intolerable transients. An aspect of the invention provides simple AC coupling of the input, and digitizes the input to a full range. Later analysis of the level of the video determines such different black levels, and further the level of the horizontal synchronization pulses (the sync tip).

Another feature of the invention is that data is maintained in its raw form while a line analyzer 311 determines characteristics 315 of the video signal, such as the demarcation of the lines, the black level and the sync tip level for each line, the location of the start of the line and of the synchronization pulse, the vertical location of each such line, whether or not the line is in the vertical banking region, and so forth. While such information 315 is gathered about the lines, the data remains in its original form in the front-end memory 309. Only when there is enough information about the horizontal and vertical positions of the lines, and where in the front-end memory 309 each such line is stored, does the data itself get processed by a resampler 317 implementing a resampling process that creates new video data in the form of video lines at any desired resolution, as specified by a set of resampling specifications 319.

Another aspect of the invention is that the resampled data's dynamic range may be modified from the raw form resampled by a postprocessor 321 to achieve a variety of desired specifications, such as the equivalent of automatic gain control, correct video levels, and so forth. The postprocessing is according to post-process specifications 323.

Because the raw data remains in the front-end memory 309, and only information 315 about the lines is determined by the line analyzer 311, several resampling processes may be carried out on the same data. Thus, for example, several images may be reconstructed at different resolutions. The resampling process itself may include different functions in addition to resampling, such as filtering out color subcarrier information, processing color information, generating different types of synchronization pulses, zooming, and so forth.

Another feature of the invention is that the resampling resolution may be specified finer than the original sampling resolution of the sampled data in the front-end memory.

Yet another feature of the invention is the line analyzer 311 and its capabilities. In one embodiment the line analyzer is able to determine the black (blanking) level and the sync tip level of the video signal, then use these determined values in a horizontal synchronization process that determines the horizontal location of the synchronization pulse in as few as one or two lines of data. Another aspect is that the black level and sync tip level are refined as more data is processed and as horizontal synchronization is achieved. Once horizontal synchronization is determined, the line analyzer 311 enters a set of states wherein the analyzer waits for a vertical indicator such as a vertical blanking time or a vertical synchronization pulse that allows the line analyzer 311 to determine vertical timing. Once the vertical timing is determined, the analyzer 311 becomes frame locked with the data in the front-end memory 309 in that the data about the raw sampled video is sufficient for resampling, e.g., sufficient to know each lines vertical position, parity of the field in the case of interlaced video, and where in the front-end memory 309 each line starts and stops.

Another aspect of the invention is rapid recovery. For example, the line analyzer continually checks the integrity of each line for the presence of a horizontal sync pulse at the correct location. If for any reason, horizontal synchronization is lost, it typically takes the line analyzer only a line or two to re-determine the horizontal phase. If the line analyzer is already in a frame locked position, as few as only one or two resampled lines may be lost. In a conventional video decoder—even a digital decoder—the decoder typically needs to wait at least for the next vertical period—typically even longer—before it can start successfully decoding the data after loss of horizontal synchronization.

Another feature of embodiments of the present invention is the ability to handle a video signal that includes a time-multiplexed set of video signals from a plurality of sources, e.g., from a plurality of cameras. Once each camera's signal achieves frame lock, i.e., the line analyzer knows the vertical position of each line, switching between cameras can be virtually instantaneous in terms of the resampled output. Since the line analyzer knows in which vertical line switching occurs, it can, for example, generate the switching signals for an analog multiplexer at the input to switch between cameras in an exact number of frames, and, when the line analyzer returns to the same camera, it can restart the line analysis from the proper line number, albeit not in the same field or frame as the previous line analyzed for that camera. In the prior art, when switching occurs, the decoder typically needs to wait until the next vertical period to lock onto the next camera's video signal. This reduces the effective frame rate per camera.

Each of the processes of the system 300 of FIG. 3 is now elaborated on.

Line Analysis of Line Analyzer 311

Data elements in the front-end memory 309 are examined and processed as successive packets of samples. Initially, the samples are analyzed to determine levels that are important for video content, in particular, the black level and the sync tip level of the horizontal synchronization pulse. These form first estimates of the black and sync tip levels. Because the input data is digitized without first removing any DC variations, the level analysis can accommodate different black levels in the same data, as might occur, e.g., with a time-multiplexed data from a set of different sources.

These first estimates of the black and sync tip levels are used to determine the location of the horizontal synchronization. After an initial set of packets is examined, the system becomes "line-locked." In line locked mode, each packet includes a complete individual video line. The packets—the lines of video data—are subjected to processes, each specialized in a particular task or set of tasks, including extracting one or more information elements that characterize the video line.

This processing of such packets, i.e., of lines of data is called "line analysis" herein, the process for performing line analysis is called the line analysis process, and a realization of the process is called the line analyzer implemented by the processing logic 221. One aspect of line analysis is ensuring that the decoder maintains synchronization for the analog signal 203.

In one embodiment, the line analysis includes the following processes:

Reducing the amount of incoming information by sub-sampling (called the Sub-sampling process).

Searching for initial values of important levels: the black level and sync tip level. Such searching is called the level analysis process. In one version, the level analysis is carried out on the sub-sampled data to reduce computation time.

Searching for horizontal timing information (called the HorizontalSync process). In one version, the HorizontalSync process is carried out on the sub-sampled data to reduce computation time.

Once the data is line locked, another process waits for and searches for vertical timing information (the VerticalSync process). Eventually, this leads to the vertical positions being known. After that, the data is in a fully frame locked state. When in the fully frame-locked state, the raw data may be resampled using the information determined about the raw data, and desired resampling parameters.

Maintaining the synchronized status (called the Maintain-Lock process).

The end and the state-of-completion of each line analysis process controls the sequence of what next line analysis process occurs. One embodiment of the line analyzer follows a state transition diagram defining this time sequence of events. In one embodiment, this state transition diagram defining this time sequence of events is implemented by a microcontroller that is part of the processing logic 221 (FIG. 2). In an alternate embodiment, the state transition diagram defining this time sequence of events is implemented by a logical state machine, e.g., from logic elements as part of an FPGA that includes the processing logic 221.

In this description, the Section titled "Line Analysis" describes the state transition diagram and provides details of the tasks performed in each state. Some of the specific processes are subsequently described in more detail in separate sections.

Line analysis builds information characterizing successive video lines. By a "line record" is meant the set of items of information about a line that is generated by a line process. In one embodiment, a data structure called the "line analysis data structure" includes all the line records for a single video source. In one embodiment, a line record may be written to every time an analysis process is performed, and then is appended to the line analysis data structure of line records of previously analyzed lines. Typically, once the line analysis process recognizes a proper horizontal synchronization pulse, there is one line record per line. Initially, when there is a miss in the process of detecting the first horizontal pulse, including performing level analysis to determine initial values for the black level and sync tip level, the data in the sampling buffer may not yet be analyzed as a proper line. For example, depending on the failure condition, the analyzer may use the line record of the previous "line" on the contents of the next sampling buffer. Once the line analyzer is horizontally locked, i.e., has found the horizontal location of the horizontal synchronization pulse, there is one line record per line.

Of course other embodiments may structure the items of information in many different ways. In one alternate embodiment, several line records may be used to characterize a single line, and a new line record may be written to every time an analysis process is performed on that one line, and then is appended to the line analysis data structure of line records of that line.

Referring to FIG. 2, in one embodiment, the line analysis data structure is kept in the local memory 223 of the processing logic 221 that implements line analysis.

Thus, in one embodiment, the building up of a line analysis data structure for a line is a real-time operation performed by a combination of hardware and software, following the insertion of data 207 into the front-end memory 209.

The inventor chose to make the size of the front-end memory 209 sufficiently large—more than one video line—to provide some flexibility in the time taken to perform each analysis process. Some line analysis processes may take a longer time to perform than other line analysis processes. Typically, the average execution time for line analysis should be less than the duration of an actual video line for each video source in the one or more inputs 203.

One key aspect of the invention is that line analysis need not change the data in the front-end memory. Rather, it analyzes such data to build the line analysis data structure.

Post-Line-Analysis Filtering

In one embodiment, two filtering processes take place after the building of the line analysis data structure that describes the video characteristics of the lines contained in the front-end memory:

Horizontal phase filtering using a horizontal phase filter.

Black level filtering using a black level filter.

These post-line-analysis processes improve the precision of selected measurements performed by the line analysis processes. Line analysis occurs with a relatively short time constant in order to rapidly react to sudden variations of the applied video signal. In some situations, providing such low reaction time may not adequately remove the adverse effects of the noise that might corrupt the video signal. For example, the length of video lines may change in the case of data from video tape recorders.

In one embodiment, filters are applied to the measured quantities in a "post-analysis" fashion. Each filter in effect averages the measurements of several temporally consecutive measurements around a target video line. The inventor selected the two-step approach—horizontal phase filtering and black level filtering—to provide a trade-off between noise rejection and robustness against signal perturbations. Each filtering process and filter is described in this description in a dedicated section.

A single parameter called the Timing Averaging Coefficient (TAC) globally controls the horizontal phase filter.

Another single parameter called the Level Averaging Coefficient (denoted by LAC) globally controls the black level filter.

One aspect of the invention is having only two parameters control the post-analysis filtering.

Post-analysis temporal filtering operates with a delay of a few video lines after line analysis process. Therefore, in one embodiment, the temporal filtering processes initially wait until the line analysis process has analyzed several lines before such temporal filtering takes place.

Post-analysis temporal filtering updates some elements of the line records in the line analysis data structure. Once such elements are computed for a given line record, and once the data is sufficiently analyzed such that vertical positioning of each line is known, all information related to the video signal for that line is known. The next process, the resampling process, can then take place.

Resampling

In one embodiment, resampling works on the raw data recorded in the front-end memory 209, and on the information about such data contained in line records of the line analysis data structure.

In a first simple embodiment of a decoder, a resampling process is applied only once in order to generate a single resampled image. This resampled image forms the final data of the frame grabber. In one implementation, the data is stored locally in a frame buffer memory. In one implementation, the resampled data is transferred to host computer memory connected via a bus interface e.g., a PCI interface coupled to the host data bus. In an alternate implementation, the resampled data is stored locally in a frame buffer memory, and can then be transferred into the host computer memory for access by a host processor.

In a more capable embodiment, several resampling processes can execute simultaneously from the same set of raw data and using same line analysis data structure. For instance, in one version, the decoder generates two versions of the same image, with different scaling factors, one for display purposes and the other for the purpose of storage in the host computer memory. In one implementation, the resampled data for the display purposes is locally stored in the form of a frame buffer, and the other image version is transferred to the host memory. In another implementation, all versions of the resampled data are transferred to the host memory.

The resampling process has the fundamental purpose of interpolating the samples at the correct positions.

One aspect of the invention is that the resampling can simultaneously achieve one or more other purposes, in addition to resampling the raw data to some desired resampled size. In one embodiment, resampling also includes:
- Adjustable low-pass filtering.
- Color sub-carrier rejection (when needed).
- One-dimensional edge enhancement or contour enhancement. Also called peaking.
- Amplitude correction.

One feature of the invention is that by the line analysis being adaptive to allow for lines of variable length, the resampling process is able to accommodate a signal exhibiting relatively poor horizontal phase stability, e.g., a signal from a magnetic recording such as a VCR output signal.

Post-Processing

In one embodiment, additional processes, called post-processing processes, are applied to the resampled image prior to or simultaneous with final transfer via the bus 217 into the host memory. Different embodiments include one or more of:
- Automatic level correction in order to perform clamping on the output signal.
- Deliberate offset control.
- Automatic gain correction.
- Deliberate gain control.
- Look-up table.

Block Diagrams of Various Embodiments

This Section describes several alternate architectures in the form of simplified block diagrams of frame grabbers that use one or more aspects of the invention. Different fields of application also are suggested. These embodiments follow the general architecture of FIG. 2.

While only some embodiments are presented herein, and these include some common elements, one in the art will clearly understand that other architectures and methods are possible within the spirit and scope of the invention. Thus, the variations are not meant to be exhaustive. Other embodiments are possible within the general spirit and scope of the invention.

Monochrome Industrial Frame Grabber

Figure 4A:
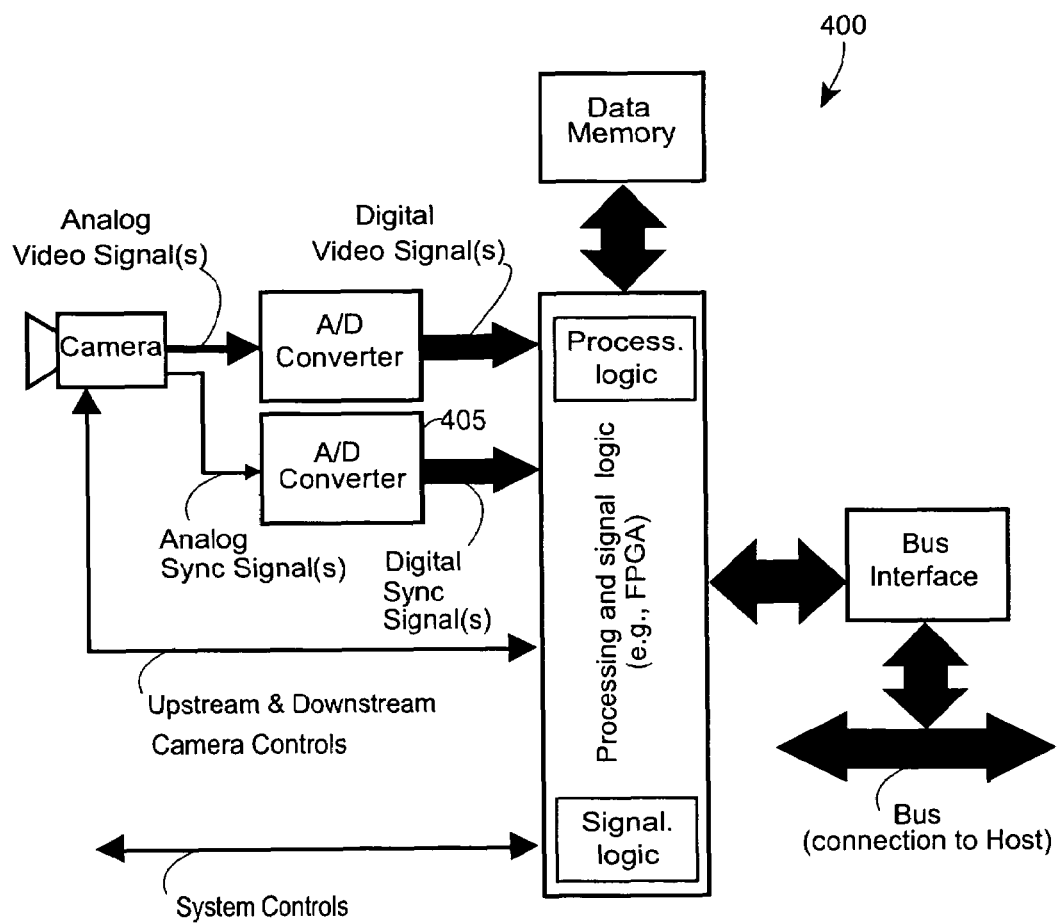
FIG. 4A shows one embodiment of a monochrome industrial vision frame grabber that includes aspects of the present invention and that follows the general architecture of FIG. 2.

FIG. 4A shows one embodiment of a monochrome industrial vision frame grabber 400 that includes aspects of the present invention and that follows the general architecture of FIG. 2. In the industrial vision framework, one processes the signals resulting from analog industrial cameras. The video signal is provided to the frame grabber under the form of one, two or three individual signals. The analog channels are digitized in parallel at a same frequency. Such a frame grabber has provision for the case that a separate source of horizontal synchronization is provided. While such a synchronization signal is a downstream camera signal, FIG. 4A shows such separate horizontal signal separately with a separate ADC 405 for digitizing the signal carrying the horizontal synchronization when such a separate signal is desired and available. A signal-conditioning filter is assumed to be included in the ADC of the synchronization downstream signal for the synchronization signal(s).

A separate bus interface, e.g., for a PCI or similar host bus, is shown in FIG. 4A.

In one embodiment, the sampling rate for the horizontal synchronization ADC 405 is the same as for the video signal. Thus the horizontal synchronization signal may be considered as simply another video channel.

As for a pixel clock, even when one is provided by the camera, e.g., as one of the upstream camera controls, one aspect of the invention is that line analysis carried out by the line analyzer provides such excellent precision of the horizontal detection process that it is typically not necessary to use any provided pixel clock. As is known, using a pixel clock may require a relatively expensive cable to connect this signal from the camera to the frame grabber to avoid interference in the video signal. Abandoning using a pixel clock avoids the problem posed by transmission of this clock in the cable that connects the camera to the frame grabber.

Color Industrial Frame Grabber

Figure 4B:
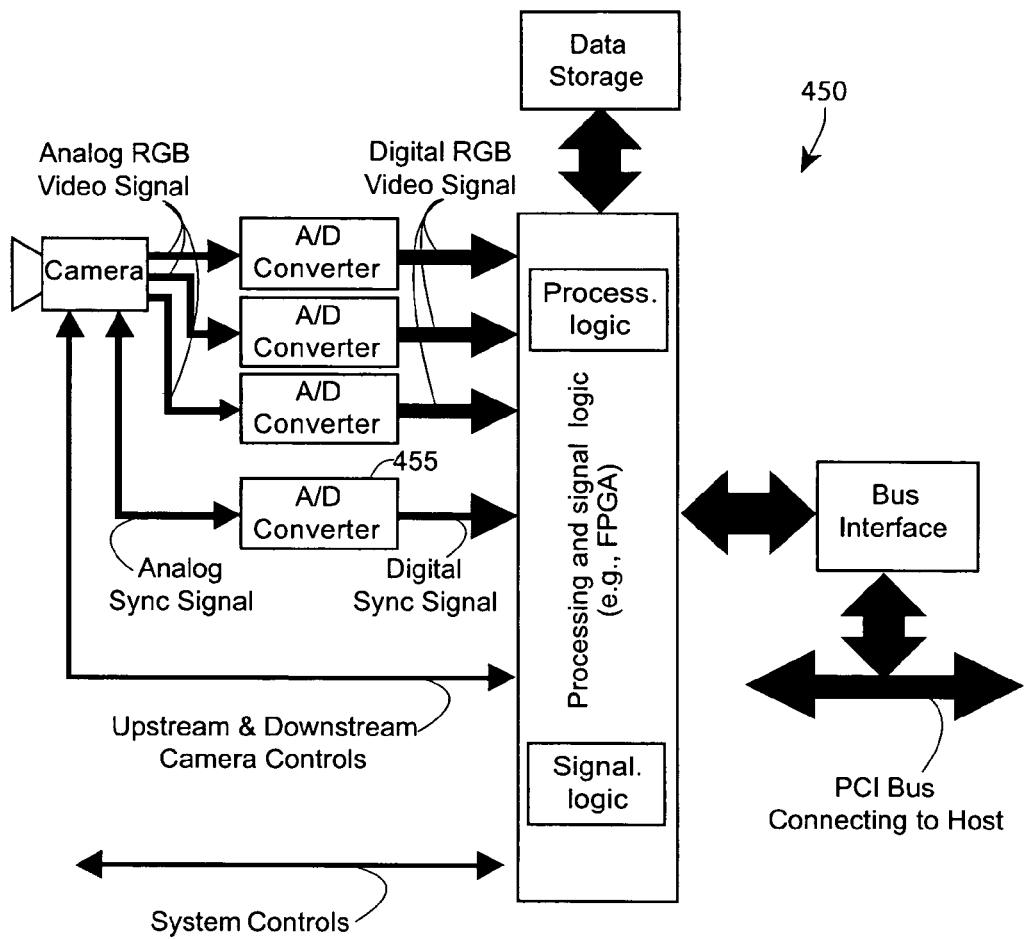
FIG. 4B shows one embodiment of a color industrial vision frame grabber that includes aspects of the present invention and that follows the general architecture of FIG. 2.

FIG. 4B shows one embodiment of a color industrial vision frame grabber 450 that includes aspects of the present invention and that follows the general architecture of FIG. 2. The general architecture of FIG. 4B is similar to that shown in FIG. 4A, except that three video channels, e.g., R, G and B, are used.

As in the case of FIG. 4A, while a separate synchronization signal, e.g., of digital pulses, is a downstream camera signal, FIG. 4B shows such separate horizontal signal separately with a separate ADC 455 for digitizing the signal carrying the horizontal synchronization when such a separate signal is desired and available. A signal conditioning filter is assumed to be included in the ADC 455 for the synchronization signal(s).

Single Industrial Camera Frame Grabber

Figure 5:
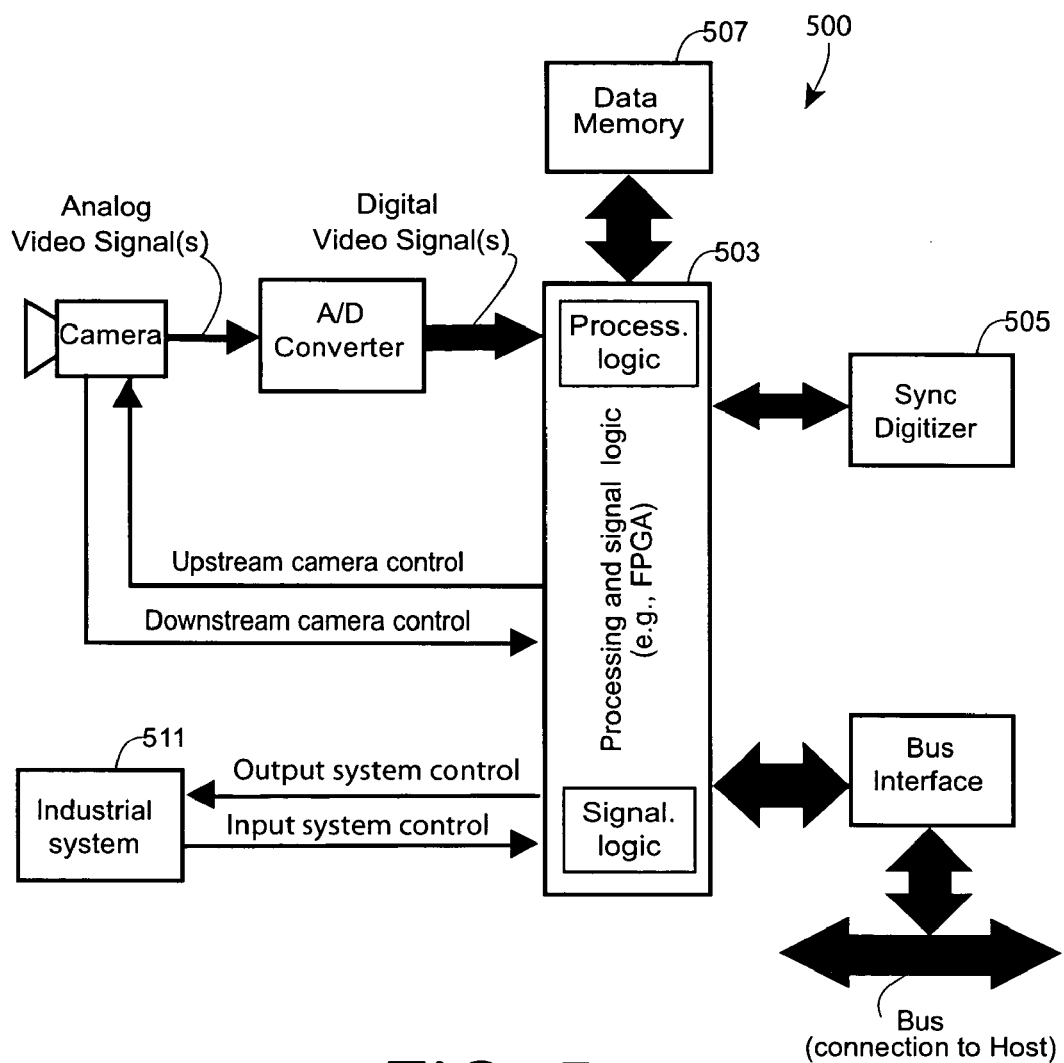
FIG. 5 shows one embodiment of a monochrome industrial vision frame grabber that includes aspects of the present invention and that follows the general architecture of FIG. 4A.

FIG. 5 shows one embodiment of a monochrome industrial vision frame grabber 500 that includes aspects of the present invention and that follows the general architecture of FIG. 4A. However, unlike the case of FIG. 4A, the synchronization signals are not shown separately from any other downstream camera control signals, but are included as the downstream camera control signals. The logic in a processing and signal logic unit 503 switches or routes signals as required, and also routes such signals to a synchronization digitizer shown here as a separate unit 505. The synchronization digitizer 505 includes the required signal conditioner, e.g., the low-pass filter to filter the to-be-digitized horizontal synchronization signals, and further includes an ADC to digitize this signal as if it was a video signal. The signal logic part of processing and signal logic unit 503 causes the digitized horizontal synchronization signal to be stored in the front-end memory 507 just like as if it was a different video channel.

Note that because there is no existing standard for connectors for such industrial cameras, providing signal routing and/or switching logic as part of the processing and signal logic 503 provides flexibility in connecting signals and appropriately routing such signals. Thus different downstream camera control signals may be connected to the horizontal synchronization unit.

Note that FIG. 5 shows the industrial system 511 that is coupled to the frame grabber. There may be system signals to and from such a system as described above with reference to FIG. 2.

Dual Industrial Camera Frame Grabber

Figure 6:
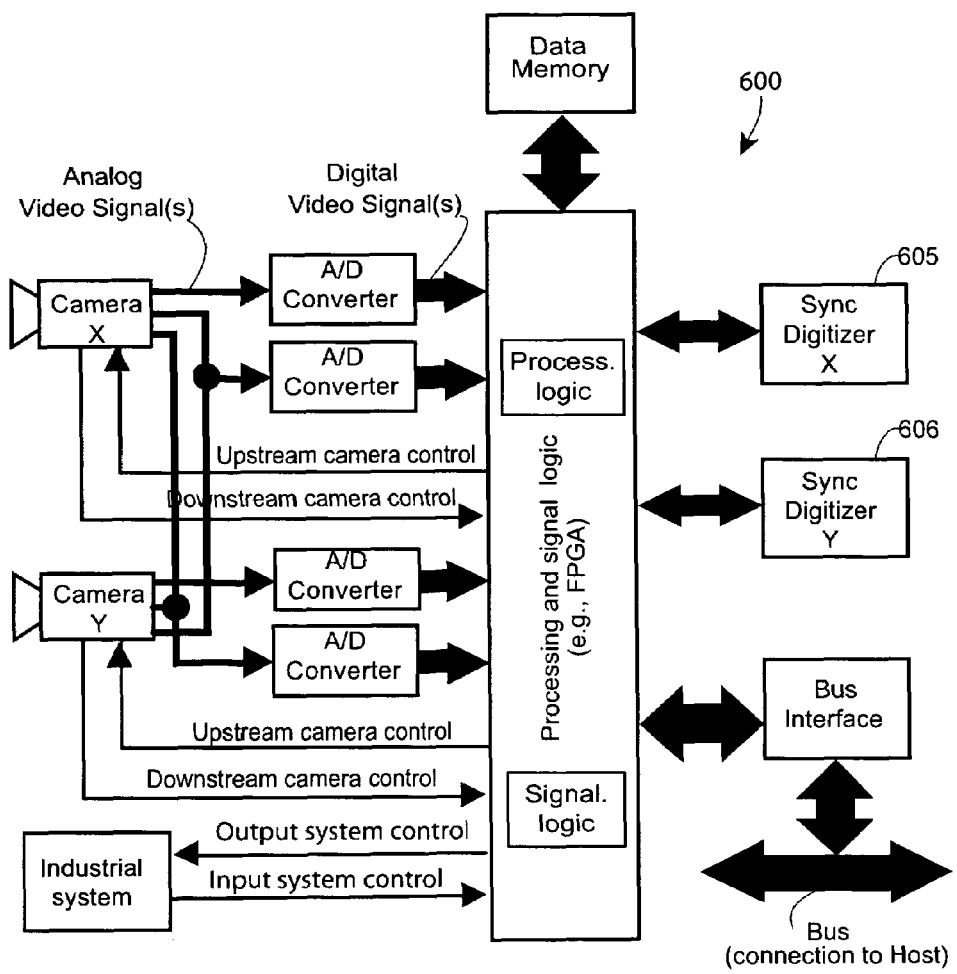
FIG. 6 shows one embodiment of a dual-channel monochrome industrial vision frame grabber that includes aspects of the present invention and that follows the general architecture of FIG. 2.

FIG. 6 shows one embodiment of a dual-channel monochrome industrial vision frame grabber 600 that includes aspects of the present invention and that follows the general architecture of FIG. 2. The general form follows that of FIG. 5, i.e., any separate synchronization signals that are digitized are not shown separately from any other downstream camera control signals, but included as the downstream camera control signals. The synchronization digitizers are shown here as separate units 605 and 606. The system includes provision for connecting with two industrial cameras or other sources of video information.

Quad Industrial Camera Frame Grabber

Figure 7:
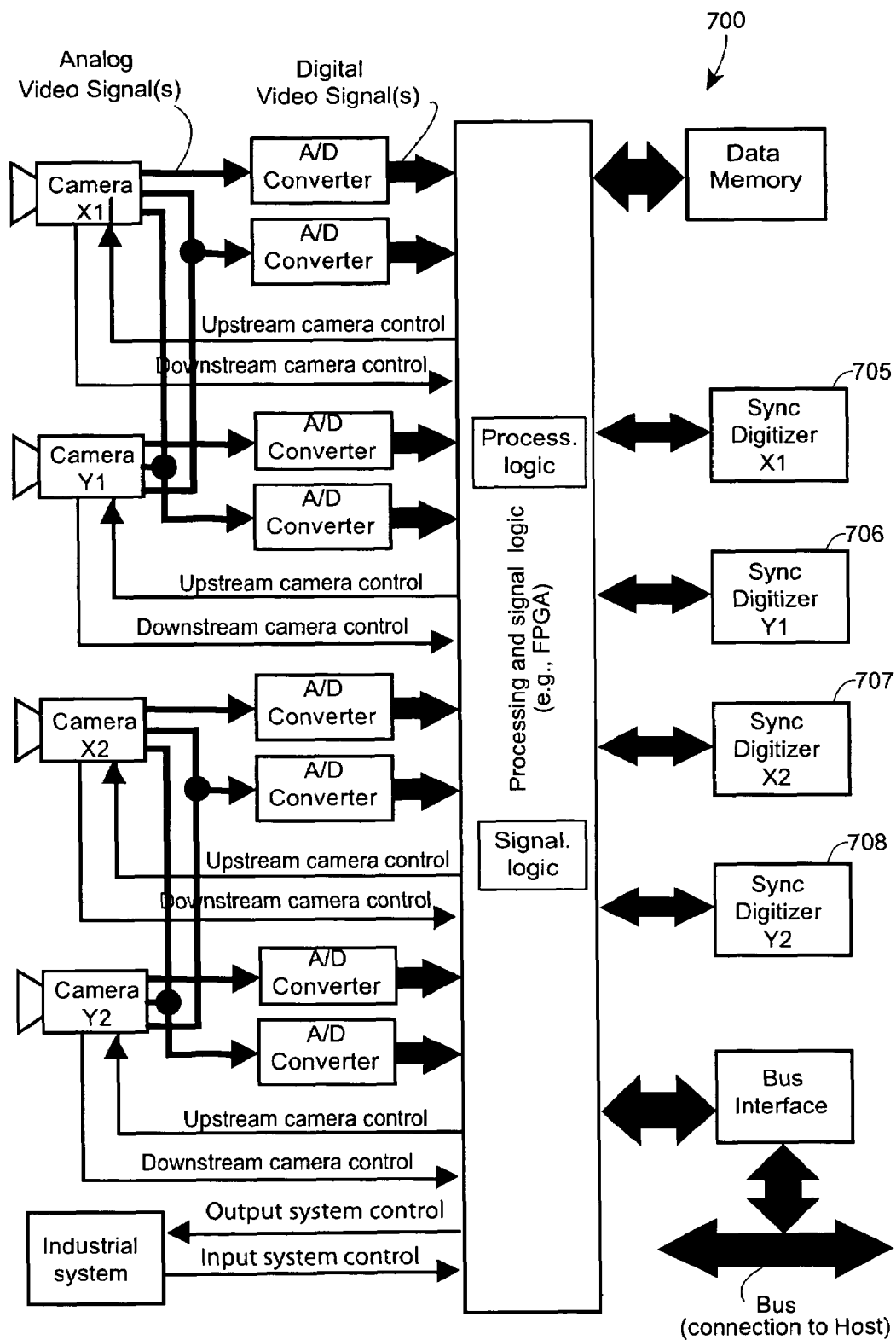
FIG. 7 shows one embodiment of a dual-channel monochrome industrial vision frame grabber that includes aspects of the present invention and that follows the general architecture of FIG. 2.

FIG. 7 shows one embodiment of a dual-channel monochrome industrial vision frame grabber 700 that includes aspects of the present invention and that follows the general architecture of FIG. 2. The general form follows that of FIG. 5, i.e., any separate synchronization signals that are digitized are not shown separately from any other downstream camera control signals, but included as the downstream camera control signals. The synchronization digitizers are shown here as separate units 705, 706, 707, and 708. The system includes provision for connecting with four industrial cameras or other sources of video information.

Low End Video Surveillance Frame Grabber

Figure 8:
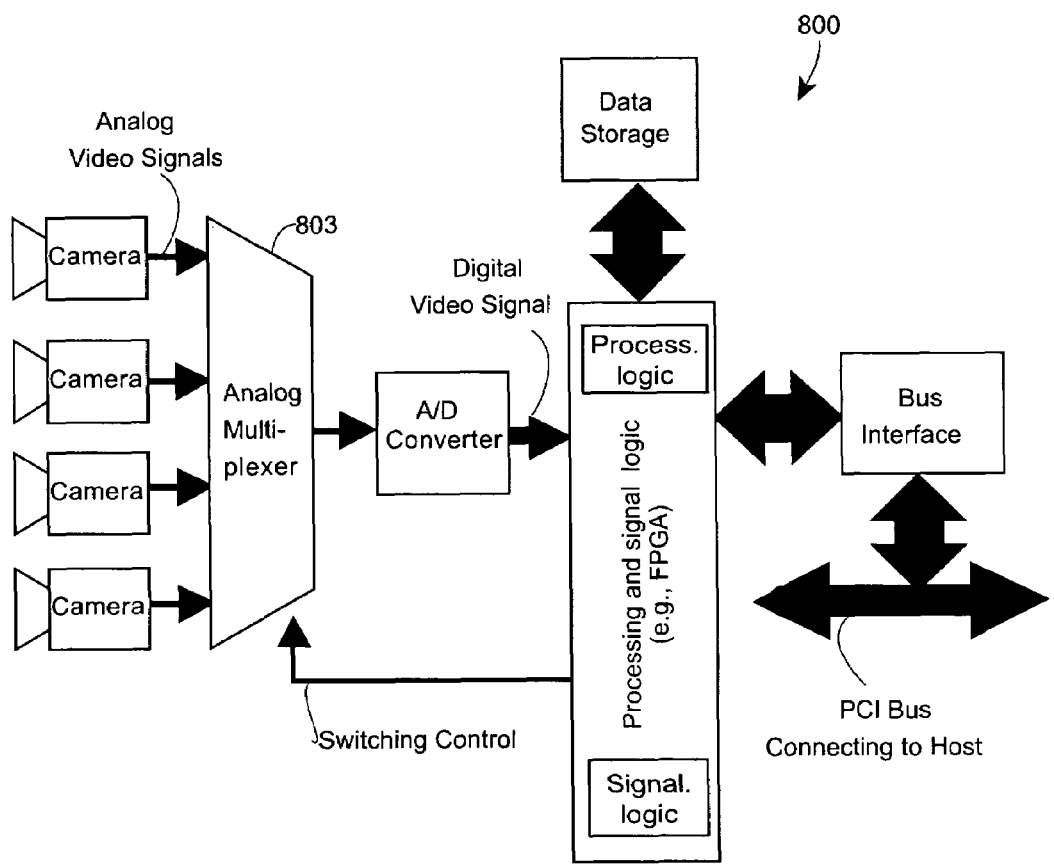
FIG. 8 shows one embodiment of a relatively simple relatively low-cost frame grabber suitable for video surveillance that includes aspects of the present invention and that follows the general architecture of FIG. 2.

FIG. 8 shows one embodiment of a relatively simple relatively low-cost frame grabber 800 suitable for video surveillance that includes aspects of the present invention and that follows the general architecture of FIG. 2. The video signal is obtained by time multiplexing a plurality of video sources from a plurality of video cameras via a multiplexer 803. Four cameras are shown in FIG. 8, but the number of cameras is not so limited. In video-surveillance, the cameras are typically low-cost cameras that provide composite video signals. Separate horizontal or vertical synchronization signals are not typically provided. The video may be non-interlaced, but is typically interlaced.

One feature of the invention is particularly applicable to the architecture shown in FIG. 8. Because the input line contains several video signals time multiplexed, there may be several black levels. The line analysis method described herein provides for analyzing each time multiplexed time-segment of the signal separately to allow for different black and sync tip levels for each of the time multiplexed sources. Furthermore, once the line analyzer reaches a frame locked state, wherein there is knowledge of where in any field a current line lies, the multiplexing can be controlled such that each video source's lines continue from the last analyzed line number for that video source, even if that was one or more frames ago, such that complete video frames may be constructed for each video source without having to wait for vertical synchronization information. Of course, such video frames may include data from different input frames. Nevertheless, in such a way, no lines need be lost waiting for a vertical event such as the vertical blanking interval or a vertical synchronization pulse, and the "switching" between different video sources of the resampled video is virtually instantaneous.

High Performance Video Surveillance Frame Grabber

Figure 9:
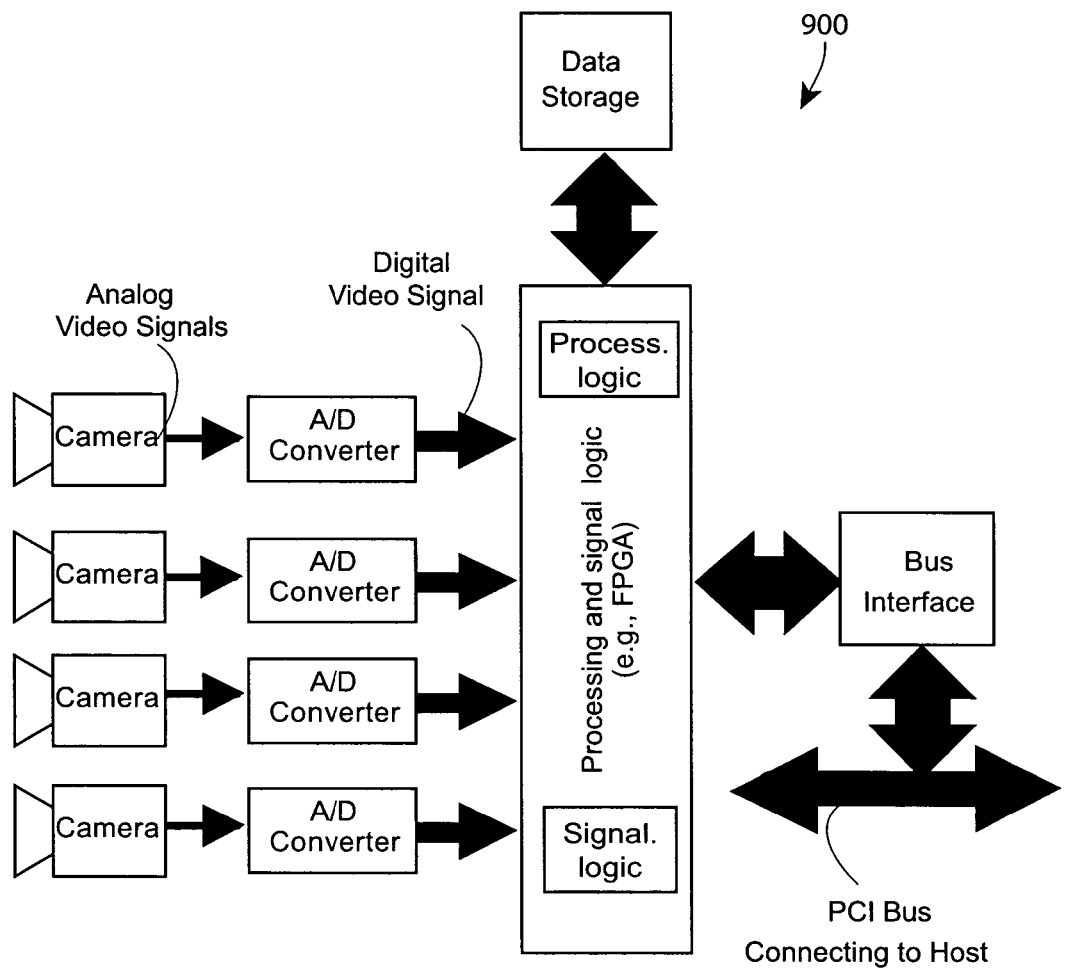
FIG. 9 shows an embodiment of a frame grabber that is also suitable for video surveillance, but that is more complex than that shown in FIG. 8.

FIG. 9 shows an embodiment of a frame grabber embodiment 900 that is also suitable for video surveillance, but that is more complex than that shown in FIG. 8. The embodiment includes aspects of the present invention and follows the general architecture of FIG. 2. A separate video signal is digitized for each of a plurality of video sources, e.g., from a plurality of video cameras. Four cameras and four corresponding ADCs are shown in FIG. 9, but the number of cameras is not so limited.

High Performance Industrial Frame Grabber: Actual Implementation

Figure 10:
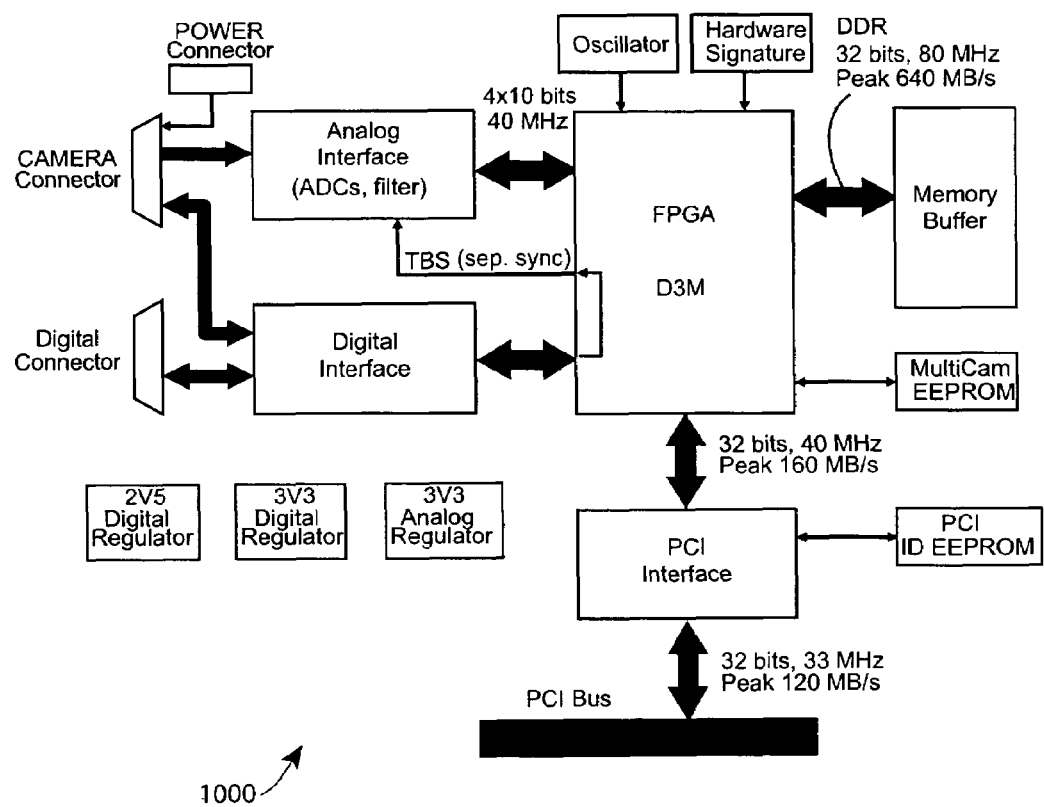
FIG. 10 shows an implementation of a frame grabber suitable for industrial vision applications that follows the general architecture of the embodiment of FIG. 5.

FIG. 10 shows an implementation of a frame grabber 1000 suitable for industrial vision applications that follows the general architecture of the embodiment of FIG. 5, but is shown here in more detail. A camera connector connects the analog video signals from the camera to the frame grabber, and includes a power connector. A digital connector connects the downstream camera signals, the upstream camera signals, and the system controls such as strobe and trigger signals. An analog interface includes ADCs for each analog video signals, e.g., three for RGB signals, and further includes a fourth ADC with a low-pass signal conditioning filter for any separate synchronization signal that is to be digitized as if it was another video channel. The signal conditioner in one embodiment is a discrete RC filter. The ADCs are synchronized and in one embodiment each digitize at 40 MHz and to 10 bits over a 2V input range. Thus, the outputs of the analog interface are up to four digital streams that in one embodiment are 10-bits each. The signal TBS means "To be sampled", and is a selected one of the downstream signals that is to be sampled. The ADCs are analog devices AD9218 double 40MHz 10-bit ADC components. Alternate implementations may include one or more ADCs integrated into the device.

The voltage regulators are included for various components. For example, the 3.3 V analog regulator is needed by the ADCs.

The digital and analog interfaces connect the signals to various signal paths in an FPGA. The FPGA in one embodiment is Xilinx "Virtex-II" FPGA (Xilinx, Inc., San Jose, Calif.) and includes, Fast Logic, Memory, Embedded Multipliers, and Digital Clock Managers. The embodiment further includes a 32-bit soft processor, called a "MicroBlaze™". This processor features a RISC architecture with Harvard-style separate 32-bit instruction and data busses running at full speed to execute programs and access data from both on-FPGA and external memory.

An oscillator is provided to operate the FPGA clocks. The hardware signature is stored in an external register. The front-end memory is in the form of a 32-bit DDR memory that can read/write at up to 640 Mbytes/sec. An external EEPROM also is provided for storing the camera details, and one also for the PCI interface, which, in one embodiment, is an external device.

Figure 11:
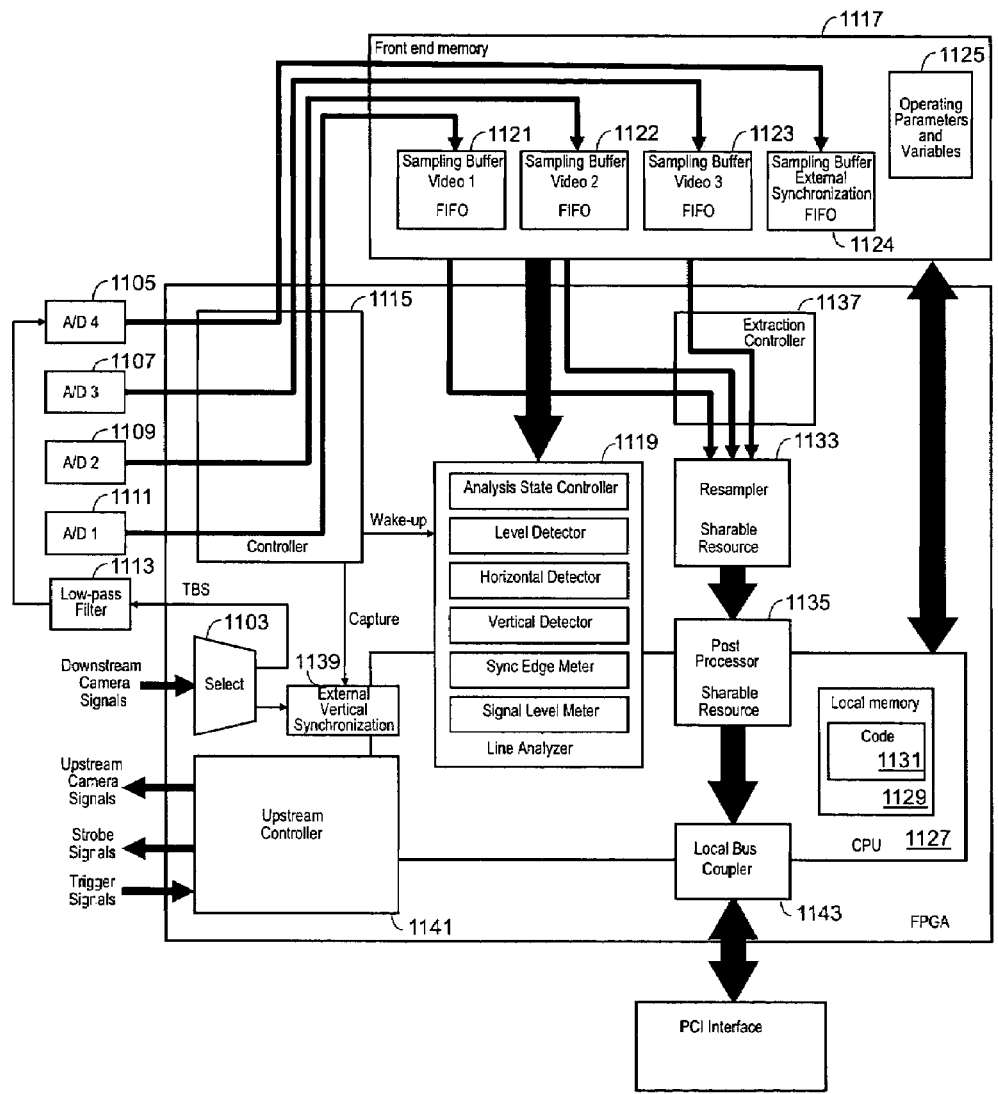
FIG. 11 shows a functional block diagram of the implementation of the embodiment shown in FIG. 10.

FIG. 11 shows a functional block diagram of the implementation of FIG. 10. A selector 1103 selects the downstream camera signals that are to be used. In the case that one of the signals is to be analyzed by the line analyzer as if it was a video channel, the selector selects such a downstream camera signal for the signal TBS. A set of four ADCs, 1105, 1107, 1109, and 1111 is provided. The signal TBS, when used, is connected to one of the ADCs: A/D 4 1105 via a low pass filter 1113. A controller 1115 is used to route and write the signals to a front-end memory 1117, and further, to generate a wake-up signal to a line analyzer 1119 implemented in the processor of the FPGA when it is expected that a line is ready for analysis in the front-end memory 1117. A FIFO is maintained in the front-end memory 1117 for each video channel. Each such FIFO is called a sampling buffer, and four such buffers 1121, 1122, 1123, and 1124 are shown. Note that while separate logical data lines are shown from the ADCs to each of the FIFOs, those in the art will understand that FIG. 11 is a logical diagram, and that it is to be understood that the memory is written normally via a single port using a memory address controller via a bus, and that there are not actually four physical input ports to the memory.

The front end memory 1117 also contains a set 1125 of operating parameters and variables that describes the structure of the memory.

The FPGA include a processor (CPU) 1127 and local memory 1129. The local memory includes programming code 1131 to instruct the processor 1127 to carry out the processes of line analysis, resampling, and post processing. The line analyzer is shown as a separate box labeled "line analyzer" 1119 that shows several resources that may be shared to analyze a plurality of sets of raw data in the plurality of sampling buffers.

Line analysis occurs according to a state transition diagram for each video source. A state controller controls this operation. The wake up signal from the controller indicates wake up, and local memory includes the present state and the conditions any processes of that state concluded. These determine the next state process.

The states of line analysis, and the associated processes were summarized above and are described in more detail below in this description. Level analysis determines the important black level and sync tip level, the horizontal detector determines the horizontal phase, the vertical detector determines the vertical positioning of the line. There also are stored sync edge meters and signal level meters to monitor the condition and levels throughout the analysis.

While in one embodiment, all synchronization signals, whether in the video signals or provided separately as downstream controls, may be processed as video signals, the inventor decided for this embodiment to limit the number of digitizing channels to four. Thus, a separate vertical synchronization detector is provided and can process a separate downstream vertical synchronization signal. For example, in the case that both horizontal and vertical synchronization signals are provided as separate downstream signals, the inventor decided to process the horizontal synchronization signal as the TBS signal routed to the fourth ADC 1105 and treat the signal as a separate video channel, but to treat the vertical synchronization signal conventionally with a separate vertical synchronization detector 1139.

When the line analyzer determines that the data in the sampling buffers is "frame locked," i.e., that both horizontal and vertical positioning of the data is known, the data is ready for resampling. Note that up to this point, the data in the front-end memory remains as raw digitized data. After frame locking, this data is resampled by a resampler, shown here as a sharable resource 1133. An extraction controller 1137 uses selected resampling parameters to determine what data is extracted for the resampling and how to extract such data. The resampled data is shown logically as separate data streams, and it is to be understood that such data is read out of the external memory conventionally.

The resampled data is post-processed by a processor 1135 using the results of line analysis to provide the desired dynamic range to the output resampled data.

The local bus coupler passes the data to an external bus via an external PCI controller.

An upstream controller 1141 is connected to the local bus coupler 1143. The upstream controller 1141 generates upstream camera controls, and further can generate strobe signals and accept trigger signals, e.g., for asynchronous capture.

This, of course, described one implementation using the methods described herein. Those in the art will recognize that many other designs can be made using the aspects described herein.

Video Signal Conventions

This Section defines the conventions used in this description. In this description, video lines are numbered from 1. In a composite video signal, the first line contains the beginning of the vertical synchronization pulse. Other conventions are possible, and how to modify the description to deal with such other conventions would be straightforward to one in the art.

Thus, by the convention used herein, an even field starts with the coincidence of the beginning of the vertical synchronization with a horizontal synchronization pulse. An odd field starts with the beginning of the vertical synchronization between two horizontal synchronization pulses. An interlaced video signal alternately issues even and odd fields. A non-interlaced video signal—also called a progressive-scan, or simply a progressive video signal—issues one kind of field, which can be even or odd.

Functionality

The following Table provides a list of functions that can be performed by a frame grabber embodiment incorporating aspects of the present invention. One implementation includes all of these capabilities, while different embodiments may include a different combination of some or all of these features.

| Function | How provided or achieved |
|---|---|
| Common-mode noise rejection | Differential input of the A/D converters, receiving both the inner and outer terminals of a coaxial video cable. |
| Low-pass (anti-alias) filtering | A convolution kernel implementing a selectable low-pass filter in the time domain. |
| DC level restoration (clamping) | Measurement of the black level before resampling, temporal filtering, and post-processing after resampling. |
| Brightness adjustment (Offset) | User-defined control digitally applied after resampling. |
| Automatic gain control (AGC) | Measurement of the synchronization amplitude before resampling, temporal filtering, and post-processing after resampling. |
| Contrast adjustment (Gain) | User-defined control digitally applied as post-processing after resampling. |
| Horizontal synchronization recovery | Sub-sample transition detection, digitally applied before resampling, temporal filtering, and processing to build resampling conditions. |
| Vertical synchronization recovery | Classification of analyzed video lines: processing by the state processor (state machine or controller). |
| Pixel clock recovery | Resampling numerically carried out according to resampling conditions updated line after line, e.g., numerical interpolation. |
| Analog-to-digital conversion | In one embodiment, an external component, e.g., for an implementation using an FPGA for the processing logic. In another embodiment, an ADC device is included as an internal component, e.g., for an implementation using a mixed-mode custom integrated circuit (VLSI or ASIC). |

-continued

| Function | How provided or achieved |
|---|---|
| Look-up table | A lookup table (LUT) is a classical image processing function easily realized by digital circuitry. Useful for gamma pre-compensation removal. |
| Scaling | Horizontal scaling is achieved by manipulation of the resampling conditions. Vertical scaling is achieved by additional digital processing. |
| Zooming | Horizontal zooming is achieved through manipulation of the resampling conditions. Vertical zooming is achieved by additional digital processing. |
| Switching | Quasi-instantaneous video source switching is achieved by memorization of the encoding conditions (vertical location and parity) for each source in the case of time-multiplexed signals. |
| Signal loss recovery | This may be achieved by classifying incoming video signals, preferably using an optimized method applied in real-time to incoming video signals. |

Types of Separate Synchronization Signals

Horizontal synchronization might typically arrive from a camera in three different ways:

| Designation | Meaning | Horizontal Synchronization |
|---|---|---|
| LV | Line from Video signal | Mixed in a video channel in the form of composite synchronization pulses |
| LP | Line from Pulse signal | Provided on a separate dedicated digital line |
| LM | Line from Mixed signal | Provided on a separate digital line that also carries the vertical synchronization |

The first way (LV) is characteristic of what is called herein "analog" synchronization. The two others ways are characteristics of what are called herein "digital" synchronization.

Vertical synchronization might typically arrive from a camera in three different ways:

| Designation | Meaning | Vertical Synchronization |
|---|---|---|
| FV | Frame from Video signal | Mixed in a video channel in the form of composite synchronization pulses |
| FP | Frame from Pulse signal | Provided on a separate dedicated digital line |
| FM | Frame from Mixed signal | Provided on a separate digital line that also carried the horizontal synchronization |

In addition, a camera in "master" synchronization may not return an exploitable vertical synchronization downstream. In such a case, an upstream controller in the processing and signal logic provides to the downstream controller in the processing and signal logic a digital signal, and one can interpret this process as a particular case of FP.

The Table below shows the different ways (modes) one can expect to receive separate synchronization downstream from a analog industrial camera:

| | | Vertical Synchronization Source | | |
|---|---|---|---|---|
| | | Composite Video | Pulsed Downstream Line | Mixed Downstream Line |
| Horiz. Synch. Source | Composite Video | True Analog Synchronization LV-FV | Combo Analog/Digital Synchronization LV-FP | Combo Analog/Digital Synchronization LV-FM |
| | Pulsed Downstream Line | Combo Analog/Digital Synchronization LP-FV | Dual-wire True Digital Synchronization LP-FP | Irrelevant |
| | Mixed Downstream Line | Combo Analog/Digital Synchronization LM-FV | Irrelevant | Single-wire True Digital Synchronization LM-FM |

Seven modes: LV-FV, LP-FV, LM-FV, LV-FP, LP-FP, LV-FM, and LM FM are described in more detail below.

The different modes are used in the ways summarized in the following table in a multi-tap (multi-channel) camera. The master channel is the channel that controls the horizontal synchronization, e.g., subject to the line analysis described herein.

| | | | Synchronization Mode | | | | | |
|---|---|---|---|---|---|---|---|---|
| | | | Chan. #1 | Chan. #2 | Chan. #3 | Chan. #4 | Master Chan. | Vertical Capture |
| True Analog | | LV-FV | First Tap | Second Tap (if present) | Third Tap (if present) | Not used | Chan. #1 | Not used |
| True Digital | Dual Wire | LP-FP | | | | H Sync Wire | Chan. #4 | V Sync Wire |
| | Single Wire | LM-FM | | | | HV Sync. Wire | | Not used |
| Combination Analog/Digital | | LV-FP | | | | Not used | Chan. #1 | V Sync Wire |
| | | LV-FM | | | | | | HV Sync. Wire |

-continued

| | Synchronization Mode | | | | | |
|---|---|---|---|---|---|---|
| | Chan. #1 | Chan. #2 | Chan. #3 | Chan. #4 | Master Chan. | Vertical Capture |
| LP-FV | | | | H Sync Wire | Chan. #4 | Not used |
| LM-FV | | | | HV Sync. Wire | | Not used |

Prior art frame buffers typically use separate methods to decode separate synchronization when provided, e.g., in an industrial camera, in the form of a separate downstream control. The justification is that such separate signals are relatively easy to decode, and thus may be decoded with only the addition of simple hardware. The inventor realizes that resources for decoding video signals that contain horizontal and/or vertical synchronization, e.g., resources to decode composite video signals using the line analysis methods described herein are already available in an implementation of the present invention, and thus, can be used to decode the separate synchronization signals as if they are video signals. Therefore one aspect of the invention is treating such separate synchronization signals as "just" video signals. Since the resources are already available, using them may lead to a lower part count, and more inexpensive frame buffer, even though the methods used may then be considered as "overkill" meaning that such decoding might be possible with much simpler methods.

Note that when vertical synchronization is presented as a separate signal, because such a signal is so simple, in some implementations, e.g., when there is also a separate line for horizontal synchronization so that there already are four video channels digitized and line analyzed, some embodiments include a separate element that captures vertical synchronization. In the table above, such a resource is in a column labeled "Vertical Capture."

LV-FV: True Analog Synchronization

In this mode, the horizontal and vertical synchronization information is extracted from the video signal. In the case of color (three channels of digitization), no fourth channel of digitizing is used.

Among the channels of a multi-tap camera, the master channel carries the synchronization information, and is usually the first channel. In one embodiment for operation with such a camera, one extracts the horizontal timing and the vertical timing from the master channel. A separate element that captures vertical synchronization is not used. Line analysis as described in this description is applied on the master channel.

LP-FP: Dual-Wire True Digital Synchronization

In this mode, the horizontal and vertical synchronization information is conveyed by two distinct downstream lines in the form of digital pulses. For a color camera that has three digitizing channels, the fourth channel digitizes the horizontal synchronization signal. The master channel is this fourth channel from which the horizontal timing is extracted as described in this description using the line analysis as described in this description is primarily applied on the master channel. The element that captures the vertical synchronization analyzes the vertical synchronization signal, and vertical timing is extracted from it.

LM-FM: Single-Wire True Digital Synchronization

In this mode, the horizontal and vertical synchronization information is conveyed by a single line downstream in the form of mixed pulses. For a color camera that has three digitizing channels, the fourth channel digitizes the mixed signal of synchronization, and the master channel is this fourth channel. Horizontal timing and vertical timing are extracted from it, using the line analysis process described herein. Separate data capture for vertical synchronization is not used.

LV-FP: Combo Analog/Digital Synchronization

In this mode, horizontal synchronization is extracted from the video signal, and the vertical synchronization is carried by a line downstream in the form of digital pulses. For a color camera that has three digitizing channels, the fourth digitized channel is not used. The master channel is that which carries the synchronization information, usually the first. Horizontal timing is extracted from it using line analysis such as described in this description. In one embodiment, a separate element that captures the vertical synchronization analyzes the vertical synchronization signal. Vertical timing is extracted from it.

LV-FM: Combo Analog/Digital Synchronization

In this mode, horizontal synchronization is extracted from the video signal, and vertical synchronization is carried by a downstream line in the form of mixed pulses: One does not use the horizontal pulses in the downstream signal. For a color camera that has three digitizing channels, the fourth digitized channel is not used. The master channel is that which carries the synchronization information, usually the first. Horizontal timing is extracted from it using line analysis such as described in this description.

In one embodiment, a separate element that captures the vertical synchronization analyzes the mixed synchronization signal. Vertical timing is extracted from this mixed synchronization signal.

LP-FV: Combo Analog/Digital Synchronization

In this mode, horizontal synchronization is carried by a downstream line in the form of digital pulses, and the vertical synchronization is extracted from the video signal. For a color camera that has three digitizing channels, the fourth channel digitizes the horizontal synchronization signal, and this is the master channel. Horizontal timing is extracted from it using line analysis such as described in this description. Data capture for vertical synchronization is not used.

LM-FV: Combo Analog/Digital Synchronization

In this mode, horizontal synchronization is carried by a downstream line in the form of mixed pulses with vertical synchronization that one does not use. Vertical synchronization is extracted from the video signal. For a color camera that has three digitizing channels, the fourth channel digitizes the mixed synchronization signal, and this is the master channel;

horizontal timing is extracted from it using line analysis such as described in this description. Separate data capture for vertical synchronization is not used.

Decoding in Line Analysis

This Section describes some aspects of the decoder in relation to the signal to which it is applied.

Decoding Capabilities

Different embodiments of the invention are capable of handling a wide variety of signals as described above. Not all embodiments have all the capabilities described below, but an embodiment can be built that can handle as many of these capabilities as desired. One feature of the architecture shown in FIG. 2 is that so many different versions can be built using the same overall architecture.

In one embodiment, a register is provided in the processing logic to indicate the capabilities of the decoder. One embodiment uses an 8-bit register. The first two bits of the register provide a parameter denoted VSC (Vertical Scanning Capability) that describes the scanning capabilities. The next three bits provide a parameter denoted CDC (Color Decoding Capability) that provides the basic color capabilities and the next three bits define a parameter SPC (Synchronization Pattern Capability) that defines the type of synchronization expected for the signal.

Interlace Recovery

The parameter VSC (Vertical Scanning Capability) describes the capability of the decoder with respect to the interlacing. VSC can have value Interlace meaning that the decoder is configured to recover image information from an interlaced signal. VSC can also take on value Progressive to indicate the decoder is configured to recover image information from a non-interlaced signal.

Color Decoding

The parameter CDC (Color Decoding Capability) describes the capability of the decoder with respect to the color information that the decoder can decode. CDC can take on different values as follows. PAL indicates that the decoder is configured to recover monochrome and color information from a PAL encoded signal. NTSC indicates that the decoder is configured to recover monochrome and color information from a NTSC encoded signal. Monochrome indicates that the decoder is configured to recover monochrome information. PAL Trap indicates that the decoder is configured to recover monochrome information while removing a sub-carrier component at the PAL frequency. NTSC Trap indicates that the decoder is configured to recover monochrome information while removing a sub-carrier component at the NTSC frequency Synchronization The parameter SPC (Synchronization Pattern Capability) describes the capability of the decoder with respect to the different forms of synchronization information, and in one embodiment takes on the following values. PalSync indicates that the decoder is configured to recover image information from an interlaced signal exhibiting PAL-compliant even and odd synchronization patterns. PalEven indicates that the decoder is configured to recover image information from a non-interlaced signal exhibiting a synchronization pattern looking like an even PAL start of field. PalOdd indicates that the decoder is configured to recover image information from a non-interlaced signal exhibiting a synchronization pattern looking like an odd PAL start of field. NtscSync indicates that the decoder is configured to recover image information from an interlaced signal exhibiting NTSC-compliant even and odd synchronization patterns. NtscEven indicates that the decoder is configured to recover image information from a non-interlaced signal exhibiting a synchronization pattern looking like an even NTSC start of field. NtscOdd indicates that the decoder is configured to recover image information from a non-interlaced signal exhibiting a synchronization pattern looking like an odd NTSC start of field.

Overall Description of Decoding

"Sampling" refers to the front-end process of transforming the analog video signal(s) into a stream of digital data for storage in the front-end memory. Note that sampling is to be differentiated from the resampling operation that takes place later in the processing chain, and that applies to data that has already been sampled. Resampling is the process of constructing video data at a desired resolution, scaling, etc.

Sampling occurs at frequency denoted ASR (Analog Sampling Rate), the reciprocal of which is denoted ASP (Analog Sampling Period).

Each analog video signal, or each analog video channel forming a video signal, is applied to a dedicated ADC that samples the signal. Some applications, e.g., industrial vision frame grabber applications, may include providing a separate signal containing horizontal reference synchronization. In such a case, in one embodiment, the separate horizontal synchronization signal is digitized by a separate ADC as if it is another video signal.

Denote by ASN bits (Analog Sampling Number of bits) the number of bits of digitization. Denote by ASL (Analog Sampling Levels) the number of discrete levels in the digitized signal.

One aspect of the invention is that no analog processing needs to be performed, or indeed is performed on the analog signal other than simple AC coupling. In one embodiment, a simple AC coupling capacitor is used to couple the signal to the middle of the digitizing range.

Another aspect of the invention is that the video signals are digitized over their full range without any analog clamping carried out prior to digitizing. In this way, many different black levels may be accommodated in the same signals, e.g., in a time multiplexed set of video signals, each signal from a different video source.

Another aspect is that, with simple AC coupling, a wide range of input voltage ranges may be accommodated, allowing, for example, for mismatch in the input impedance. Thus, according to this aspect, the signal is digitized to more levels and over a wider voltage range than would be the case if one was assured of correct DC level and correct matching.

The digitizing voltage range is denoted by ASS (Analog Sampling Span), measured in Volts.

Figure 12:
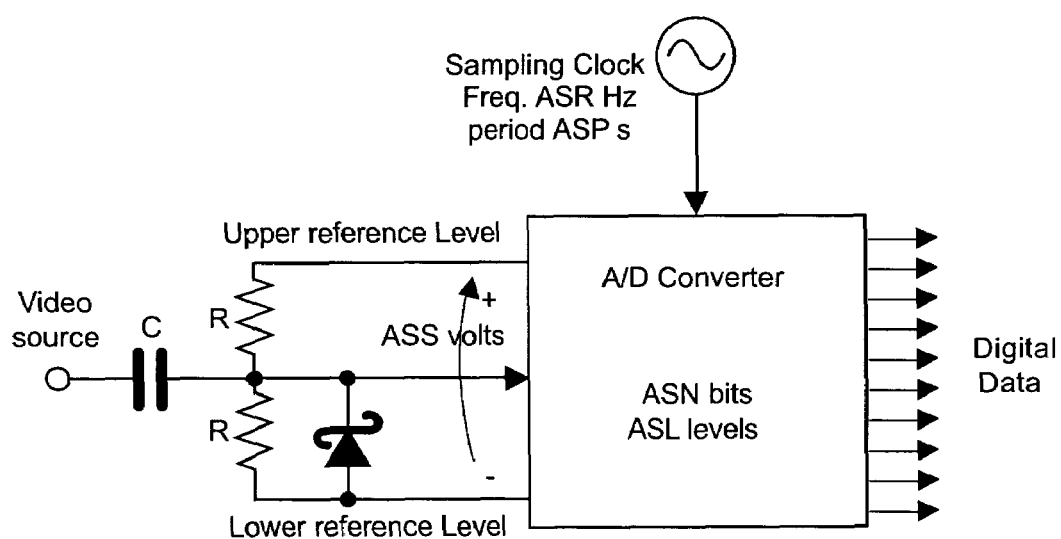
FIG. 12 shows a simple schematic diagram that describes the sampling process carried out by the A/D converter according to aspects of the invention.

FIG. 12 shows a simple schematic diagram that describes the sampling process. The frame grabber includes a sampling clock that provides a sampling signal such that the ADC samples at the rate ASR (in Hz).

Nominally, a video signal presents a peak-to-peak amplitude of 1 Volt, and the extent of the digitizing ASS is 2 Volts. This value of ASS is applicable for all typical video contents.

It may happen that a video signal presents amplitude notably more elevated than 1 Volt. This might happen, e.g., in the case of signal incorrectly terminated by a resistance other than 75 Ω, in which case the amplitude may suddenly double. A Schottky diode is a solution less expensive that re-establishes the functionality in these marginal conditions. It prevents the sync tip (peak) from going below about 0.35 V.

The following holds:

$$ASR = \frac{1}{ASP}$$
$$ASL = 2^{ASN}.$$

Sampling is now discussed for several possible types of video cameras with which embodiments of the invention might operate.

Industrial Analog Video Cameras

In the case of a typical industrial video camera, the video signal is provided to the frame grabber as one, two or three individual signals, referred to as "video channels". These channels are synchronously digitized in parallel.

It may happen that the information contained in this or these signals is not sufficient to completely define the timing information. In such a case, the camera may provide one or more additional signals that include digital pulses that define the horizontal and/or vertical timing structure of the video signal.

Consider, for example, horizontal separate timing. One embodiment handles the additional digital signal transporting the horizontal information as an additional video channel, and digitizes it at the same frequency as the other channels transporting pictorial information, i.e., the video information.

Industrial cameras are known that provide what is called a pixel clock. This is a digital signal synchronized with the instants of time when each pixel is generated by the sensor inside the camera. One embodiment of the invention chooses not to use the pixel clock. One aspect of the invention is that the timing recovery process using the horizontal reference signal in the composite signal case, or delivered separately, is sufficiently accurate so that sufficient accuracy is obtained. The inventor has found that in such an embodiment, using the pixel clock brings no additional effective accuracy or stability. Not using a pixel clock provides for a less expensive, and a more reliable system. For example, it is known that a pixel clock connection not only requires the increased cost of the pixel clock cable. The pixel clock often electrically corrupts the video signal and raises electromagnetic compatibility issues. Using the pixel clock is sometimes thought as a sovereign way to remove any sampling jitter problem, but effectively introduces interference noise worse than the jitter problem. One aspect of the invention fulfills the benefits of using pixel clock usage, without using the pixel clock, and without the accompanying drawbacks. Another aspect can indeed create a pixel clock from the results of line analysis.

Standard Interlaced Video Cameras

A frame grabber using one or more aspects of the invention can also be used with standard interlaced video camera (PAL or NTSC), including color cameras that have chrominance information encoded by a modulated sub-carrier.

One aspect of the invention is that blindly sampling a composite video signal provides a set of sampled digital data that includes all information necessary to recover the video information in the composite video signal, including synchronization, luminance and color.

One application is video surveillance. For such an application, it is desired that the frame grabber simultaneously operate with a plurality of standard video cameras or other sources of video. FIGS. 8 and 9 show two architectures operating with such composite video cameras. Two versions are shown, the Low-end (cost-effective) option, and the High-end (high performance) option.

One cost-effective frame-grabber embodiment is shown in FIG. 8. One aspect of the low-end embodiment is that the video signals are time-multiplexed or otherwise sequenced in time in the analog domain before conversion by a single A/D converter. One frame grabber embodiment contains all necessary provisions to assist this switching function. One measure of performance of such a multiple video source embodiment is the switching latency time, defined as the amount of time during which the input of the ADC is fed with no decodable video signal. It is expected that embodiments of the invention will out perform any previous solution in this respect, while providing a relatively low component count. Once the vertical position of lines is known, the time sequencing can occur an exact number of frames apart, such that no effective time may be lost regaining synchronization. Many prior art solutions require that a new vertical interval be detected before synchronization can be achieved, thus reducing the effective frame rate per camera.

One high performance frame-buffer embodiment is shown in FIG. 9, in which all incoming video signals are individually digitized by a respective A/D converter at the same common frequency. Switching latency time is not an issue as in the embodiment shown in FIG. 8.

For use with industrial cameras, e.g., for the embodiments shown in FIGS. 2-6, embodiments of the invention sample the composite video signal at ASR=40 MHz, over a voltage span of ASS=2 Volts, with a resolution of ASN=10 bits, providing ASL=1024 levels.

For use with standard composite cameras, e.g., for the embodiments shown in FIGS. 8 and 9, embodiments of the invention sample the composite video signal at ASR=20 MHz, over a voltage span of ASS=2 Volts, with a resolution of ASN=10 bits, for ASL=1024 levels.

Note that alternate embodiments may digitize over a higher number of bits, e.g., 12-bits to provide greater insurance that the whole dynamic range is captured.

Of course other parameters are possible. As one example, if it is known that there will be resampling, and the resampling of the final image is to be less than 20 MHz, one embodiment of the invention uses decimation by a factor of 2. For decimation, two successive samples sampled at ASR=40 MHz are summed, the result(s) being saved with 10 bits. Note that in such a case, while the ADC(s) operate(s) at 40 MHz, the effective frequency ASR is really 20 MHz and not 40 MHz. Denote by DRR (Digital Resampling Rate) the parameter describing the resampling (after line analysis), the following table summarizes one embodiment that includes decimation:

| Frequency of resampling DRR | Decimation factor | Frequency of ADC | Effective Frequency of sampling (ASR) |
|---|---|---|---|
| 10 to 19.99 MHz | 2 | 40 MHz | 20 MHz |
| 20 to 40 MHz | — | 40 MHz | 40 MHz |

Sampling Buffer

Definition

Different embodiments can use different amounts of memory for the front-end memory receiving the sampled data. Such a memory may be as small as sufficient for several video lines of data and as large as sufficient for several video frames of data, if it is desired that the frame grabber locally store that much data. The size is typically set to accommodate the expected irregularities and non-uniformity of data transfers, e.g.; PCI data transfers via the bus of the host computer system.

In this document, the term "sampling buffer" is used to refer to a part of the front-end memory sufficient to hold a single video line of digital data. Thus, there is one sampling buffer per video channel, per video source. The front-end memory may maintain several sampling buffers.

A sampling buffer is filled with data from the one ADC, and then subject to the line analysis process. A wake up signal indicates when a sampling buffer is ready for a line analysis process. The wake up may be implemented as an interrupt with the wake up conditions causing the type of interrupt process to carry out. During operation, successive sampling buffers are considered for successive incoming video lines.

Figure 13:
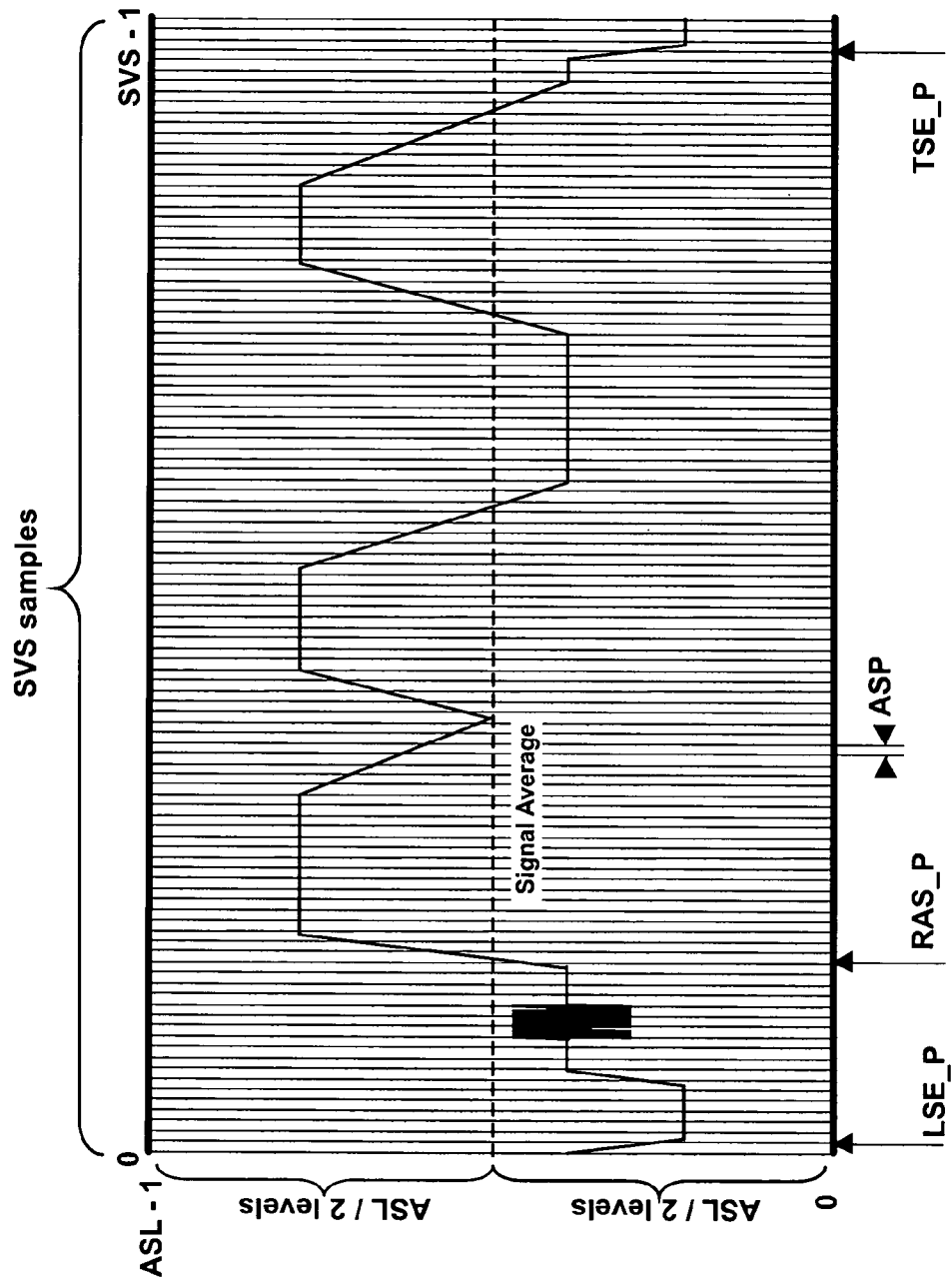
FIG. 13 shows a sampling buffer and shows several of the quantities related to sampling that are defined herein according to embodiments of the invention.

FIG. 13 shows a sampling buffer and shows several of the quantities related to sampling that are defined in the above table, including the relationship some of these quantities.

In one embodiment, a horizontal synchronization pulse edge is located at the beginning and at the end of the sampling buffer. The synchronization pulse edge located at the beginning of the sampling buffer is called the "leading" synchronization pulse edge, while synchronization pulse edge terminating the sampling buffer is called the "trailing" synchronization pulse edge.

During the resampling process, this buffer is scanned by an addressing mechanism using a "pointer" (also called "scanning pointer"). In one embodiment, the pointer is a 32-bit quantity that has a whole part and a fractional part in fixed point format. The whole (integer) part locates a sample of the sampling buffer. The fractional part refines the position of a significant point of the signal between two sample points. Each unit of the scanning pointer is called a "pointing unit." The scanning pointer is described in detail in the section that deals with resampling.

Filling the Sampling Buffer

Figure 14:
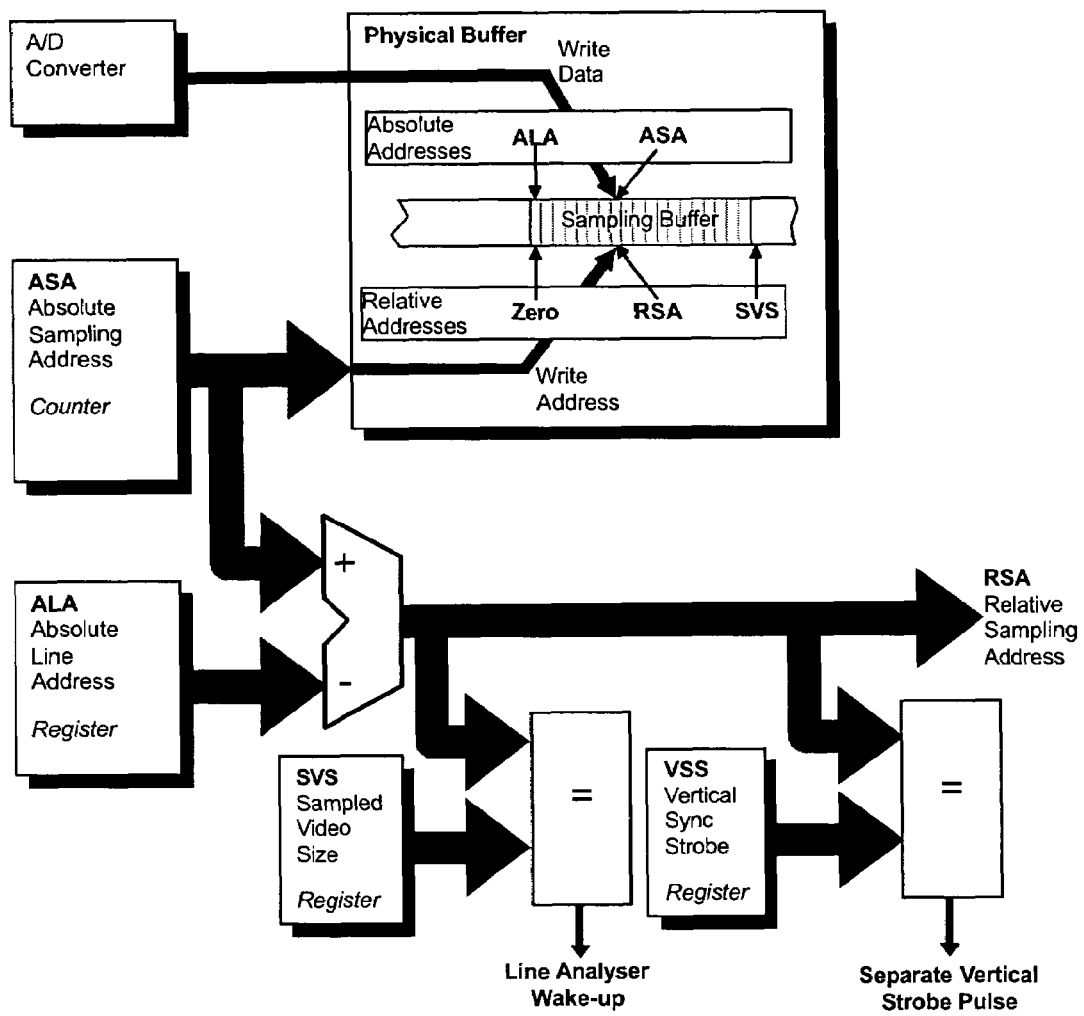
FIG. 14 shows one embodiment of a hardware structure to manage the filling of the front-end memory during acquisition of sampled data from the A/D converter.

The sampling buffer is filled from data digitized using one of the A/D converters. FIG. 14 shows one embodiment of a hardware structure managing filling the front-end memory during acquisition of sampled data from the A/D converter. FIG. 14 shows the relationship of several of the quantities related to sampling that are defined in the above table.

A counter provides the absolute sampling address (ASA), while a register is used to maintain the absolute line address, denoted ALA. The ASA counter provides the write address for the data from the ADC. The register is used to provide for information related to where in a line an absolute address resides, and is a result of line analysis. When sampling, the ADC blindly samples and writes information into the front-end memory at the absolute address.

The relative sampling address (RSA) indicating where on a line a particular sample is. This is used later (see below), and is computed from the ASA and the ALA.

The line analysis wake up is a condition described in more detail below.

Separate Horizontal Synchronization

The front-end memory may hold several video signals as corresponding sampling buffers. Thus, multiple sampling buffers may be written into. The above-described addressing structure is common for each of the sampling buffers. One embodiment shown in FIG. 11 provides for up to four sampling buffers, as would be required for managing an RGB industrial camera with separate horizontal synchronization. The number of sampling buffers may change in different embodiments.

Separate Horizontal Synchronization

In some cases, horizontal synchronization information is provided in the form of digital pulses on a separate line. One aspect of the invention is that such synchronization information is sampled and digitized into the front-end memory into a sampling buffer exactly as if it was a video signal.

Luminance Level Encoding

In one embodiment, video levels are handled with accuracy higher than provided by the A/D converters in the course of the digital processing of the data. In the preferred embodiment, video level data are treated as 16-bit numbers, to be understood as a fixed-point fractional numbers, the integer part of which corresponds to the dynamic range of the digitizing process, e.g., 10 bits, while the remaining bits provide the fractional part, e.g., 6 bits.

Line Analysis

Introduction

Line analysis is now described in more detail. One embodiment carried line analysis line by line. As such, in one embodiment, a sampled video line forms a unit of information that is analyzed according to a set of predefined rules.

The line analysis process is triggered each time a video line is sampled and acquired in raw form in the front-end memory. A wake-up signal triggers the line analysis.

In one embodiment, line analysis includes checking that the stored line meets all conditions required to ensure correct rendering of the pictorial information contained therein. In one embodiment, a stored (acquired) video line that is determined to have characteristics not good enough for a safe decoding is rejected. In one embodiment, software operating on the host computer "host software" controls operation of the frame grabber, and in such an embodiment, the condition that a video line was rejected is reported to the host software.

In an alternate embodiment, e.g., when an embodiment is working as a multimedia decoder, such reporting does not occur. Rather, in order to maximize the chance of obtaining "some" "readable" image, data is processed even if it means tolerating some imperfection, such as pixel losses or horizontal and vertical shifts. For example, in the surveillance application, it is important to maintain as much of the data as is available. One feature of the line analysis process is that horizontal synchronization may be gained in as little as one or two lines. Suppose for some reason, there is loss of signal quality of a couple of lines, e.g., loss of signal quality as might occur if the video signals are transmitted wirelessly to the frame grabber. The line analysis process described herein may then determine there is loss of horizontal synchronization and move to a state to regain the horizontal synchronization. If the line analyzer is already in a state wherein it knows the vertical location of each line, when the line analyzer regains horizontal synchronization, the analyzer may know where the line would be vertically, and resumes the state of the data being available for resampling. Of course, those lines for which there was no synchronization, and also those lines that passed while horizontal synchronization was regained, may not be renderable, but there still would be usable video information. In many prior art systems, the decoder would need to wait until the next vertical period before such data is made available, leading to significant loss of part of a frame.

Note that embodiments of the present invention, however, are more likely to be used in a more professional domain where it is required to guarantee the integrity of recovered images, including rejecting any damaged image(s). Thus, one aspect of the invention is preventing any transfer of image data when the analyzer detects that there is an unrecoverable abnormality in the signal.

Line analysis further includes determining the values of a set of variables characterizing the video line being analyzed.

This set of variable forms the line record for the line. The line record is later used for building a resampled line.

Relevant Parameters

The following parameter(s) relate to line analysis. Recall in one embodiment, the line analyzer operates under control of a state controller according to a state transition diagram. Some of the line analysis parameters are related to the state transition diagram.

| Line Analysis Parameter | | |
| --- | --- | --- |
| BLK | Blanking measured In levels | Measured value of the black level |
| BLK_Q | Blanking Quantized Not_Applicable, Out, Sync, Blank, Video | Quantized value of the black level |
| BLK_F | Blanking Filtered In levels | Filtered value of the black level |
| TIP_Q | Sync tip Quantized Not_Applicable, Out, Sync, Blank, Video | Quantized value of the blanking synchronization tip level |
| LVD_Q | Level Detect Quantized Not_Applicable, Out, Sync, Blank, Video | Quantized value of the video level in a right part of the line |

Functions

Line analysis carries out different functions for a given video signal while the raw data remains in the sampling buffer. The following is a list of functions that line analysis performs or at least contributes to in one embodiment of the invention: integrity; horizontal lock; vertical lock; offset; gain; color; and wake-up. These are now briefly described. More details are provided later in the description.

An important aspect of line analysis is that it determines parameters related to the video content in the sampling buffer without destroying or even modifying the data in the sampling buffer. Once the information, such as vertical and horizontal location, about the data in the sampling buffer is assured, only then does one embodiment resample the data in the sampling buffer.

Black and Sync Tip Levels

In one embodiment, the line analysis process determines the black level and the sync tip level such that these values can be used for other functions.

Integrity

In one embodiment, the line analysis process is able to ascertain whether the video signal is of sufficient quality ("adequate") for correct decoding according to one or more aspects of the invention.

This ascertaining returns a binary result. Either the video line stored in the sampling buffer is adequate, and the recovery of the image contents therein is performed, or the line analysis process ascertains that the video line is somehow defective according to one or more predefined criteria. In one embodiment, no attempt to recover the image contents is performed in the case of a defective line.

In the case that the line analysis process rejects a line, the line analysis process provides indications on the one or more reasons for rejection, e.g., the one or more criteria that were not met. In one implementation, a software driver interfaces the frame grabber with a software application in the host computer, and the line analysis process provides the reasons for rejection available to the software driver. These reasons are then able to be interpreted by the driver, and reported to the application.

The inventor has carried out simulations, and discovered that embodiments of the invention are able to tolerate relatively high levels of noise and of phase jitter.

Horizontal Lock

Another aspect of line analysis is building knowledge of the horizontal phase of the video line stored in the sampling buffer while the data in the sampling buffer itself is not modified, such that lines may be accurately located. The horizontal phase knowledge uses the black level and sync tip level determined for the raw data.

This horizontal phase knowledge provides for locating data for resampling ("resampled data") with high accuracy and reproducibility.

Vertical Lock

One function of line analysis is detecting the vertical synchronization pulses, whether they are contained in a composite video signal or provided separately as a synchronization logic signal that is separately digitized into the front-end memory.

From the information provided by this detection, line analysis maintains a vertical line counter indexing the video line just acquired. Again, this information about the location of the line in the sampling buffer does not modify the sampling buffer data itself. This counter indexing the video line can be used for various functions, e.g., to provide a signal for when to time multiplex different video sources that are to appear in sequential form in the input line, to reconstruct a video frame with missing data, and so forth.

Offset

Line analysis is responsible for determining ("measuring") the DC level of the video line recorded in the sampling buffer. One or more variables that reflect this measurement is or are maintained. This information is used, for example to determine the horizontal phase. This information also may be used for subsequent use in the post-processing stage (after resampling) to build image information that is correctly located within the dynamic range (the gray-levels). The process is called the offset process.

In one embodiment, the offset process includes DC level restoration (restoration of the black level), commonly called "clamping." The offset process also deliberately applies an offset in the dynamic range, e.g., to implement brightness control.

Gain

In one embodiment, line analysis is also responsible for determining ("measuring") the effective amplitude of the video line recorded in the sampling buffer. One embodiment provides for more than one method to obtain this measurement. The variable reflecting this measurement is maintained for subsequent use in the post-processing stage to recover image information that has been correctly amplified within the dynamic range of gray levels.

The carrying out of such measurements is called the gain process. The gain process solves any issue of automatic gain control (AGC). The gain process also provides for the deliberate application of a luminance gain, e.g., as a contrast control.

Color

In the case of color video data, in one embodiment, line analysis is also responsible for decoding of color composite video signals. This involves the measurement of the phase and the amplitude of any color sub-carrier burst available at the beginning of each video line stored in the sampling buffer. This is called the color process. In one embodiment, the color process includes the measuring of the phase of the burst of color sub-carrier.

In one embodiment, the color process includes applying deliberate saturation and hue controls on the decoded color images.

Note that prior art methods are known for processing color information, so detailed information for performing such color decoding processing is not provided herein.

Wake-Up

The process called the wake-up process concerns re-activation of the line analysis process so that line analysis may be performed on the next video line. Line analysis is so re-activated as soon as the analysis of the present line is fully recorded in the front-end memory. The next video line is a new sampling buffer.

Line Analysis State Transition Diagram

One embodiment of line analysis is controlled by a state controller described by a state transition diagram and implemented by a microcontroller in processing logic 221 (FIG. 2). Those in the art will recognize that alternate embodiments may be controlled by a state machine designed from the state transition diagram described herein and implemented in hardware as part of the processing logic 221. Other embodiments may use more than one programmable controller or some other mechanism.

Introduction

Line analysis is an iterative or recurrent process that uses a set of variables that describes the past history of the video signal being decoded up to and including the currently analyzed line. Performing the line analysis process on a line includes extracting some information from the raw sampled data representing this line, and calculating new values for the set of variables describing the raw data.

In one embodiment, the line analyzer needs the raw data for only one line in order to operate. Thus, only sufficient memory to store one line of data is required, and in alternate embodiments, more may be used.

By the "state" of line analysis is meant a variable characterizing the stage of line analysis of the present line. For each new sampled and recorded line in the front-end memory, the nature of the line analysis function performed depends on the current state of the line analyzer.

As is known, a state controller may be described by a state transition diagram that includes the states and conditions for transition to the next state.

In the embodiment described herein, a variable called PAS (Previous Analysis State) reflects the state of the line analyzer before the state transition, while a variable called NAS (Next Analysis State) reflects the state of the line analysis after the state transition.

STR (State Transition) reflects the output information of the line analysis process, and thus determines the state transition to the next state.

One embodiment of the invention uses a state controller that obeys a state transition diagram adequate for all decoding modes, for interlace or non-interlaced video signals, complying with an official standard, e.g., PAL or NTSC, or not.

State Enumeration

Figure 16:
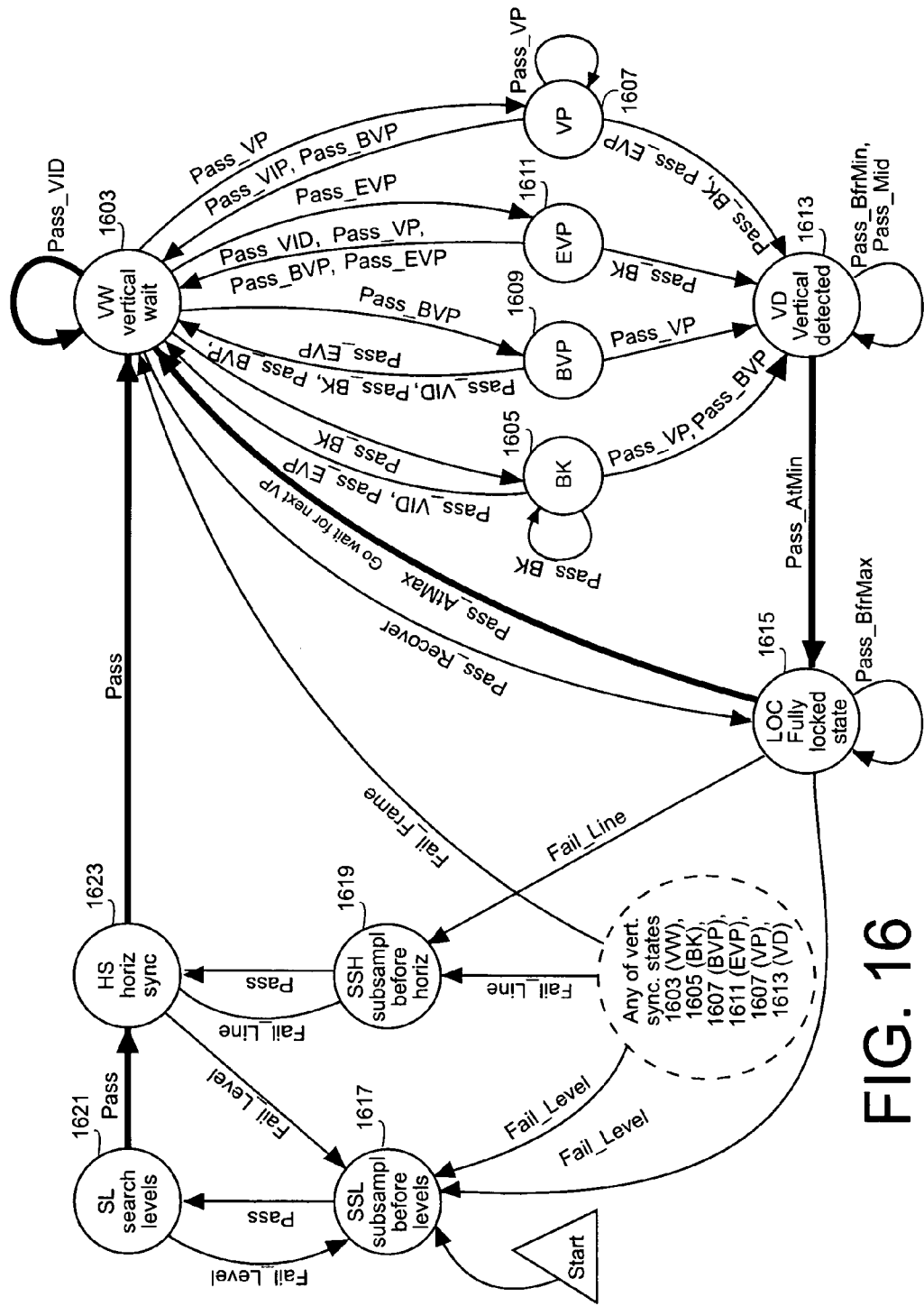
FIG. 16 shows a state transition diagram for state analysis according to one embodiment of the invention.

In one embodiment, the line analyzer has eleven analysis states as enumerated in the following table:

| State | Meaning | Reference in FIG. 16 |
|---|---|---|
| VW | Vertical Wait | 1603 |
| BK | Blanking | 1605 |
| VP | Vertical Pulse | 1607 |
| BVP | Begin Vertical Pulse | 1609 |
| EVP | End Vertical Pulse | 1611 |
| VD | Vertical Detected | 1613 |
| LOC | Full Lock | 1615 |
| SSL | Sub Sampling before Levels | 1617 |
| SSH | Sub Sampling before Horizontal | 1619 |
| SL | Search Levels | 1621 |
| HS | Horizontal Synchronization | 1623 |

Transition State Information

The line analysis reports its conclusion through a 16-bit word stored in a register. FIG. 15 shows the assignment of bits in the state register. In one embodiment, the meanings of some of these codes are as follows:

Wake-Up Code

The Wake-up Code, a 3-bit number in the range of 1 to 6, expresses the way the next line analysis wake-up is conducted. Also shown in FIG. 15 is a mask that can be applied to the register to detect wake-up information.

Fail Bit and Fail Code

The so-called Fail bit is set in the case that line analysis detects a loss of the normal operating conditions. A two-bit code that can take on values 1 to 3, called the Fail Code, is used to report the cause of failure. Also shown in FIG. 15 is a mask that can be applied to the register to detect failure information.

Pass Bit and Pass Code

The so-called Pass bit is a bit in the register set in the case that line analysis completes successfully. A four-bit code that can take on values 1 to 11, called the Pass Code, is used to report the condition at success. Also shown in FIG. 15 is a mask that can be applied to the register to detect successful pass information.

Transition Code

The register also provides a code for one of the possible transitions for each combination of passing or failure. In one embodiment, this is characterized by the 5-bit so-called Transition Code, which assumes values in the range 1 to 26. This field is used because certain transitions are not sufficiently specified by only the preceding Fail and Pass code fields.

State Transition Diagram

FIG. 16 shows the complete state transition diagram for one embodiment of the invention. The functions performed in each of the states are described in detail further in this description. Note that in the state diagram of FIG. 16, each of the so called "vertical synchronization" states VW 1603, BK 1605, BVP 1609, EVP 1611, VP 1607, and VD 1613 includes three fail paths: Fail_Level, Fail_Line, and Fail_Frame whose next states are SSL 1617, SSH 1619, and VW 1603, respectively. Rather than showing each of these set of three paths exiting each individual vertical synchronization state, the three paths are shown only once exiting a state marked with broken line that signifies any of the states VW 1603, BK 1605, BVP 1609, EVP 1611, VP 1607, or VD 1613.

The meaning of some of the variables is summarized below. The following are the pass codes:

| Pass code name | Code value | Meaning |
| --- | --- | --- |
| VID | 1 | Video detected |
| BK | 2 | Blanking detected |
| VP | 3 | Vertical pulse detected |
| BVP | 4 | Begin vertical pulse detected |
| EVP | 5 | End vertical pulse detected |
| BfrMin | 6 | Before minimum line number |
| AtMin | 7 | At minimum line number |
| BfrMax | 8 | Before maximum line number |
| AtMax | 9 | At maximum line number |
| Mid | 10 | Field parity late restore detection |
| Rcovr | 11 | Recover line framing after sync loss |

In addition, the following are pass conditions:

| Term | Condition | Meaning |
| --- | --- | --- |
| Pass_VID | Pass; VID, | Video detected |
| Pass_BK | Pass; BK, | Blanking detected |
| Pass_VP | Pass; VP, | Vertical pulse detected |
| Pass_BVP | Pass; BVP, | Begin vertical pulse detected |
| Pass_EVP | Pass; EVP, | End vertical pulse detected |
| Pass_BfrMin | Pass; BfrMin | Before minimum line number |
| Pass_AtMin | Pass; AtMin, | At minimum line number |
| Pass_BfrMax | Pass; BfrMax, | Before maximum line number |
| Pass_AtMax | Pass; AtMax, | At maximum line number |
| Pass_Mid | Pass; Mid, | Field late restore |
| Pass_Rcovr | Pass; Rcovr, | Framing recovery |

The following are fail conditions, and some of the conditions that lead to the fail conditions:

| Fail code name | Code value | Meaning |
| --- | --- | --- |
| Level | 1 | Level detection not reliable |
| Line | 2 | Line detection not reliable |
| Frame | 3 | Frame detection not reliable |

| Term | Setting of Pass bit and code | Meaning |
| --- | --- | --- |
| Fail_Level | Fail; Level | Level loss |
| Fail_Line | Fail; Line | Line synchronization loss |
| Fail_Frame | Fail; Frame | Frame synchronization loss |

The following are Wake up codes, and some of their meanings:

| Fail code name | Code value | Meaning |
| --- | --- | --- |
| Same | 1 | No buffer progression is needed |
| Sameshift | 2 | Scan same line, but with offset |
| Next | 3 | Wake up with next line |
| Nextshift | 4 | Wake up with one sync shift |
| Estimate | 5 | Estimated wake up required |
| Exact | 6 | Exact wake up required |

| Term | Setting of Fail bit and code | Meaning |
| --- | --- | --- |
| Fail_Level | Fail; Level | Level loss |
| Fail_Line | Fail; Line | Line synchronization loss |
| Fail_Frame1 | Fail; Frame | Frame synchronization loss |

The following are State transition codes, their names and some of their meanings:

| Name | Code | Condition | Wake-up |
| --- | --- | --- | --- |
| SS_Systematic_Pass | 1 | Pass | Same |
| SL_No_Valid_Peak | 2 | Fail_Level | Estimate |
| SL_No_Signal_Decrease | 3 | Fail_Level | Estimate |
| SL_Levels_Out_Of_Specs | 4 | Fail_Level | Estimate |
| SL_Acceptable_Levels | 5 | Pass | Same |
| HS_Sync_Size_Drift | 6 | Fail_Level | Estimate |
| HS_No_Sync_Found | 7 | Fail_Line | NextShift |
| HS_Acceptable_Pulse | 8 | Pass | Next |
| VS_Line_Rejected | 9 | Fail_Level | NextShift |
| VS_Levels_Out_Of_Specs | 10 | Fail_Level | NextShift |
| VS_No_Sync_Edge | 11 | Fail_Line | Estimate |
| VS_Invalid_Line_Detected | 12 | Fail_Frame | Exact |
| VW_Blanking_Detected | 13 | Pass_BK | Exact |
| VW_Video_Detected | 14 | Pass_VID | Exact |
| VW_Inside_Vertical | 15 | Pass_VP | Exact |
| VW_Begin_Vertical | 16 | Pass_BVP | Exact |
| VW_End_Vertical | 17 | Pass_EVP | Exact |
| VW_Framing_Recover | 18 | Pass_Rcovr | Exact |
| VD_Middle_Edge | 19 | Pass_Mid | Next |
| VD_BfrMin | 20 | Pass_BfrMin | Exact |
| VD_AtMin | 21 | Pass_AtMin | Exact |
| LOC_Line_Rejected | 22 | Fail_Level | SameShift |
| LOC_Levels_Out_Of_Specs | 23 | Fail_Level | SameShift |
| LOC_No_Sync_Edge | 24 | Fail_Line | Estimate |
| LOC_BfrMax | 25 | Pass_BfrMax | Exact |
| LOC_AtMax | 26 | Pass_AtMax | Exact |

Parallel Operation

In theory, there are as many line analyzers as there are sampling buffers, and thus, ADCs, e.g., as there are cameras or other video sources. However, that does not necessarily mean that there physically need be that number of physical line analyzers with each line analyzer affected at each input. In one embodiment, a plurality of line analyzers uses a single programmable processing system implemented by as many units as there are active cameras.

The processes of line analysis are described in more detail further in the document.

Line Analysis Functions

The various functions performed in line analysis are now described.

Sub-Sampling Functions in Line Analysis

One aspect of the invention is that some line analysis functions are performed on down-sampled data rather than on the data in the sampling buffer in the front-end memory. This reduces the computational load on these line analysis functions. This sub-sampling section describes function performed by the line analysis process when line analysis is in one of the following states: SSL 1617 (Sub-sample before Level search) in which a reduced set of data lines is prepared for level searching, and SSH 1619 (Sub-sample before Horizontal) in which a reduced set of video data is prepared for horizontal synchronization.

The down-sampled data for the functions performed on sub-sampled data rather than on raw data is stored locally, e.g., in the memory of the processing and signal logic (the FPGA).

The information reduction ratio is denoted CPS for Coarse Period Size. CPS in turn is defined by a parameter denoted CPN for Coarse Period Number of bits.

$$CPS=2^{CPN}.$$

The sampling buffer is split into contiguous packets made up of CPS samples. One embodiment of the invention performs sub-sampling by summing the data for each packet, then truncating the result to CPN bits. In this manner, the resulting data have the same dynamic range as the original raw sampled data, i.e., ASN bits (the Analog Sampling Number of bits).

In one embodiment, one of the subsequent line analysis functions is level searching which includes histogram analysis on the sub-sampled data in order to find some important levels present in the data, e.g., the black level and the sync tip level. This is carried out in the "search levels" state (see below). One result of such histogram calculation is that only a part of the dynamic range is kept, namely the most significant bits denoted by CSN (Coarse Sampling Number of bits). The correspondingly kept number of levels is denoted by CSL (Coarse Sampling Levels).

$$CSL=2^{CSN}.$$

Note that ASN=CPN+CSN.

The inventor has found that it is sufficient to link the size CPN and CSN to the sampling depth ASN. The relation is ASN=CPN+CSN. Thus, in one embodiment, ASN-CSN bits are ignored in the process of approximating the dynamic range. This quantity is denoted CoarseN.

Note that CoarseN equals CPN. Thus this value expresses the granularity of the approximation, both in the time and dynamics axis.

The following quantities are provided as one example that the inventor found works. For ASN=10 bits (ASL=1024), CPN=4 (CPS=16), and CSN=6 (CSL=64). For this example, for a 1024-sample video line, the raw data occupy 10240 bits (1024×10), the sub-sampling function produces 640 bits (64× 10), and coarse data for the histogram occupy 384 bits (64×6).

The analysis performed during the sub-sampling state results in the following transition code and wake-up condition.

| Result | Transition code | Wake-up | Description |
| --- | --- | --- | --- |
| Pass | SS_Systematic_Pass | 1 Same | This analysis never fails |

The variables updated by the sub-sampling functions are reassembled as described in the following table.

| Name | Description |
| --- | --- |
| LowResLine | Array of positive 16-bit fixed-point items containing the sub-sampled data. Items compliant with the sampling level coding convention. The fractional part of each item is zero. |

Note that in one embodiment, the LowResLine is stored in the local memory, e.g., memory of the processing logic 223 (FIG. 2), and is now used for both level analysis to find initial values of the black level and the sync tip level, and then for the horizontal synchronization function of locating the trailing edge.

Levels Searching in Line Analysis

This Section defines the functions performed when the line analysis is in the following state called Search Level (SL 1621), also called level analysis, wherein a histogram is formed and analyzed to determine some important levels in the data: the black level and the sync tip level.

Referring to the state transition diagram of FIG. 16, the SL state 1621 occurs relatively early in line analysis. At this stage, in one embodiment, the accuracy of the returned values is not necessarily high. These possibly relatively inaccurate values are obtained before any attempt to recover temporal synchronization.

This aspect of the invention allows for the input data to have any arbitrary black (blanking) level and sync tip level, with no clamping needed on the input to restore DC levels. Prior art systems, typically, first perform clamping to restore DC levels. The level analysis function permits arbitrary scaling in the data.

The obtained values of the black and sync tip levels are subsequently used for detecting the horizontal synchronization pulse and determining the horizontal phase.

Note also that in one embodiment, the measured values resulting from SL 1621 are subsequently refined, and maintained, notwithstanding level variations that may occur in the incoming video signal. Such level variations may occur because of electrical noise and because of the AC coupling used in input of the video signals.

The initial measurements are based on the sub-sampled data set provided by the sub-sampling process of the SSL state 1617.

One aspect of the invention is a histogram method used for determining these important black and sync tip levels.

If the level analysis is successful, it updates elements of the line record associated to the currently analyzed line buffer. These elements are denoted Anl.BLK and Anl.TIP for the blanking (BLK) and the sync tip (TIP) levels, respectively. Anl denoted the line record associated to the currently analyzed line buffer.

In one embodiment, both Anl.BLK and Anl.TIP are expressed as 16-bit fixed-point numbers according to the convention relative to luminance level encoding. The initial measurement reports the black (blanking) level and sync tip level measurements over the CSN most significant bits. Values are accurate within 1/64 of the dynamic range of sampling.

When the level analysis process is unsuccessful, the SSL sub-sampling state 1617 is resumed with a wake-up instruction that will apply sub-sampling to a new set of data further in the front-end memory. However, the inventor has found that the level analysis (SL 1621) process is fairly robust. Unsuccessful level analysis only happens when the signal is excessively noisy.

When an inconsistency occurs in any state of the line analysis process concerning the black (blanking) level and/or sync tip levels, line analysis will leave that current state with a resulting Fail_Level condition and resume the SSL state 1617.

Level Analysis Output

The following table shows the transition codes and wake-up conditions that are issued at the end of the SL state 1621 according to the results of the level analysis performed in the SL state 1621.

| Result | Transition code | | Wake-up | Description |
|---|---|---|---|---|
| Fail_Level | SL_No_Valid_Peak | 2 | Estimate | The histogram exhibits |
| | SL_No_Signal_Decrease | 3 | | no recognizable level peaks |
| | SL_Levels_Out_Of_Specs | 4 | | The detected levels are not acceptable |
| Pass | SL_Acceptable_Levels | 5 | Same | Level are recognized as acceptable |

Variables updated by level analysis performed in the SL state are shown in the following table.

| Name | Description |
|---|---|
| AnlBlack | A global variable reflecting the currently reliable black level. Same dynamic range as sampled data. Initialized from Anl.BLK. |
| AnlSyncTip | A global variable reflecting the currently reliable sync tip level. Same dynamic range as sampled data. Initialized from Anl.TIP. |
| Anl.LevelKnown | A flag reflecting acceptability of AnlBlack et AnlSyncTip. Member of the current line record. |
| Anl.BLK | A Measured black (blanking) level. Implementing the sampling level encoding. Only the CSN most significant bits are updated. Member of the current line record. |
| Anl.TIP | A measured synchronization tip. Implementing the sampling level encoding. Only the CSN most significant bits are updated. Member of the current line record. |

Principles of Level Analysis in the SL State 1621

In the SL state 1621, no prior knowledge about the DC level of the incoming video signal is available. Similarly, there is no clue on the synchronization amplitude or on the horizontal phase. One aspect of the invention is that each line analysis process deals with a video line made of a nominal number of samples. Even for a line randomly picked off the video stream, the timing stability of video signals provides confidence that such a line contains a synchronization pulse, as well as a significant portion at the black level.

Figure 18:
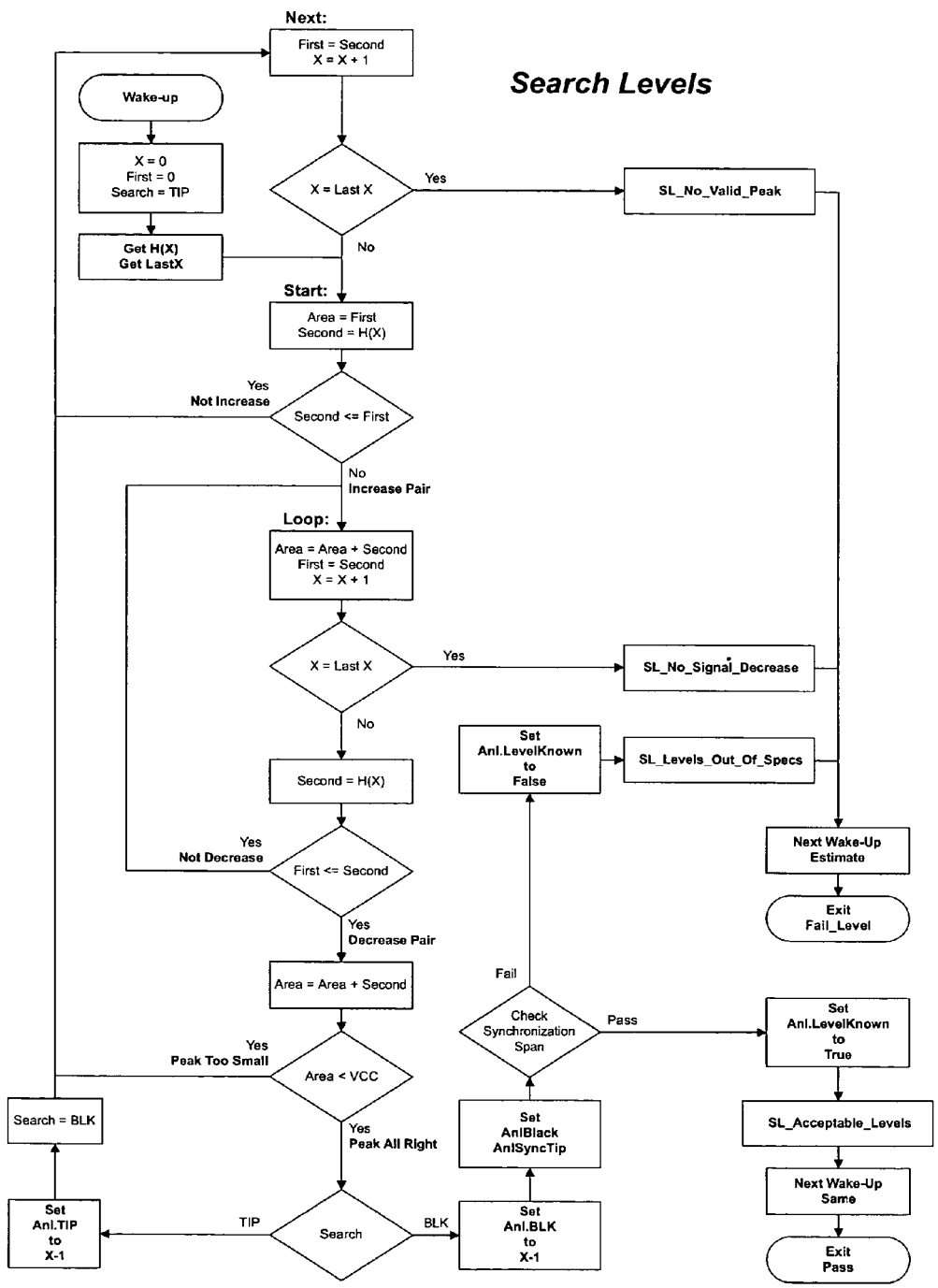
FIG. 18 shows a flow chart of one embodiment of the search levels process that provides s level analysis method that determines the black level and sync tip values.

FIGS. 17A-17D show four possibilities of what may be available in a line record. Each figure shows one example of a sampling buffer. In each case, a recorded lines contains a sample at the blanking value and a sample at the sync tip value. Histogram analysis according to an embodiment of the invention provides for determining these two values Level Analysis Flow Chart FIG. 18 shows a flow chart of one embodiment of the level analysis method that determined the black level and sync tip values. The count is denoted H, and the level value is denoted by X. The histogram maps the count H for each level value X. The method scans the histogram starting from the zero value searching for peak values according to a leaking criterion. In one embodiment, the histogram analysis is carried out on the sub-sampled data kept in local memory, e.g., in the local memory of the processing logic 223 (FIG. 2)

Progression in the search continues as long as the successive counts remain identical (possibly zero). The start of a peak is assumed as soon as two successive counts form a pair of increasing numbers. The counts are the accumulated, including the first one of the increasing pair.

The method starts with a first pair element arbitrarily set to an initial value, zero in this embodiment, allowing the detection of a sync tip level saturating to zero.

In one embodiment, the peak detecting criterion is that the end of a peak is assessed when two successive counts form a pair of decreasing numbers. At this time, the cumulated counts, including the second one of the decreasing pair, is considered as the width of the peak, i.e. the number of samples contributing to the peak.

In one embodiment, the peak is retained when its width is at least equal to a value denoted VCC (Valid Coarse Count). This value is computed automatically as a function of sub-sampling conditions.

The first retained peak forms the sync tip station. A measurement of the sync tip level in one embodiment is defined as the value corresponding to the first element of the decreasing pair.

The cumulated value is now set again to zero and the peak search method is repeated to search for the next peak, forming the determined black level.

Denoting by HPD_P the half-width of the nominal synchronization duration, expressed as a number of sampling periods, and CPS as the sub-sampling period, VCC is given by:

$$VCC=[(HPD\_P/CPS)+2].$$

The reader is referred to the Section titled "Tasks common to several states in line analysis" dealing with tasks common to several line analysis states for how reliable levels are managed according to one or more aspects of the invention.

Horizontal Synchronization Functions During Line Analysis

After the search level state succeeds in determining initial values of the black level and sync tip level, the line analysis process uses these values to detect a horizontal synchronization pulse, and determine the location of such a pulse.

This section defines the functions performed when the line analysis is in the Horizontal synchronization (HS) state 1623 wherein the horizontal pulse is searched for and the phase measured.

As soon as the approximate knowledge of the black and sync tip levels is acquired in the SL state 1621, a measurement of the horizontal phase is performed. A number of samples, a few more than on a line, e.g., a line's worth plus half a sync-pulse's worth is searched. This amount of data is taken to ensure that there is a falling sync pulse edge in the data. The location of the sync pulse's falling edge is then determined.

In one embodiment, the result of horizontal phase measurement is stored in a element denoted Anl.TSE_P the line record associated with the currently analyzed line buffer (the record is referred to by the name Anl) with TSE_P denoting the measured location (in pointing units) of the edge of the trailing synchronization pulse from the start current sampling buffer. This line record element has a data type of a scanning pointer.

In one embodiment, the inventor decided that searching for horizontal synchronization can use the same sub-sampled buffer LowResLine as was scanned in the level analysis (SL) state 1621. That is, in one embodiment, the horizontal phase is determined using the sub-sampled data in LowResLine rather than the full resolution raw data in the sampling buffer. The measurement returns a value exhibiting a temporal uncertainty of a number, denoted CPN, of samples. The main reason the low-resolution array, typically locally stored, is searched is computational speed, and alternate embodiments of the invention may conduct this search in the full resolution sampling buffer.

Note that later on in analysis, the synchronization position is refined, and then filtered in order to improve robustness against electrical noise and phase jitter that possibly perturb the signal.

The detection of the synchronization edge uses the measurements held in the global variables AnlBlack and AnlSyncTip reported by the level analysis process just completed. Recall these global values reflect the currently reliable black level and initially are the values Anl.BLK and Anl.TIP from the level analysis process.

In one embodiment, to determine the location of the horizontal sync pulse, a threshold operation is carried out using a threshold level halfway between the reported AnlBlack and AnlSyncTip.

The completion of horizontal synchronization detection delivers an updated measurement for the black and sync tip levels that in general is more accurate than before. The elements Anl.BLK and Anl.TIP of the current line record are accordingly updated. If these new measures are accredited, the global variables AnlBlack and AnlSyncTip also are updated The steps described below aim at waiting for a vertical synchronization to occur, while maintaining the horizontal synchronization as accurately as possible.

Starting with the SL state 1621 as the initiating step, this forms the phase maintenance process.

Note that when level analysis is unsuccessful, the system resumes a state of forming a new set of sub-sampled data. Depending on the severity of the loss, the next state is either the SSL state 1617 that will result in the new sub-sampled data used for searching for new initial levels for black and the sync tip, or the SSH state 1619 wherein the previously determined initial black and the sync tip levels are used for searching for the horizontal phase (see the flow chart of FIG. 16).

Horizontal Synchronization Output

According to the results of the line analysis performed in the horizontal synchronization state, the following transition codes and wake-up conditions are issued.

| Result | Transition code | Wake-up | Description |
|---|---|---|---|
| Fail_Level | HS_Sync_Size_Drift | 6 Estimate | The detection levels cannot be used to evaluate the horizontal phase |
| Fail_Line | HS_No_Sync_Found | 7 NextShift | No acceptable synchronization detected |
| Pass | HS_Acceptable_Pulse | 8 Next | Acceptable synchronization detected |

The following table describes the variables that are updated by the horizontal synchronization functions.

| Name | Description |
|---|---|
| AnlBlack | Global variable reflecting the currently reliable black level. Same dynamic range as sampled data. Initialized from Anl.BLK. |
| AnlSyncTip | Global variable reflecting the currently reliable sync tip level. Same dynamic range as sampled data. Initialized from Anl.TIP. |
| Anl.LevelKnown | Flag reflecting the acceptability of AnlBlack & AnlSyncTip. Line record element of the current line record. |
| Anl.BLK | Measured black level. Implementing the sampling level encoding. Updated to an integer value. Line record element of the current line record. |
| Anl.TIP | Measured synchronization tip. Implementing the sampling level encoding. Updated to an integer value. Line record element of the current line record. |
| Anl.TSE_P | Measured location of trailing synchronization edge. Implementing the scanning pointer encoding. Updated to integer value. Line record element of the current line record. |

Measuring Principle for Horizontal Synchronization

Figure 19A:
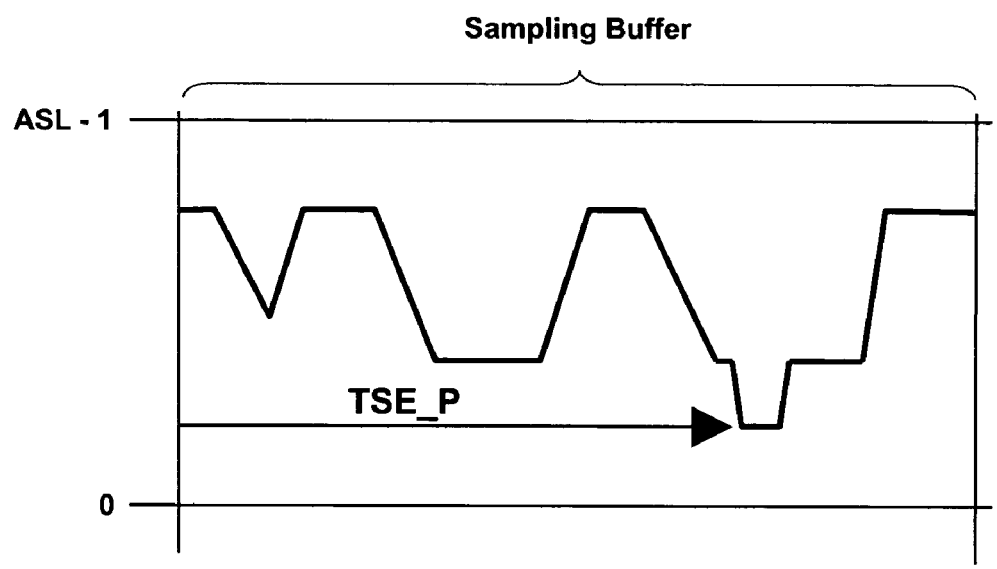
FIG. 19A shows, as a simple example, a sampling buffer with sub-sampled data, without any phase synchronization, as an exemplary starting point of the horizontal synchronization process.

FIG. 19A shows, as a simple example, the starting point of the horizontal synchronization process: a sampling buffer with sub-sampled data, without any phase synchronization. The sampling buffer was previously recorded for a duration corresponding to a standard video line. It is assumed that the video data includes a horizontal synchronization pulse.

As an aside, note that this assumption may need to be amended for the case of vertical synchronization, and their procession of equalizing and broad pulses.

Referring back to FIG. 19A, the pulse edge location is measured and recorded as a quantity denoted TSE_P.

Figure 19B:
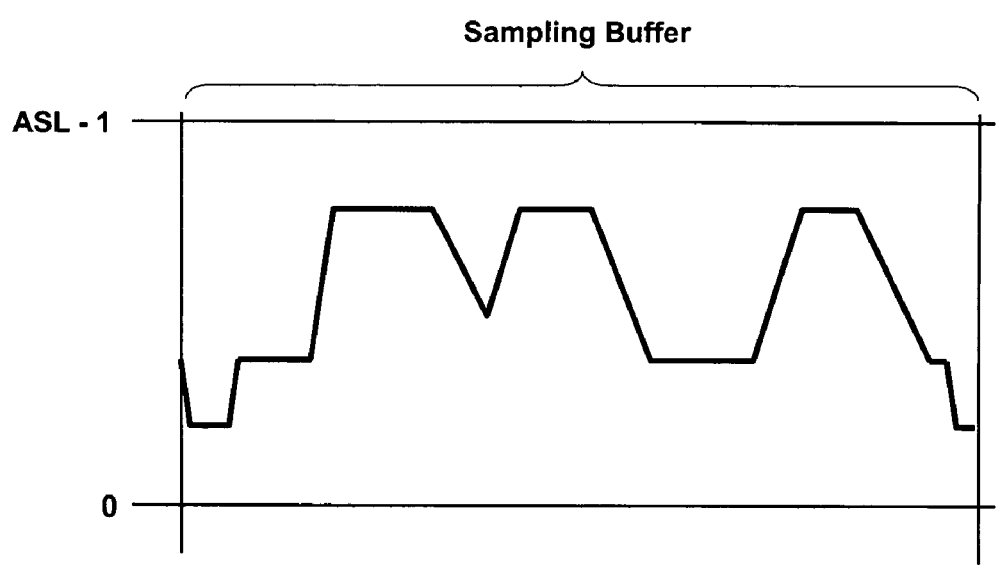
FIG. 19B shows how a pulse edge measurement (TSE_P) is used to adjust the starting point to ensure that the next sampling buffer exactly encompasses a video line, according to an aspect of the invention.

FIG. 19B shows, as a simple example, how a pulse edge measurement (TSE_P) is used to adjust the starting point to ensure that the next sampling buffer exactly encompasses a video line. The initial part of the sampling buffer shown in FIG. 19B contains a full horizontal synchronization pulse (called leading synchronization). The last sample of the sampling buffer is located in the tip of the next synchronization pulse (called trailing synchronization).

The inventor has found in simulation that it takes as little as one line to achieve horizontal synchronization, even when the horizontal synchronization pulse is lost, although such a loss typically results in recovery after two or three lines.

Horizontal Synchronization Flow Chart

Figure 20:
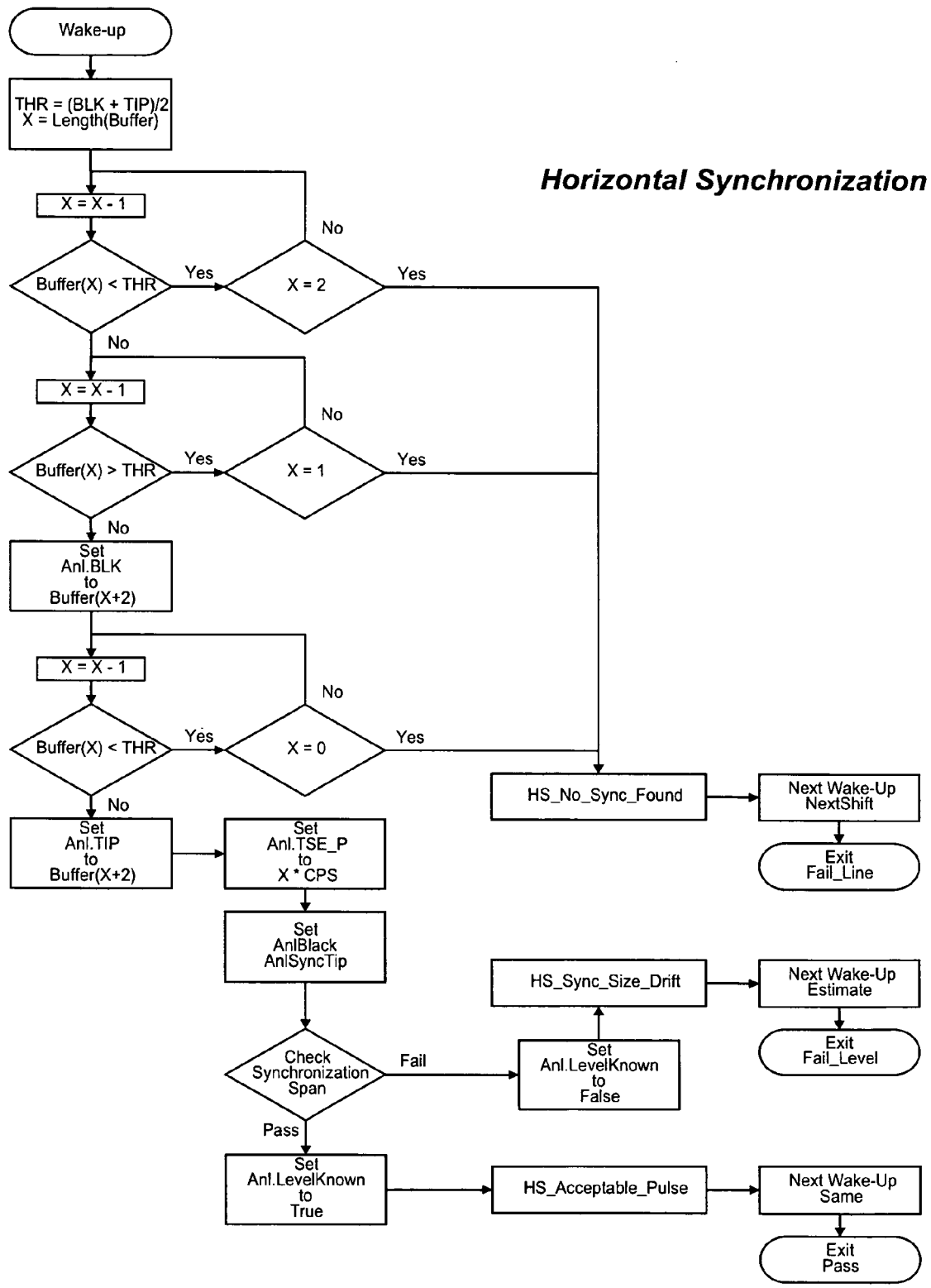
FIG. 20 shows a flow chart of one embodiment of the horizontal synchronization process of the overall line analysis process.

FIG. 20 shows a flow chart of one embodiment of the horizontal synchronization process of the overall line analysis process. Aspects are described below.

Searching a Significant Transition in Horizontal Synchronization

In one embodiment, the horizontal synchronization detection process scans the sub-sampled buffer from right to left. The buffer has the full dynamic range ASL. A threshold defined to be halfway between AnlBlack and AnlSyncTip is considered, and any level above the threshold is regarded as a non-synchronization level, and called "blank." Any level below the threshold is considered as a synchronization level, called "sync." Starting from the previous sample, the method scans the buffer until reaching a "blank" level. This can happen immediately. From there, the method scans the buffer leftwards until reaching a "sync" level. The value of the location immediately to the right of the reached sync level is retained as Anl.BLK.

From there, the method scans the buffer leftwards until reaching a "blank" level. The value of the location immediately on the right of the reached blank level is retained as Anl.TIP.

If, in the course of scanning the buffer, the left end of the sub-sampled buffer is reached, the analysis is interrupted and returns Fail_Line. Otherwise, it is assumed that a full horizontal synchronization pulse was located in the video data. The stop location is an approximate measurement of its leading edge, and is retained in Anl.TSE_P.

Note that in one embodiment, the method does not distinguish between equalizing pulses, broad pulses and "true" horizontal synchronization pulses.

Note further that the flow chart and method described provide one method for locating the horizontal synchronization pulse. Of course, those in the art will understand that many variations are possible. What particular method is used to search the buffer, and even which buffer is searched is not a limiting factor of the invention.

Figure 21A:
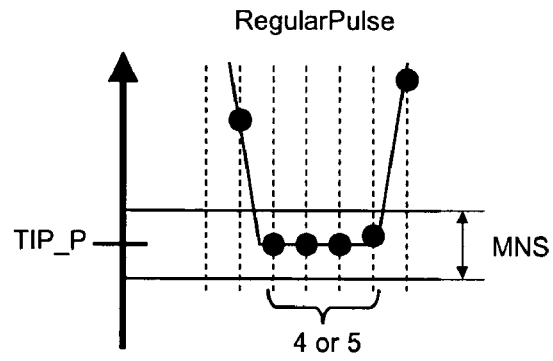
FIG. 21A, FIG. 21B, and FIG. 21C respectively show by way of simple examples, a regular horizontal synchronization pulse, an equalizing pulse, and a broad pulse, and how an embodiment would count the number of samples within the range MNS around TIP_P to classify which type of pulse was encountered, according to an aspect of the invention.
Figure 21B:
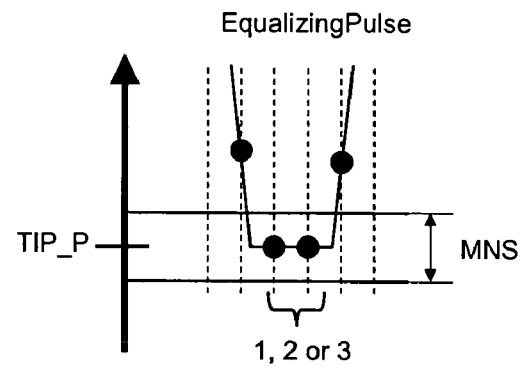
Figure 21C:
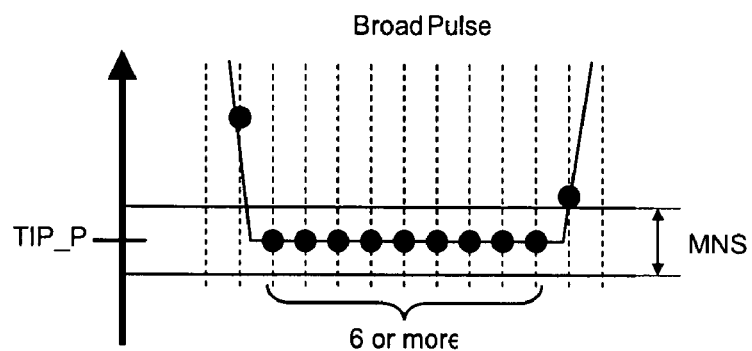

In a simpler alternate embodiment, a check is made to indeed verify that the pulse assumed to be a horizontal synchronization pulse is indeed a synchronization pulse. The length of the synchronization pulse is assessed to determine if it is likely to be an actual horizontal synchronization pulse, or a broad pulse, or an equalization pulse. This is done by counting the number of samples, e.g., samples in the sub-sampled array that are at the approximate sync tip level. Too few a number indicates a likely equalization pulse. It is clearly undesirable to synchronize on an equalization pulse as these occur at twice the line rate. In such an alternate embodiment, it is not desirable or effective to properly horizontally synchronize when one is in the middle of the vertical synchronization region. FIGS. 21A, 21B and 21C respectively show a regular horizontal synchronization pulse, an equalizing pulse, and a broad pulse, and how such a simpler alternate embodiment would count the number of samples within the range MNS around TIP_P to classify which type of pulse was encountered.

Managing Reliability of the Horizontal Synchronization Levels

One embodiment includes updating and maintaining accurate values for the sync tip level. The reader is referred to the section titled "Tasks common to several states in line analysis" dealing with tasks common to several line analysis states for a discussion of such maintenance.

Note that, as can be seen in the state transition diagram, if the horizontal synchronization process (HS state 1623) does not successfully locate a good horizontal sync pulse for horizontal synchronization, the next line's raw data is sub-sampled (the SSH state 1619), and, using the so-far refined black (blanking) level and sync tip level, another attempt is made at horizontal synchronization with the new (sub-sampled) data set.

Note that one of the features of the inventive method is that it typically takes as few as two lines, even one line, or perhaps a few lines to achieve horizontal synchronization to correctly exit the HS state 1623, even with noisy data.

Vertical Synchronization Functions

Once horizontal synchronization is achieved such that the horizontal location of the lines is known, the line analyzer passes to the state of waiting for some vertical "event," such as a vertical banking region, or a vertical synchronization pulse, in order to determine the vertical position and, in the case of interlaced video, the parity of lines. In the waiting state, either regular video lines arrive, or indeed such an event occurs, in which case a set of functions is performed to fully locate the lines in the sampling buffer both in the horizontal and vertical position. A line whose position is so determined is called frame-locked, or fully locked, and is now suitable for resampling to produce desired video output.

This Section defines the functions performed when the line analysis is in one of the following states wherein vertical timing is handled. By a "vertical state" is meant one of the states in the following table that are concerned with vertical positioning/synchronization. This includes the detection of vertical synchronization. FIG. 16 includes the state transition diagram for the vertical states.

| State Name | Meaning and | Description |
| --- | --- | --- |
| VW (1603) | Vertical Wait | Waiting for a line recognized as a vertical timing indicator |
| BK(1605) | Blanking | The line has been recognized as part of the vertical banking region |
| VP(1607) | Vertical Pulse | The line has been recognized as belonging to the vertical synchronization pulse |
| BVP(1609) | Begin Vertical Pulse | The line has been recognized as including the start of the vertical synchronization pulse |
| EVP(1611) | End Vertical Pulse | The line has been recognized as including the end of the vertical synchronization pulse |
| VD(1613) | Vertical Detected | Vertical synchronization ensured, waiting for active lines |

In one embodiment, line analysis proceeds with the waiting for a vertical synchronization event after the horizontal phase has been determined in the HS state 1623. Detecting the vertical synchronization event may include traversing a plurality of the line analysis vertical states (see the state transition diagram).

Line analysis proceeds to the vertical wait (VW 1603) state and remains inside the group of states VW 1603 until the blanking interval is reached (state BK 1605). The line analysis now moves between the states VW 1603 and BK 1605 until a sequence is recognized as a potential indicator of a vertical synchronization pulse. Such recognition uses functions carried out in one of the intermediate states VP 1607, BVP 1609 or EVP 1611.

As soon as a vertical synchronization is assessed, the line analysis remains in the vertical detected.(VD 1613) state while counting lines until a line appears that potentially transports pictorial information. That is, until what is called the "active zone" that includes "active lines" starts.

The result of a vertical synchronization function includes transitioning from one of the vertical states to another vertical state. A successful vertical synchronization function can end with one of nine transition codes. Which of these codes occurs determines the next state according to the state diagram of FIG. 16.

In one embodiment, the vertical synchronization detection process always remains sensitive to anomalies in the video signal. When such anomalies occur, one of the following three failure conditions is reported:

Fail_Level means that the detection levels are judged to no longer be reliable. This brings line analysis back to the level analysis state.

Fail_Line means that the horizontal phase is lost. This brings line analysis back to the horizontal synchronization state.

Fail_Frame means that the line succession is aberrant. This brings line analysis back to the vertical waiting state.

Parameters Relevant to Vertical Synchronization

The parameter LCS (line classification status) indicates the type of line classified during vertical synchronization. Possible values for LCS include Not_Applicable, Reject, OK, VID, BK, VP, BVP, EVP.

Exit Conditions for Vertical Synchronization Process

Depending on the result(s) of the analysis carried out during the vertical synchronization state(s), the following table provides the state transition codes and wake up codes that are issued, according to one embodiment of the invention.

| Result | Transition code name | Wake-up | | Description |
|---|---|---|---|---|
| Fail_Level | VS_Line_Rejected | 9 | NextShift | The type of video line is unrecognizable |
|  | VS_Levels_Out_Of_Specs | 10 |  | The detection levels are no more reliable |
| Fail_Line | VS_No_Sync_Edge | 11 | Estimate | No synchronization edge detected as expected |
| Fail_Frame | VS_Invalid_Line_Detected | 12 | Exact | Inconsistency between line count and detected type |
| Pass_BK | VW_Blanking_Detected | 13 | Exact | Video content recognized |
| Pass_VID | VW_Video_Detected | 14 |  | No significant video content recognized |
| Pass_VP | VW_Inside_Vertical | 15 |  | Inside a vertical synchronization pulse |
| Pass_BVP | VW_Begin_Vertical | 16 |  | Leading part of a synchronization vertical pulse |
| Pass_EVP | VW_End_Vertical | 17 |  | Trailing part of a synchronization vertical pulse |
| Pass_Rcovr | VW_Framing_Recover | 18 |  | Recovering from a previously lost vertical synchronization |
| Pass_Mid | VD_Middle_Edge | 19 | Next | Used in case of late parity detection |
| Pass_BfrMin | VD_BfrMin | 20 | Exact | The active lines have not been reached yet |
| Pass_AtMin | VD_AtMin | 21 |  | The active lines are reached |

Those transition codes whose names start with "VS_" may occur from any of the vertical synchronization states.

Those transition codes whose names start with "VW_" only occur from the state VW 1603, and from the four subsequent states BK 1605, BVP 1609, EVP 1611, and VP 1607.

Those transition codes whose names start with "VD_" only occur from the state VD 1613.

The following table describes those variables that are updated by the vertical synchronization operations that occur in the set of vertical synchronization states. Any variable whose name is preceded by Anl. is an element of the current line record.

| Name | Description |
|---|---|
| WasLocked | Global variable indicating that active lines are entered. Involved in the lock recovery mechanism |
| AnlBlack | Global variable reflecting the currently reliable black level. Same dynamic range as sampled data. Obtained by filtering a few successive values of Anl.BLK. |
| AnlSyncTip | Global variable reflecting the currently reliable sync tip level. Same dynamic range as sampled data. Obtained by filtering a few successive values of Anl.TIP. |

-continued

| Name | Description |
|---|---|
| Anl.LevelKnown | Flag reflecting the acceptability of AnlBlack and AnlSyncTip. |
| Anl.BLK | Measured black level. Implementing the sampling level encoding. Updated with full accuracy. |
| Anl.TIP | Measured synchronization tip. Implementing the sampling level encoding. Updated with full accuracy. |
| Anl.LVD | Measured right hand level. Implementing the sampling level encoding. Updated with full accuracy. |
| Anl.LCS | Classification status of the processed line. Can be Reject, OK, VID, BK, VP, BVP, EVPA. |
| Anl.TSE_P | Measured location of the trailing synchronization edge. Implementing the scanning pointer encoding. Updated with full accuracy. |
| Anl.LSE_P | Measured location of the leading synchronization edge. Implementing the scanning pointer encoding. Valued between 0 and 1 with high accuracy. |
| Anl.LeftEdge | Left limit in the sampling buffer of a window around the synchronization edge. |
| Anl.RightEdge | Right limit in the sampling buffer of a window around the synchronization edge. |

Principles of the Vertical Synchronization Method(s)

The starting point for vertical synchronization is a sampling buffer containing a video line that has been horizontally phased.

In one embodiment, vertical synchronization includes:

Determining the type of the line to direct progression of the line analysis state controller. This contributes to the vertical detection. This is called line classification herein.

Performing a measurement of the location of the edge of the trailing synchronization.

Updating the measurements of the black and sync tip levels, to provide relatively accurate measurements of these levels.

Line Classification

In one embodiment, accurate measurement of the black level is carried out in the black (blanking) region of the sampling buffer of the line. This region is sometimes called the "back-porch." This updates the line record element Anl.BLK of the current line. An additional measurement of a quantity denoted LVD (Level Detection), is conducted in the right part of the active area of the video line and updates a line record element called Anl.LVD of the current line record (Anl).

In one embodiment, the two measurements Anl.BLK and Anl.LVD are quantized into one of a small number of classes using reference thresholds based on values for the black and sync tip levels that are considered reliable. Reliable (reference) values of the black and sync tip levels are held in the global variables AnlBlack and AnlSyncTip.

Quantizing these two levels Anl.BLK and Anl.LVD into one of a small set of classes provides a method of classifying the video line. The result the classifying is recorded in the line record as a line record element called Anl.LCS (Line Classification Status) for the line record Anl.

Locating the Trailing Synchronization Edge

After line classification is completed, a detection process LocateEdge is carried out on the sampling buffer to ascertain the presence and location of a horizontal synchronization edge at the expected location, e.g., near the end of the buffer. In one embodiment, this detection process reports the found edge location as being detected in one of three zones, left, middle, or right, denoted "Left", "Middle", "Right" respectively. In addition, the detection process returns the location of a window of known width within with the detected edge exists. In one embodiment, the detection process defines this window by its left and right positions, and reports this by setting two line record elements, called Anl.LeftEdge and Anl.RightEdge, respectively, for the current line record.

The information reported by the detection process provides for accurately measuring the sync tip level for the trailing synchronization pulse. Such measurement updates the line record element Anl.TIP of the current line record.

At this stage, a level maintenance function is invoked to adjust the global variables AnlBlack and AnlSyncTip according to the latest measurements. In one embodiment, slight temporal filtering is applied to the updating. The consistency of the levels resulting from the filtering also is checked.

At this stage, an edge measuring function is invoked. The edge measuring function calculates the edge location of the trailing synchronization pulse within the window reported by the detection process, using the measured levels. The edge location measurement is recorded in a line record element called Anl.TSE_P for the current line record. In addition, the location of the edge of the leading synchronization pulse is updated in a line record element called Anl.LSE_P using the measurement performed on the previous sampling buffer, retrieved from the line analysis data structure.

The vertical synchronization process now verifies whether or not there indeed has been a vertical synchronization pulse detected. This is indicated by the line analysis being in the state VD 1613.

In the case that vertical synchronization has been detected, the vertical synchronization process returns a value Pass_BfrMin as long as the active area of the image has not been reached, and returns a value Pass_AtMin when the active area has just been reached.

In one embodiment, denote by EMN (Even Minimum line number) in the case of an even field, or by or OMN (Odd Minimum line number) value for an odd field, the first line of the active area. In the case of a non-interlaced video signal, such a signal is made of a single field, referred to as even or odd according to the nature of the vertical synchronization. See the Section "Video Signal Conventions" above, and FIG. 11.

When the vertical synchronization has not been yet detected, as indicated by the line analysis is in one of the non-VD states, namely VW 1603, BK 1605, VP 1607, BVP 1609 or EVP 1611. In this situation, the vertical synchronization process concludes with a report on the type of line as classified and recorded in the line record element Anl.LCS.

Note that there may be some exception conditions that can occur in the course of the processes. These conditions are described elsewhere.

Line Types for Line Classification

One aspect of vertical synchronization is to distinguish the types of video lines (line classification) to determine the "line type". The different line types and how they may be distinguished, are now discussed. One aspect of the invention is that different synchronization and video signals are each blindly digitized and stored for processing as if they are video lines. The line classification process is the part of the vertical synchronization process that identifies these line types.

The Type Denoted VID (For Video)

Figure 22A:
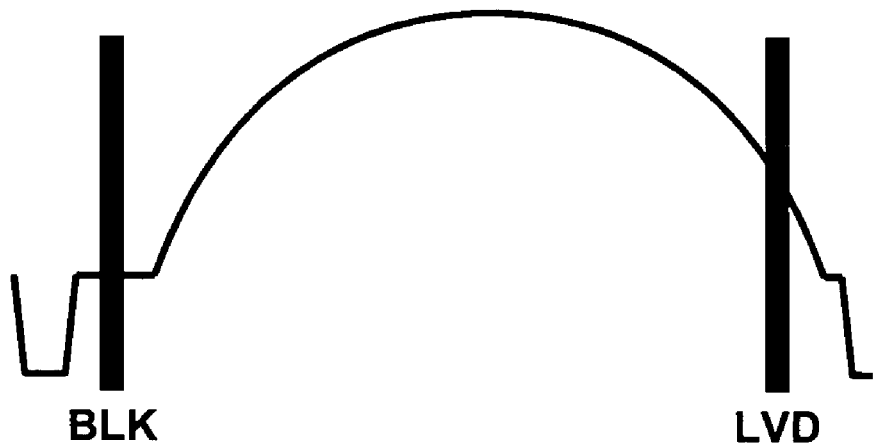
FIGS. 22A and 22B show in simplified form two VID types, a video line carrying luminance information, and a first half line, respectively, in order to illustrate aspects of the invention.
Figure 22B:
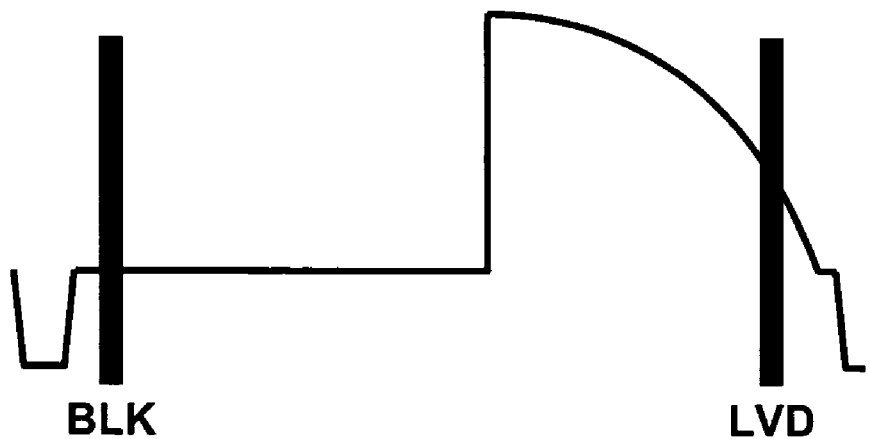

This is video line transporting luminance information, or the first half-line of a line. FIGS. 22A and 22B show two VID types, a video line carrying luminance information, and a first half line, respectively.

The Type Denoted BK (For Vertical Blanking)

Figure 23A:
Figure 23B:
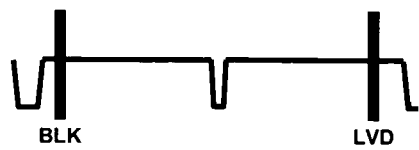
Figure 23C:
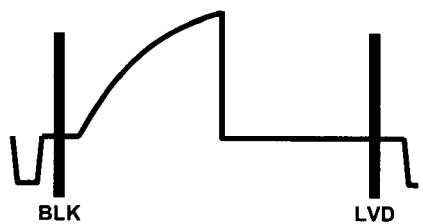
FIGS. 23C and 23D show in simplified form a last half-line and blanking line with and without an equalization pulse, respectively, in order to illustrate aspects of the invention.
Figure 23D:
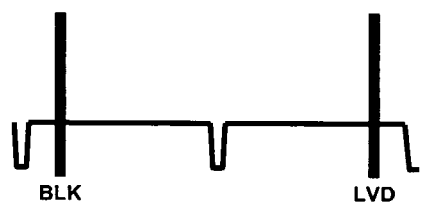

FIGS. 23A and 23B show a video line in the vertical banking region with and without an equalization pulse, respectively, while FIGS. 23C and 23D show a last half-line and blanking line with and without an equalizing pulse, respectively.

The Type Denoted VP (For Vertical Pulse)

Figure 24:
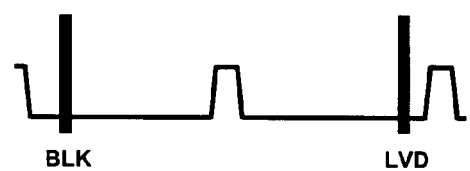
FIG. 24 shows in simplified form data that is inside a vertical synchronization pulse, in order to illustrate aspects of the invention.

FIG. 24 shows data that is inside a vertical synchronization pulse.

The Type Denoted BVP (For Begin Vertical Pulse)

Figures 25, 26:
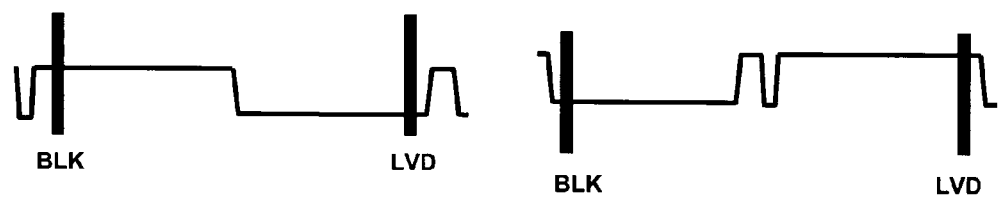
FIG. 25 shows in simplified form data that includes the beginning of a vertical synchronization pulse, in order to illustrate aspects of the invention.
FIG. 26 shows in simplified form data that includes the end of a vertical synchronization pulse, in order to illustrate aspects of the invention.

FIG. 25 shows data that includes the beginning of a vertical synchronization pulse.

The Type Denoted EVP (For End Vertical Pulse)

FIG. 26 shows data that includes the end of a vertical synchronization pulse.

Flow Chart

Figure 27A:
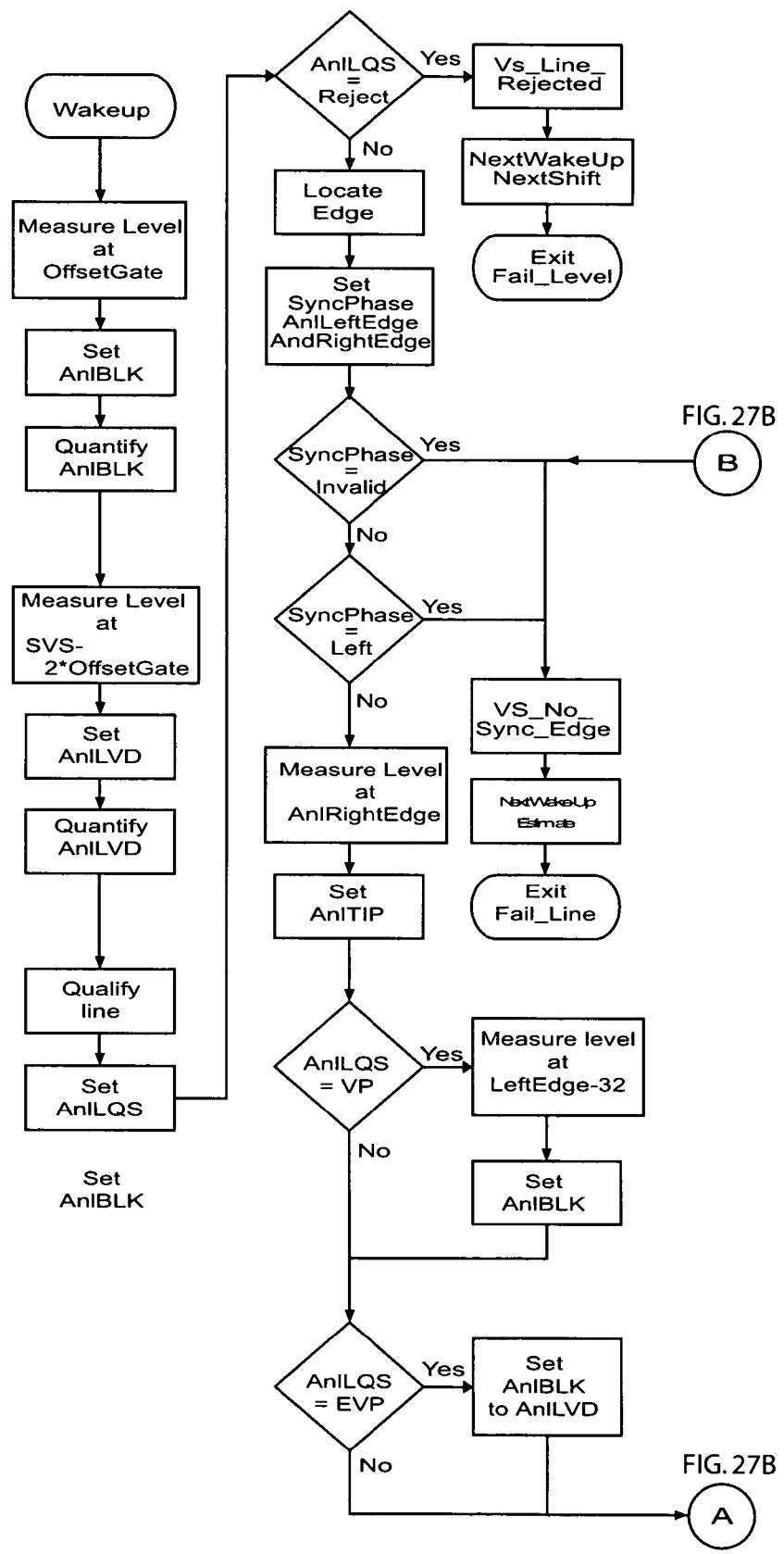
FIGS. 27A and 27B show a flow chart of one embodiment of the vertical synchronization processes that occur in the vertical synchronization states, according to an aspect of the invention.
Figure 27B:
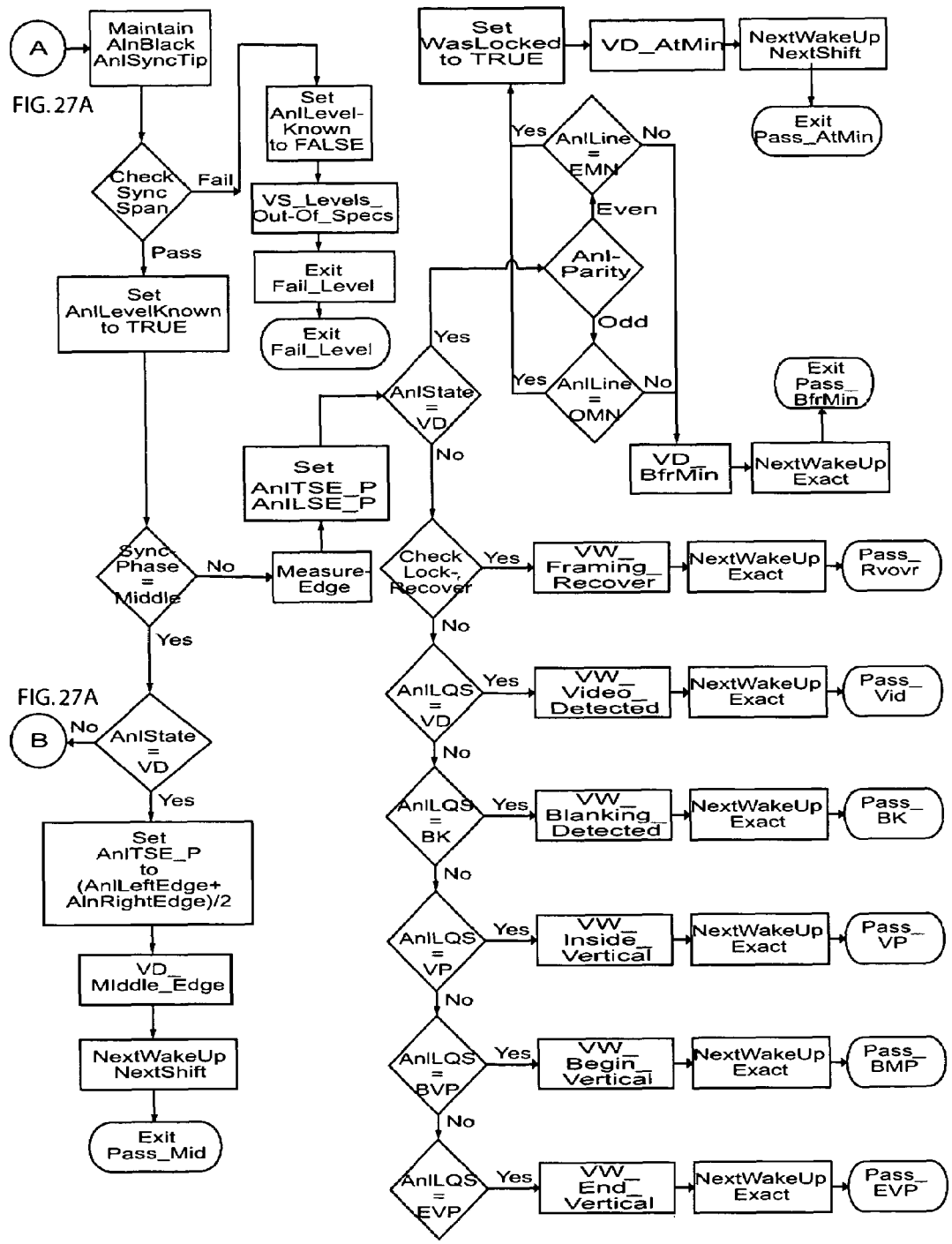

FIGS. 27A and 27B show a flow chart of one embodiment of the vertical synchronization processes that occur in the vertical synchronization states.

Accurate level measurements for vertical synchronization and the management of reliable levels in vertical synchronization are described in the section of this description titled "Tasks common to several states in line analysis" that deals with tasks common to several line analysis states.

Managing Reliable Levels ("Reliable Level Maintenance")

Refer to the section titled "Tasks common to several states in line analysis" dealing with tasks common to several line analysis states.

Quantization of Measured Levels

Refer to the section titled "Tasks common to several states in line analysis" dealing with tasks common to several line analysis states. In one embodiment, the measured levels are quantized into one of four classes that are denoted by: Video, Blank, Sync and Out.

Line Classification

Figure 28:
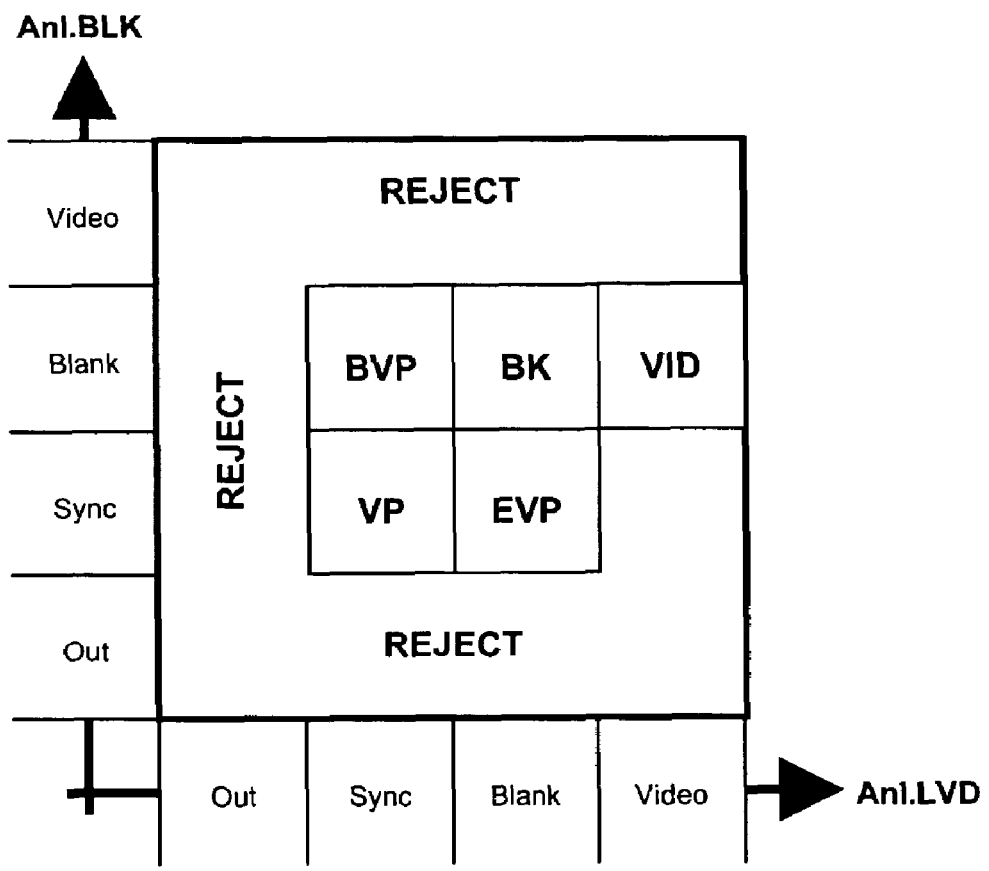
FIG. 28 shows a classification grid for an embodiment of the vertical synchronization, according to an aspect of the invention.

The video line analyzed by the vertical synchronization process is classified from two quantized measurements Anl-.BLK and Anl.LVD into a line type among five possible types. FIG. 28 shows one embodiment of the classification grid. The result of the classification is recorded in a record element denoted Anl.LCS (Line Classification Status) of the current line record.

Locating Horizontal Synchronization Edge and Accurate Measurement of Synchronization Edge Refer to the section titled "Tasks common to several states in line analysis" dealing with tasks common to several line analysis states for each of these tasks.

Special Conditions

Early in its process, the vertical synchronization functions perform two level measurements at the positions given by the nominal values of BLK and LVD. This is a starting point for the recognition of line type.

Note also that the system needs the knowledge of two levels: blanking (BLK) and sync tip (TIP). The black level is effectively known from measurement at the nominal location BLK, except for lines of types VP and EVP. The start of vertical synchronization, as shown in the FIGS. 29A and 29B, shows how values are replaced.

Figure 29A:
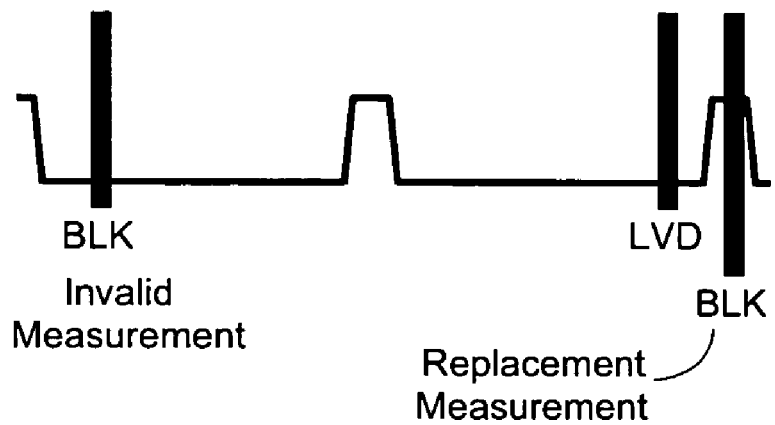
FIGS. 29A and 29B respectively show in simplified form the start of vertical synchronization in two example cases to illustrate how measurement values determined to be invalid are replaced during an embodiment of vertical synchronization.
Figure 29B:
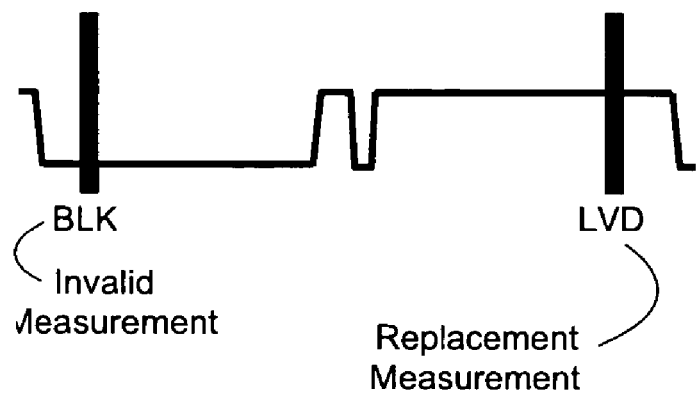

As shown in FIG. 29A, in one embodiment, if the line is recognized as a VP one, a new measurement is conducted on the left side of the located edge. As shown in FIG. 29B, in one embodiment, if the line is recognized as an EVP one, the LVD measurement is recycled as a BLK measurement.

In all cases, the TIP measurement is performed at the right side of the located edge, i.e., in the heart of the detected pulse, irrespective of its equalizing or normal nature.

Late Parity Correction

In one embodiment, the part of the line analysis state controller implementing the vertical synchronization states is able to recognize quickly the occurrence of a vertical interval, and further to establish the vertical interval's parity (even or odd). One embodiment is even able to start the detection process after the beginning of the vertical pulse. In such a case, in one embodiment, the end of the pulse will then be used as a discriminating marker.

Figure 30:
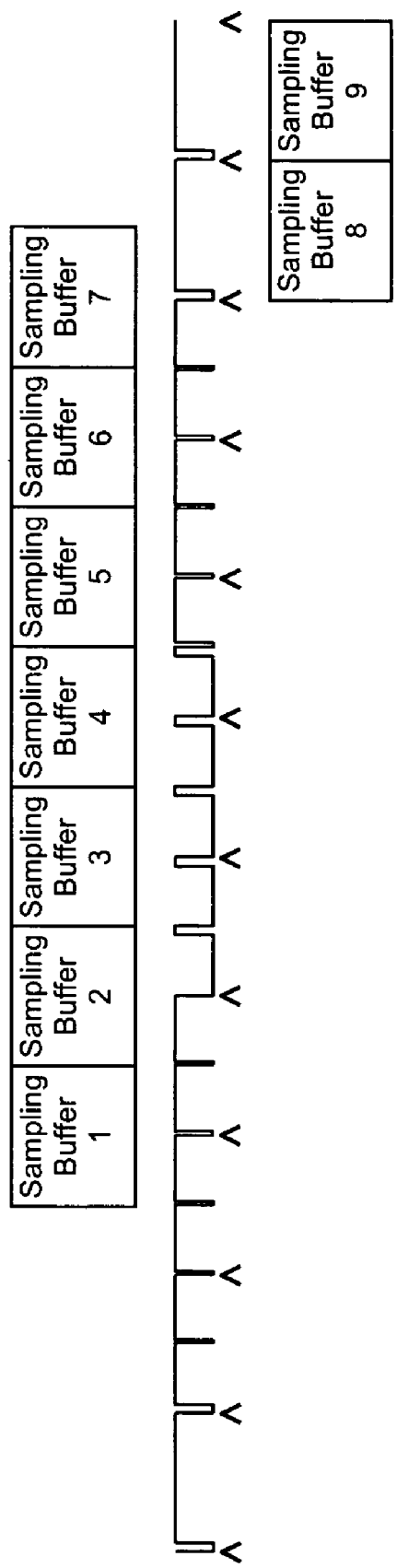
FIG. 30 shows by way of example, the analysis of several lines according to an embodiment of the invention.

When the detection process starts after the beginning of a sequence of equalizing pulses, special attention is needed. It may happen that the line analysis process locks itself on video lines that appear to be consistent, but are actually 50% out of phase. FIG. 30 shows one such situation by way of example, and how one embodiment of the process corrects the situation.

In the example of FIG. 30, the analysis starts with the sampling buffer 1. During the analysis of sampling buffer 2, a BVP line is recognized. The system concludes that an odd field starts. Consequently, the state controller enters the VD state 1613 (Vertical Detected). At each line, the edge location function returns the location of the rightmost synchronization edge. The equalizing pulses lead this function to answer "Right".

At the buffer 7, this function reports "Middle", not "Right". This is a sure indication that the sampling buffers were 50% shifted across the video lines.

In one embodiment, the process then adjusts the wake-up condition for the next sampling buffer in such a way that it becomes correctly phased. The process also adjusts the conventional line number and the parity maintained along the analysis process.

From buffer 8 on, the normal situation is restored, and will remain unless the synchronization gets accidentally lost.

Lock Recovery

In one embodiment, a lock recovery function is invoked at each line. The lock recovery function returning "true," means that the VW state 1603 has been reached following an accidental loss of line synchronization during the fully locked state LOC 1615. This situation can be recovered under certain conditions. See the appropriate part of this description.

Line Analysis Functions During the Fully Locked LOC State 1615

Referring to the state transition diagram of FIG. 16, this section describes functions performed when the line analysis is in the LOC state 1615, according to one embodiment of the invention. In this state, the vertical position of each line, as well as the horizontal phase has been determined, such the data in the sampling buffer is "fully analyzed" and frame locked. Such data may now be resampled.

Thus, the LOC state 1615 is reached as soon as the line corresponding to the number EMN (Even Minimum line number) or OMN (Odd Minimum line number) is reached (condition Pass_AtMin). Being in the LOC state 1615 ensures horizontal and vertical synchronization such that resampling may be performed on the data. The LOC state 1615 is continued until the maximum is reached: until the line corresponding to the number denoted EMX (Even Maximum line number) is reached or the line denoted OMX (Odd Maximum line number) is reached. Once the maximum is reached (condition Pass_AtMax), the line analysis enters the state VW 1603 (Vertical Wait) waiting for the next vertical pulse.

Recall, as an aside, that a non-interlaced video signal is made of a single even or odd field according to the properties of the vertical synchronization pulse.

No vertical pulse is expected to occur during the LOC state 1615. In the embodiment described herein, the presence of such a vertical pulse is not checked for in the LOC state 1615. In an alternate embodiment, the LOC state 1615 includes a detector of vertical pulses, and if a vertical pulse is detected, an error condition is reported.

During the LOC state 1615, in one embodiment, line analysis maintains synchronization, but continues to perform accurate measurements of black and sync tip levels to update these values. For each renewed line in the LOC state 1615, an accurate measurement of the edge of the trailing synchronization pulse is performed.

The measured values for the lines are collected in line records of the line analysis data structure. These are subsequently used to build the information needed for resampling.

In the embodiment described herein, the information built up for resampling includes a variable denoted RAS_P that points to the first active pixel in the line, and a variable denoted DRP_P, that provides the progression increment from pixel to pixel. Note that in the embodiment described herein, RAS_P and DRP_P are not computed by the maintaining lock functions in state LOC, but rather are computed later in resampling using the filtered measure of the duration of line, denoted ELD (Effective Line Duration), and the filtered measure of the leading synchronization pulse, denoted ELS (Effective Leading Synchronization). ELD and ELS result from filtering the values measured by the line analysis process, which will have produced measurement denoted Anl.TSE_P (Trailing Synchronization Edge) for each locked line reported in the line record of the relevant line.

In one embodiment, the measurements determined in the LOC state 1615 offer a way to periodically check the consistency of the applied video signal. If consistency is lost, the LOC state 1615 of analysis returns a fail condition. Two such fail exit conditions exists:

Fail_Level means that the detection levels are no longer reliable, and brings back to the levels searching state.
Fail_Line means that the horizontal phase is lost, and brings back to the horizontal synchronization state.

Analysis Output

According to the results of the line analysis performed in the fully locked state, the following transition codes and wake-up conditions may be issued.

| Result | Transition code | Wake-up | Description |
| --- | --- | --- | --- |
| Fail_Level | LOC_Line_Rejected | 22 SameShift | The type of video line is unrecognizable |
| | LOC_Levels_Out_Of_Specs | 23 | The detection levels are no more reliable |
| Fail_Line | LOC_No_Sync_Edge | 24 Estimate | No synchronization edge detected as expected |
| Pass_BfrMax | LOC_BfrMax | 25 Exact | The active lines have not been exhausted yet |
| Pass_AtMax | LOC_AtMax | 26 | The active lines are exhausted |

Variables updated by the vertical fully locked state (LOC) functions include those shown in the following table. Any variable whose name is preceded by Anl. is an element of the current line record.

| Name | Description |
| --- | --- |
| WasLocked | Global variable indicating that active lines are entered. Involved in the lock recovery mechanism. |
| AnlBlack | Global variable reflecting the currently reliable black level. Same dynamic range as sampled data. Obtained by filtering a few successive values of Anl.BLK. |
| AnlSyncTip | Global variable reflecting the currently reliable sync tip level. Same dynamic range as sampled data. Obtained by filtering a few successive values of Anl.TIP. |
| Anl.LevelKnown | Flag reflecting the acceptability of AnlBlack and AnlSyncTip. |
| Anl.BLK | Measured black level. Implementing the sampling level encoding. Updated with full accuracy. |
| Anl.TIP | Measured synchronization tip. Implementing the sampling level encoding. Updated with full accuracy. |
| Anl.LCS | Classification status of the processed line. Can be Reject, OK, VID, BK, VP, BVP, EVP |
| Anl.TSE_P | Measured location of the trailing synchronization edge. Implementing the scanning pointer encoding. Updated with full accuracy. |
| Anl.LSE_P | Measured location of the leading synchronization edge. Implementing the scanning pointer encoding. Valued between 0 and 1 with high accuracy. |
| Anl.LeftEdge | Left limit in the sampling buffer of a window around the synchronization edge. |
| Anl.RightEdge | Right limit in the sampling buffer of a window around the synchronization edge. |

Operating Principles During the LOC State 1615

During the fully locked state, the sampling buffers contain a horizontally phased video line. The line analysis process knows the conventional number that locates this line. For interlaced video, the field parity also is known.

In particular, the line number is recorded in a global variable called AnlLine, and the parity is recorded in a variable called AnlParity.

In one embodiment, the LOC state 1615 includes performing accurate measurements of the black and sync tip levels. In particular, an accurate measurement of the black level is conducted in the blanking area (sometimes called the backporch). This updates the line record element Anl.BLK of the current line. An accurate measurement of the synchronization tip level is conducted at the beginning of the trailing synchronization. This updates the line record element Anl.TIP of the current line. Locating the measurement(s) uses the detected edge location reported by the analysis in the previous state.

In one embodiment, these are simplified versions of functions performed in the vertical synchronization states.

For example, the measurements Anl.BLK and Anl.LVD are quantized using reference thresholds based on reliable values for the black and sync tip levels. These reliable values are held in the global variables AnlBlack and AnlSyncTip. Quantizing these two levels provides an efficient classification of the video line. The classification result is recorded in the line record element Anl.LCS (Line Classification Status) of the line record. This classification can report a significant degradation of the applied video signal.

At this stage, a level maintenance function is applied to adjust the global variables AnlBlack and AnlSyncTip according to the latest measurements. A slight temporal filter is applied, and the consistency of the levels is checked.

Then the sampling buffer is checked for the presence of a synchronization edge at the expected location, i.e. near the end of the buffer. This detection reports the location as found in one of three areas: "Left", "Middle", or "Right". Moreover, the detection reports the location of a window of known width perfectly encompassing the detected edge. This window is characterized by the line record elements Anl.LeftEdge and Anl.RightEdge of the current line record.

At this stage, the LOC state 1615 includes performing an accurate measurement of the edge location of the trailing synchronization. For this, an edge measuring function is applied that uses the measured levels, and, in the reported window, computes the edge location of the trailing synchronization. The edge location measurement is recorded in the line record element Anl.TSE_P of the current line. The location of the edge of the leading synchronization pulse is updated in Anl.LSE_P from the measurement performed on the previous sampling buffer, retrieved from the line analysis data structure.

In one embodiment, the LOC state method now looks for completion of the active line area. The analysis will return the value Pass_BfrMax as long as active lines are being scanned, and returns Pass_AtMax when analysis leaves the active area. By convention, in this embodiment, the last line of the active area is numbered at a number denoted EMX (Even Maximum line number) for an even field, or OMX (Odd Maximum line number) for an odd field.

Note that exception conditions may occur in the course of the processing in state LOC. These are described elsewhere in this description.

Flow Chart for the Locked State LOC

Figure 31:
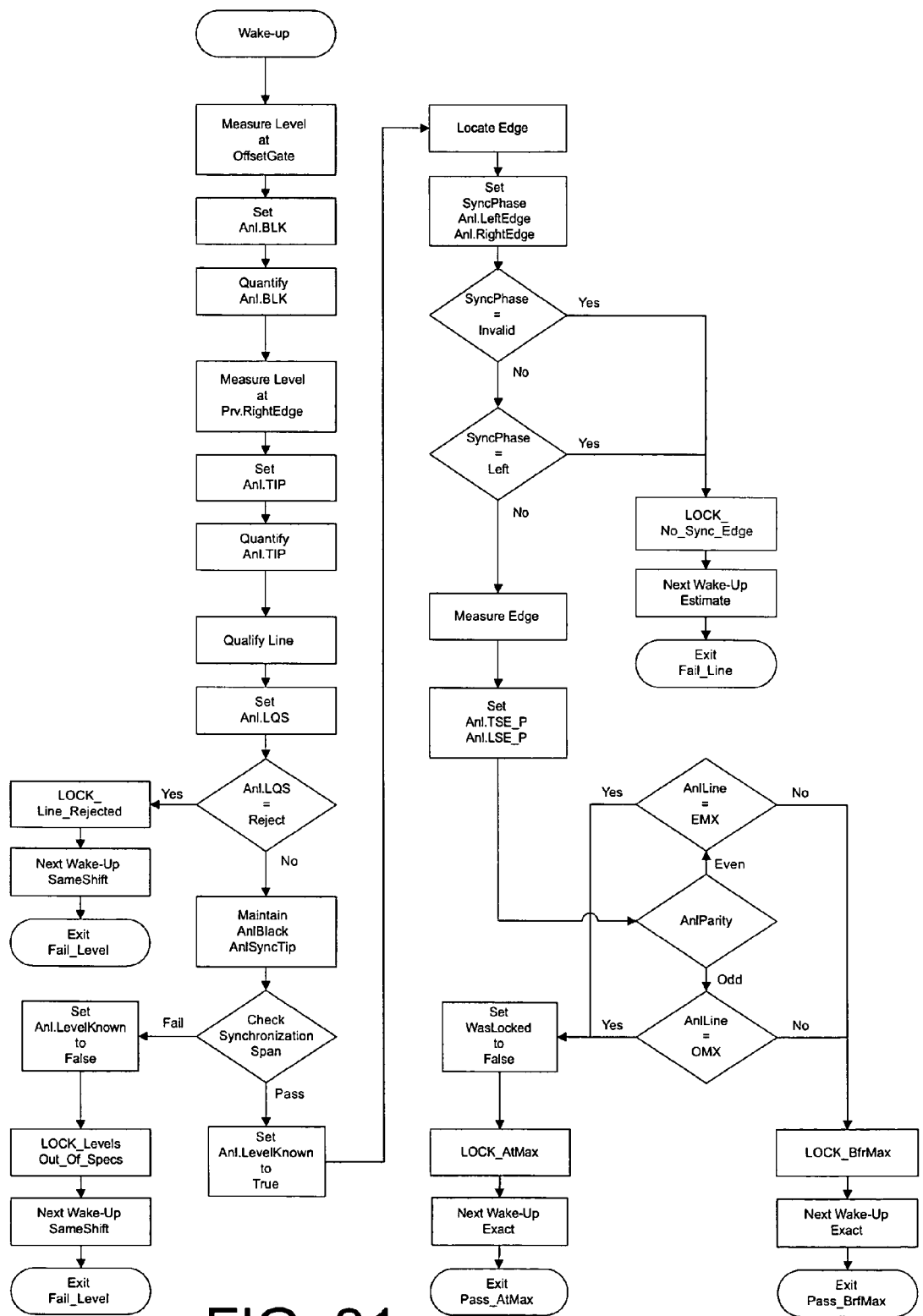
FIG. 31 shows a flow chart of one embodiment of the functions carried out in the locked state LOC of line analysis, according to an aspect of the invention.

FIG. 31 shows a flow chart of one embodiment of the functions carried out in the LOC state of line analysis. Some of the blocks of the flow chart are now explained in more detail.

Accurate Level Measurement, Managing Reliable Levels, Quantization of Measured Levels, Locating the Synchronization Edge, and Accurate Measurement of Synchronization Edge, in the LOC State.

For these functions, the reader is referred to the Section titled "Tasks common to several states in line analysis" dealing with tasks common to several line analysis states.

Line Classification

Figure 32:
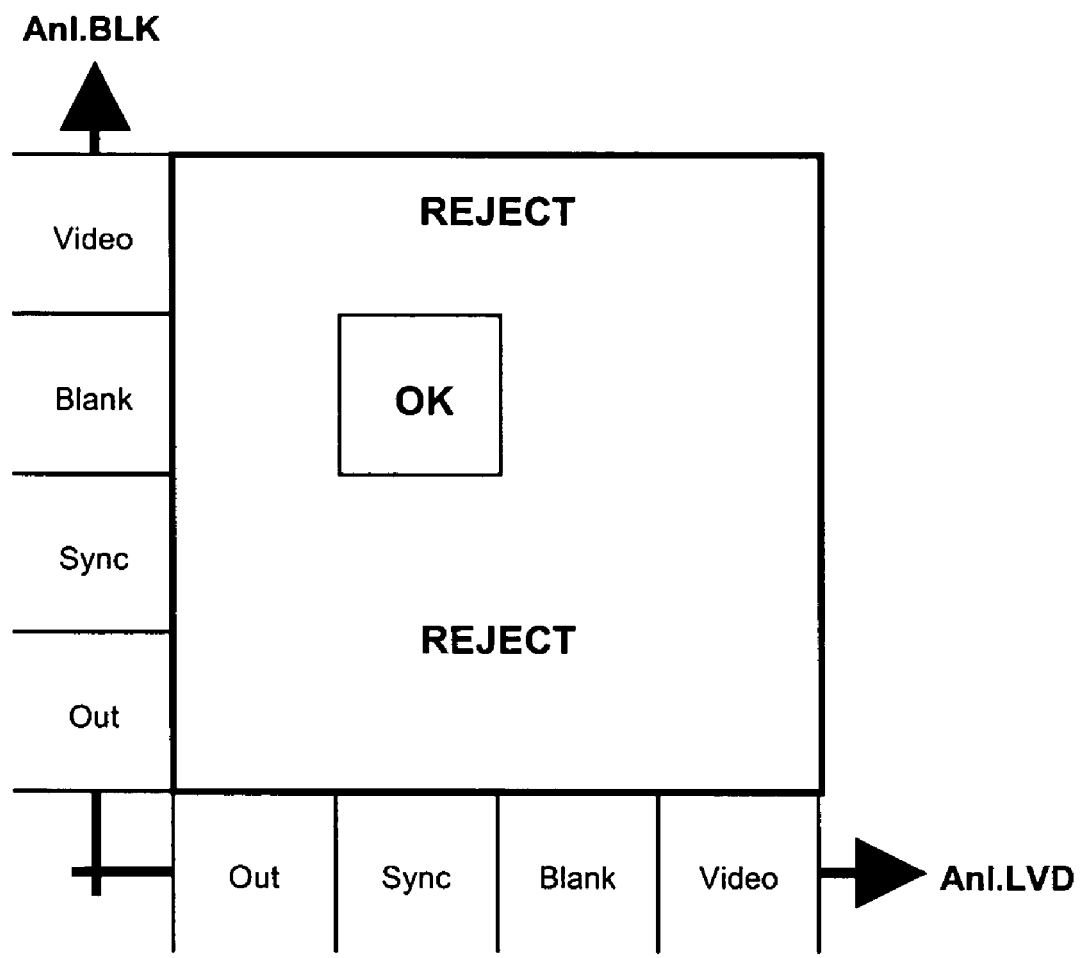
FIG. 32 shows the classification grid used for measurements made in the LOC state, according to an aspect of the invention.

The measured black and sync tip levels are quantized in four classes, namely: Video, Blank, Sync and Out. The video line analyzed by the process(es) carried out in the fully locked state LOC is classified from two quantized measurements Anl.BLK and Anl.LVD into a line type among two possible ones. FIG. 32 shows the classification grid used therefor according to an embodiment of the invention. The result of the classification is recorded in the line record element Anl.LCS (Line Classification Status) of the current line record.

Lock Recovery in the Fully Locked State LOC

A synchronization loss (returning Fail_Line or Fail_Level) may be recovered under certain circumstances as described elsewhere in this description.

Active Lines Area in the Fully Locked State LOC

In each field, the active lines area determining the occurrence of the LOC state 1615 is defined by the values EMN, EMX for the even field, and OMN, OMX for the odd field. Those values result from a-priori knowledge of the video standard of the line. The following table provides these as an example. In one embodiment, the video lines to be resampled are only those within the active area.

| Sync Pattern | Signal Structure | Active Even Field EMN | Active Even Field EMX | Active Odd Field OMN | Active Odd Field OMX |
|---|---|---|---|---|---|
| PalSync | Interlace PAL | 6 | 310 | 7 | 311 |
| NtscSync | Interlace NTSC | 7 | 260 | 8 | 260 |
| PalEven | Non-interlaced PAL with even sync | 6 | 623 | 0 | 0 |
| PalOdd | Non-interlaced PAL with odd sync | 0 | 0 | 7 | 623 |
| NtscEven | Non-interlaced NTSC with even sync | 7 | 522 | 0 | 0 |
| NtscOdd | Non-interlaced NTSC with odd sync | 0 | 0 | 8 | 523 |

Tasks Common to Several States in Line Analysis

Several tasks are common to more than one of the states of line analysis. These include Accurate level measurement, Managing reliable black and sync tip levels, Quantization of measured levels, Locating the synchronization edge, and Accurate measurement of synchronization edge. An embodiment for carrying out each of these functions is now described.

Accurate Level Measurement in the Vertical Synchronization and the Fully Locked States In the course of functions performed in the vertical synchronization and the fully locked states, accurate level measurements are conducted in order to report the video signal level at specified locations in the sampling buffer.

One embodiment includes a weighted averaging process over a neighborhood around the specified location, which provides an accuracy that can be even better than the direct sampling resolution.

Level measurement includes providing the following three items of information, denoted BLK, TIP and LVD, respectively. The BLK measurement reports the black level, the TIP measurement reports the sync tip level, and the LVD measurement is right hand level used to classify lines.

The measurements are recorded in line record elements of the line record under the names Anl.BLK, Anl.TIP and Anl.LVD.

Figure 33:
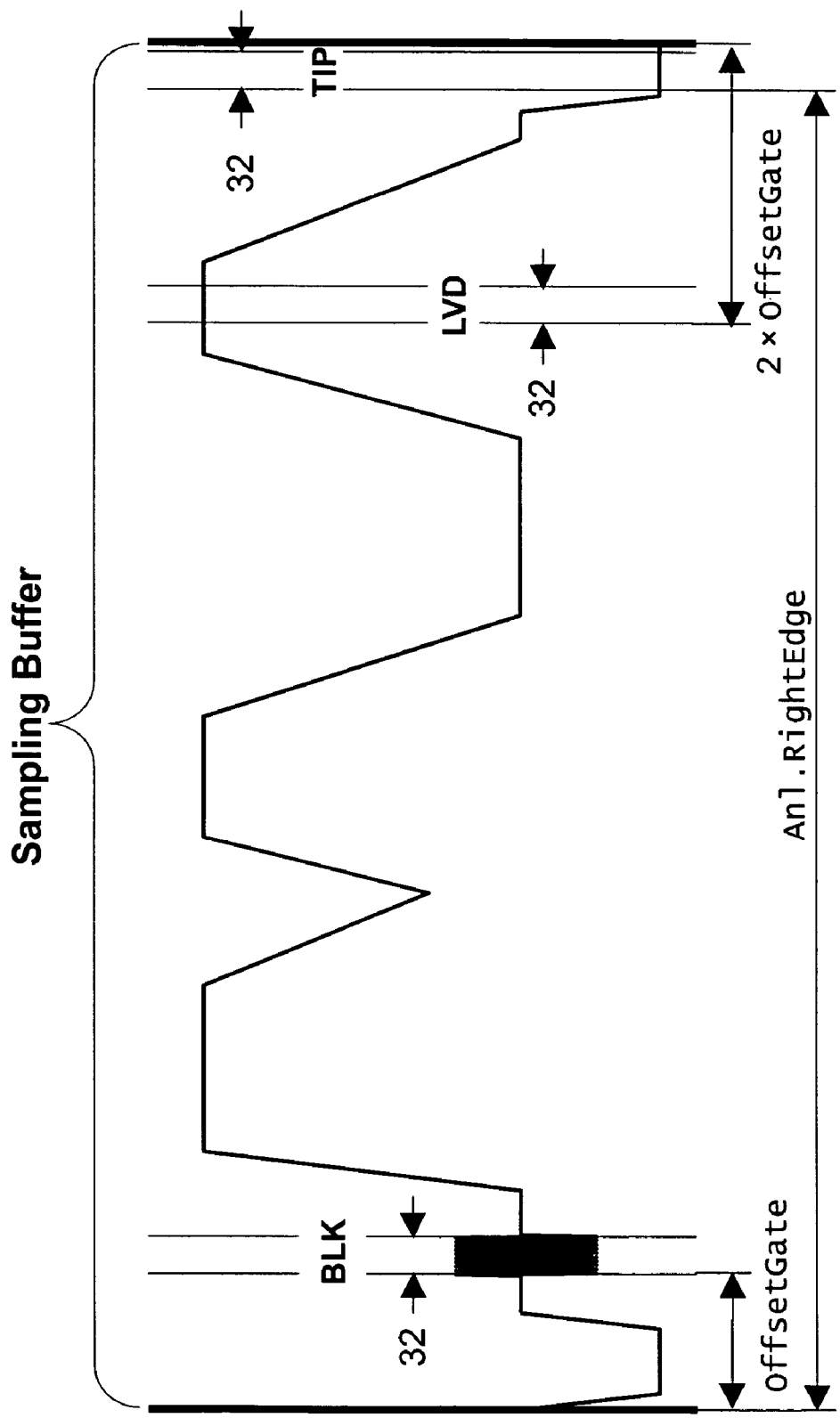
FIG. 33 illustrates the locations in a sampling buffer of where measurements are carried out for most types of lines, according to an aspect of the invention.

FIG. 33 shows the locations in the sampling buffer where the measurements are carried out for most types of lines. Some vertical synchronization lines do not follow the diagram. These are explained elsewhere in the description.

Relevant Parameters for Accurate Level Measurement

The parameter MGP (Measuring Gate Position) that indicates the location of the level measuring region, in seconds, is related the Accurate level measurement task.

Duration of Measuring Region for Accurate Level Measurement

The duration of each measuring region is denoted MGD (Measuring Gate Duration) in seconds. When interpreted as a number of samples at the ASR (Analog Sampling Rate) frequency, this number has been selected by the inventor to be a power of two. In one embodiment, MGD is 32 sample periods wide.

For a composite signal, it is preferred that the width BLK be entirely contained in the sub-carrier color burst region.

Locating Measuring Areas for Accurate Level Measurement

The BLK measurement is performed at a distance denoted OffsetGate from the beginning of the sampling buffer. In one embodiment, OffsetGate is a global variable determined off-line as a number of samples based on a-priori knowledge of the particular video standard.

In one embodiment, the LVD measurement is performed at twice the distance OffsetGate from the end of the sampling buffer. Other embodiments use other values.

The TIP measurement is performed at a variable address according to the measured location Anl.RightEdge. See the relevant part of this document that deals with finding Anl.RightEdge for the current line record.

A-Priori Values of OffsetGate

OffsetGate depends on timing quantities characterizing the video standard, as expressed by the parameters denoted SSB (Standard Sync to Burst) and SBP (Standard Burst Pulse). The following table provides values used in the embodiments described herein for the PAL and NTSC standards

| Duration | PAL | NTSC |
|---|---|---|
| SSB | 5.6 μs | 5.4 μs |
| SBP | 2.3 μs | 2.5 μs |

In one embodiment, the Measuring Gate Position parameter denoted MGP is given by:

MGP=SSB+(SBP/2).

This position points to the middle of the BLK measuring area, thus, in one embodiment, OffsetGate=MGP×ASR−16.

Measurement Principle for the Accurate Level Determination

The inventor has found that, in the case that a color burst may be present, it is not advisable to simply compute a simple average of the sampled values. Rather, one embodiment of the invention determines a weighted average. The weighting profile is encoded as 32 12-bit words whose sum of which is a power of two. The inventor has found that so forming a weighted average also efficiently attenuates any high-frequency random noise in the signal.

Figure 34:
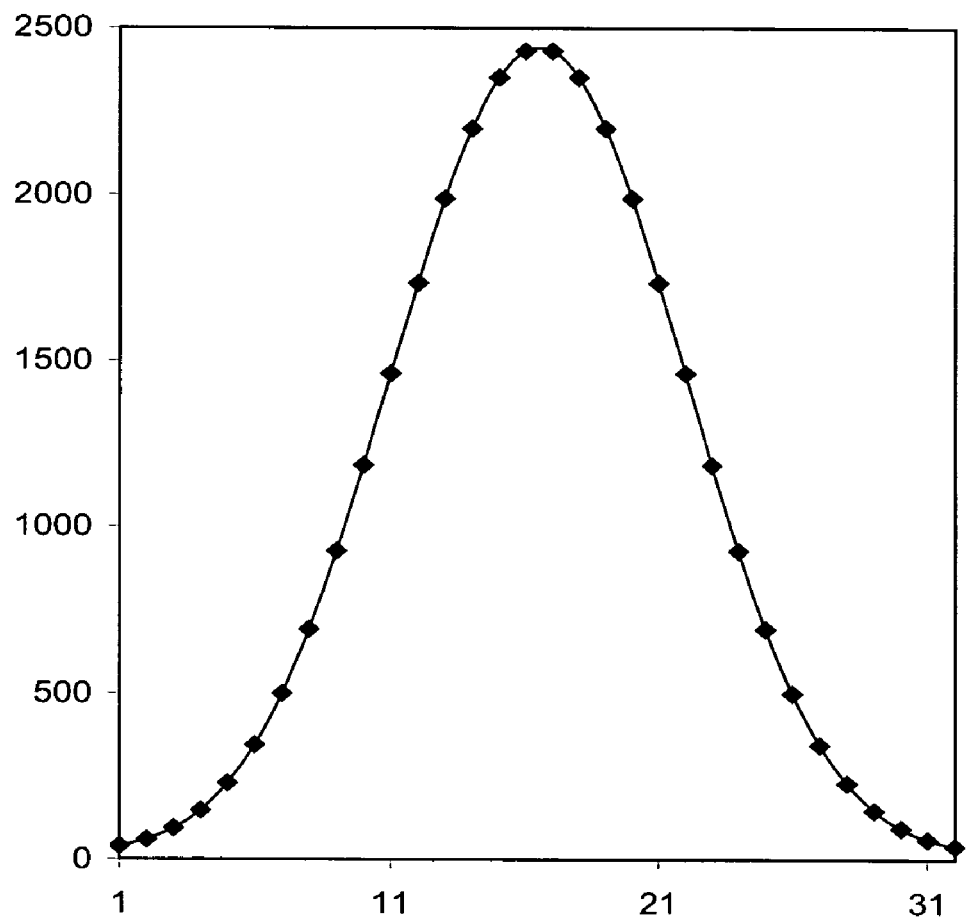
FIG. 34 shows one set of weights for the weighted average used to measure levels in one embodiment of the invention.

FIG. 34 shows one set of weights for the weighted average according to one embodiment. The weights follow an approximate Gaussian shape.

Managing Reliable Black and Sync Tip Levels

At any time, the line analysis processes use appropriately approximated knowledge of the black and sync tip levels. These values are used, for example, as detection thresholds to perform specific measurements.

These levels are assumed "reliable" and are contained in two integer global variables AnlBlack and AnlSyncTip. In one embodiment, the quantities have the same dynamic range as the directly sampled data, i.e., ASN bits.

The following line analysis processes use these levels:
Locating the synchronization edge before its accurate measurement.
Horizontal synchronization functions.
Quantizing the levels.

During the level analysis (SL) 1621 and horizontal synchronization (HS) 1623 states, AnlBlack and AnlSyncTip are simply transferred from measurements performed on the sampling buffer data. This forms the "initialization" of these levels.

During the vertical synchronization states and fully locked state, reliable AnlBlack and AnlSyncTip levels are computed by filtering the data obtained from several previous sampling buffers. This process is herein denoted "maintenance" of reliable levels or simply "reliable level maintenance".

Relevant Parameters for Reliable Level Maintenance

Initialization of AnlBlack and AnlSyncTip

Initially, the integer component of the black and sync tip levels are used as the reliable AnlBlack and AnlSyncTip levels.

Maintenance of AnlBlack and AnlSyncTip

Denote by n the relative stage of analysis wherein level measuring was or is performed, denote by "Level" the particular measurement, blanking or sync tip level, being made, and denote by Level [n] the measurement performed during line analysis at stage n relative to the current sampling buffer. n=0 denotes the current sampling buffer, so that: Level [0] denotes the measured value obtained from the current sampling buffer, Level [−1] denotes the measured value obtained from the previous sampling buffer, and Level [−2] is the measured value obtained from the second to last sampling buffer.

Denote as Reliable is the result of the filtering (weighted average) operation for the measurement: blanking or sync tip level.

In one embodiment, a maintenance filter generally makes use of the three measurements: the present, and two past values. However, some values may be unavailable, e.g., because of the lock recovery mechanism, described elsewhere in this description.

One embodiment uses a flag bit to indicate whether or not a particular level measurement is available for a particular line record. The flag is an element of line record and denoted Anl.LevelKnown for the present line record Anl. See below for the assessment process that sets Anl.LevelKnown.

In one embodiment, when Level [0], Level [−1] and Level [−2] are all known,
Reliable=Level [0]/4 +Level [−1]/2 +Level [−2]/4.

In one embodiment, when Level [0] and Level [−1] are known,
Reliable=Level [−1].

In one embodiment, when only Level [0] is known,
Reliable=Level [0].

Figure 35:
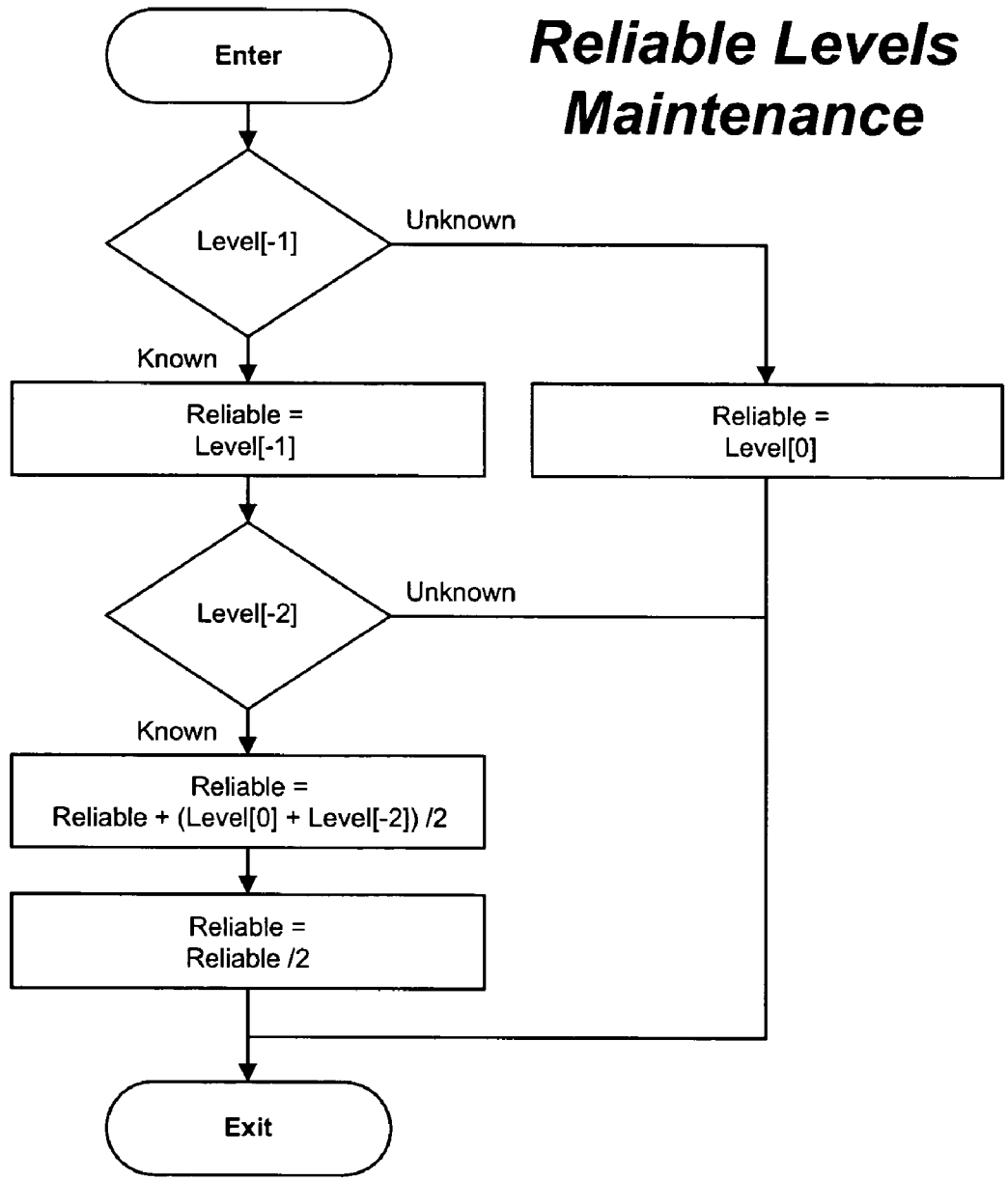
FIG. 35 shows a flow chart of the process of maintaining reliable values of the black and sync tip levels according to an aspect of the invention.

FIG. 35 shows a flow chart of the process of maintaining reliable values of AnlBlack and AnlSyncTip following the above formulae.

Alternate embodiments use different methods of maintaining these levels.

Assessment of Validity of the Levels

After initialization or maintenance of AnlBlack and AnlSyncTip levels, one embodiment includes a check for validity of results. The difference between the obtained black level AnlBlack and the obtained sync tip level AnlSyncTip should be in the range defined by a number denoted MNS (Minimum Synchronization) and a second number denoted MXS (Maximum Synchronization).

In one embodiment, the variables MNS and MXS are extracted from controlling parameters MNS_R and MXS_R as a fraction of the nominal synchronization amplitude as follows:

MNS=Digitize(MNS_R×SSA) and

MXS=Digitize(MXS_R×SSA), where SSA (Standard Synchronization Amplitude) denotes the nominal amplitude of the synchronization in volts, and Digitize is a function transforming a voltage level into a digital number over ASN bits.

The results of the assessment of the levels is reported in the line record element of the current line record denoted Anl.LevelKnown.

Quantization of Measured Levels

Figure 36:
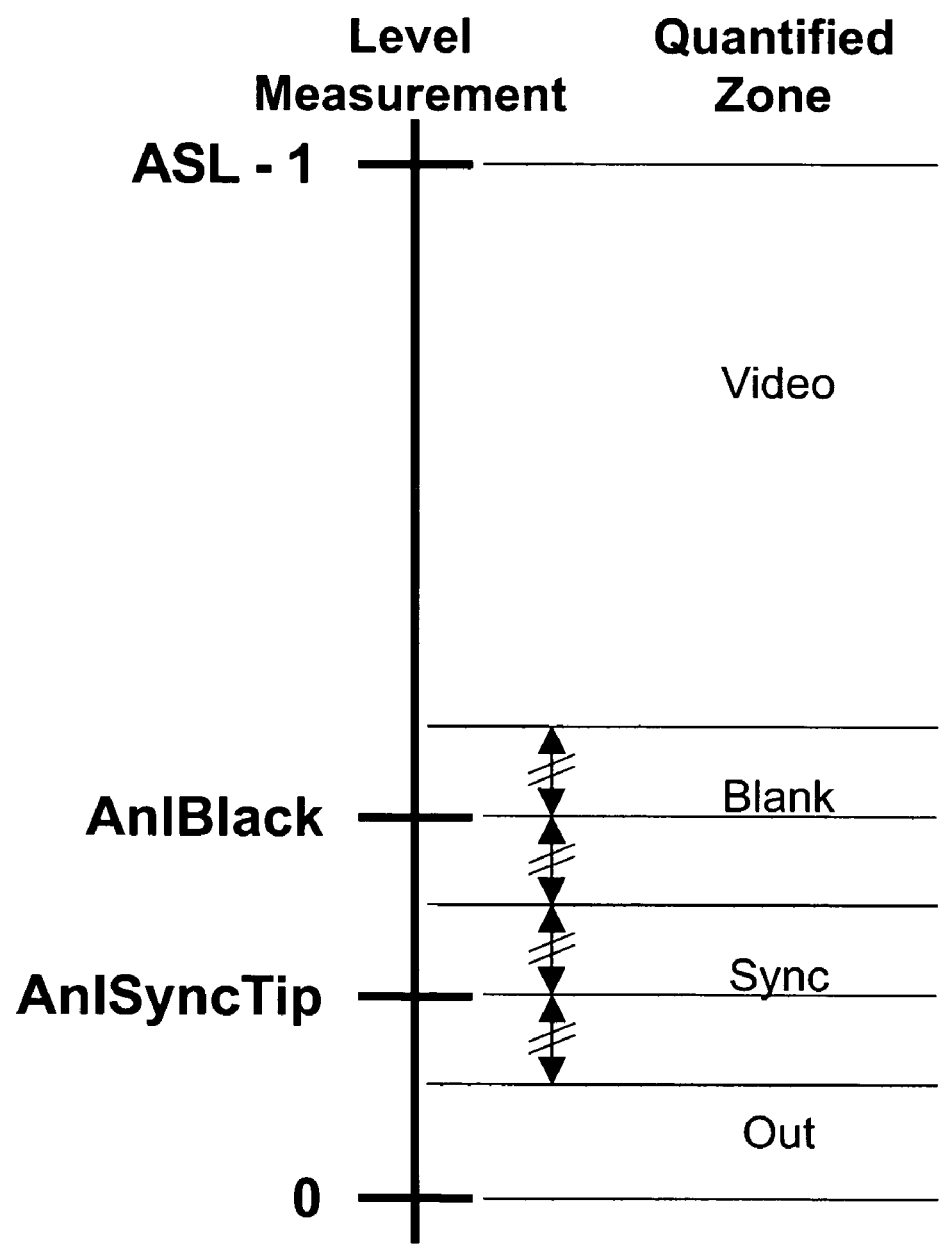
FIG. 36 is an illustration used to explain quantizing to illustrate aspects of the invention.

In some line analysis states, in particular, the vertical synchronization states and the fully locked state, measured values of video levels are quantized to a relatively small number of levels denoted Video, Blank, Sync or Out that characterize the line data Quantizing a measured level includes determining to which quantized zone the measured level belongs. In one embodiment, only the integer value is considered in performing quantization. The zones are based on the reliable levels AnlBlack and AnlSyncTip. FIG. 36 illustrates the quantizing process.

Locating the Synchronization Edge

Some line analysis states, in particular, the vertical synchronization states and the and fully locked state, include locating the edge of the synchronization pulse in the sampling buffer.

Figure 37:
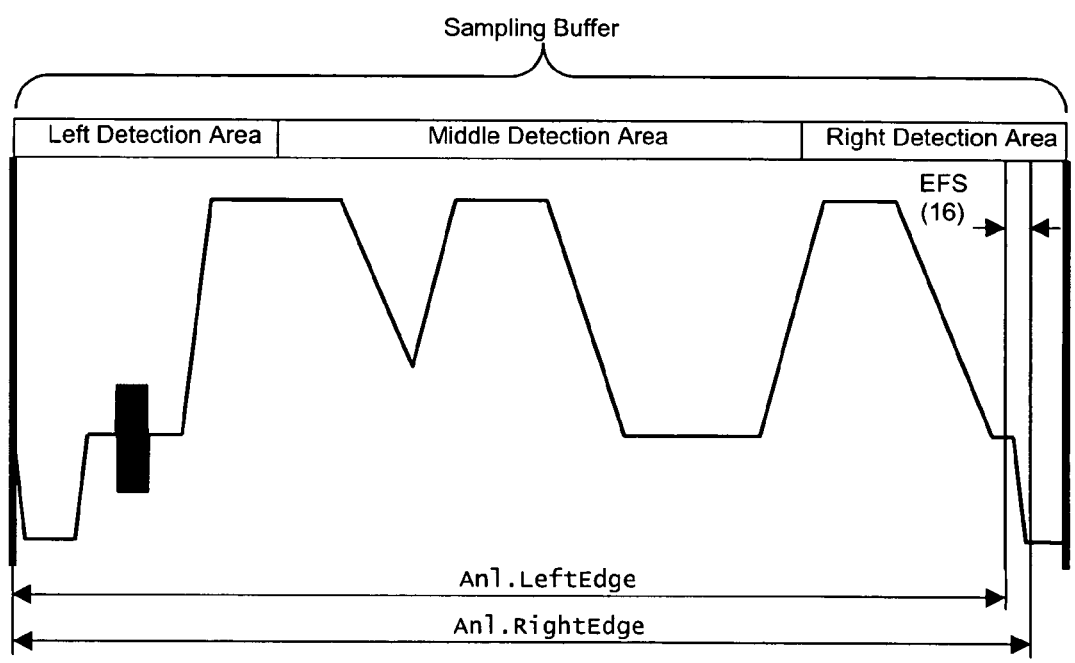
FIG. 37 illustrates how the borders of the window where accurate position measurements are performed are defined, according to an aspect of the invention.

In one embodiment, the function that locates the edge returns a window that exactly encompasses the targeted edge. Any accurate position measurements are performed inside this window. The borders of the window are the line record elements denoted Anl.LeftEdge and Anl.RightEdge for the current line record Anl. FIG. 37 illustrates how these quantities are defined.

The function locating the synchronization edge returns the success or not of the location in the form of a variable herein denoted EdgLoc that assumes one of the values Invalid, Left, Middle, or Right. This indicates approximately where the edge has been detected, if any.

The normally returned value is Right, as a correctly phased sampling buffer exhibits a synchronization edge close to its end. The late parity management function uses the Middle value. Invalid and Left are indications of a loss of the horizontal synchronization.

Parameters Related to Locating the Synchronization Edge

EFN (Edge Filter Number of bits ) that indicates the number of bits characterizing the extension of the synchronization detection filter, and EFS (Edge Filter Size ) providing the extension of the synchronization detection filter in points are two parameters related to locating the synchronization edge.

Synchronization Edge Search Filtering

In one embodiment, the search for the synchronization edge uses a low-pass filter to provide noise immunity. The low pass filter is characterized by two parameters denoted EFN (Edge Filter Number of bits) and EFS (Edge Filter Size). The following holds:

$$EFS=2^{EFN}.$$

In one embodiment, the width of the low-pass filter is also the width of the window encompassing the edge to be located. That is, $$Anl.RightEdge-Anl.LeftEdge=EFS-1.$$

In one embodiment, EFN is 4.

The filtering operation includes scanning the sampling buffer from right to left. One embodiment of the filtering method is implemented using a stack device, also called a last-in-last-out (LIFO) buffer. The LIFO depth is EFS storing the EFS last scanned values. Progress in the buffer includes pushing a new value onto the LIFO.

In one embodiment, the stack device is such that the sum of its contents is always known. This sum is the result of the filter, updated each time a sampled data is pushed. It is here denoted Level.

An initialization stage pushes the EFS rightmost samples of the sampling buffer prior to exposing the resulting sum.

Measuring Principle for Locating the Edge

Figure 38:
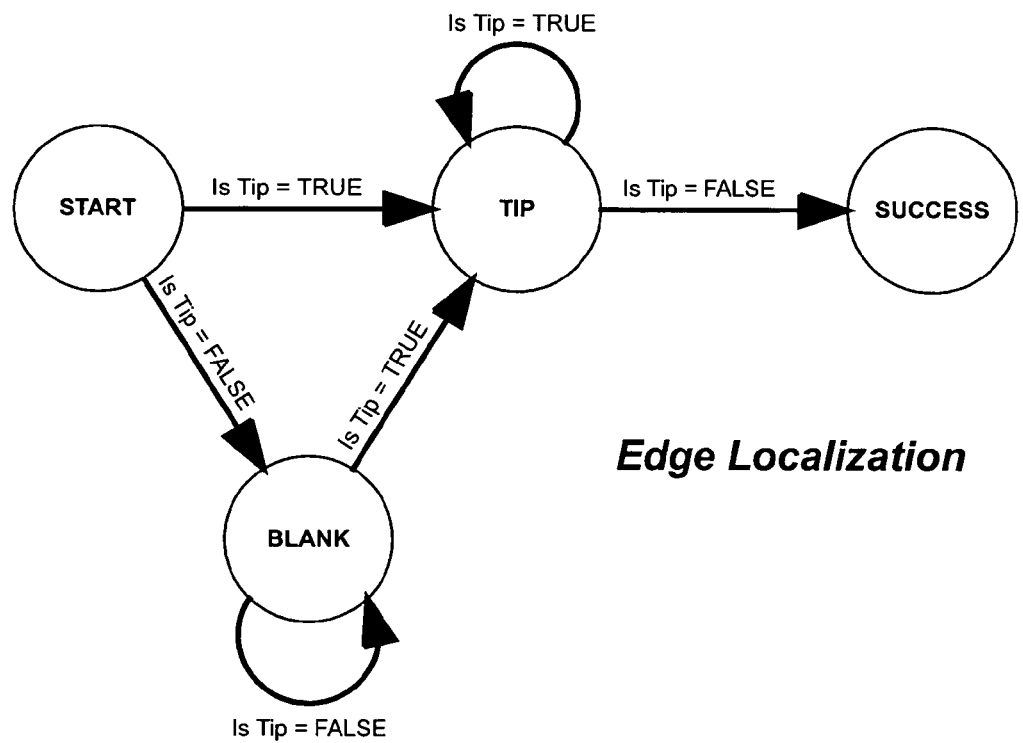
FIG. 38 shows a state transition diagram of an embodiment of edge localization, according to an aspect of the invention.

In one embodiment, the edge locating mechanism and method uses a small state controller, e.g., a state machine, whose state transition diagram is shown in FIG. 38.

A value for Level is computed at each scanning step through the sampling buffer. This value is shifted rightwards by EFN bits to match the sample's dynamic range, and compared to a threshold halfway between the reliable levels AnlBlack and AnlSyncTip.

In one embodiment, this comparison is reported in a Boolean variable denoted Istip, which is true when Level is closer to the sync tip than to the blanking.

The edge localization method successively goes through sync tip detection, then blanking detection. Then the scanning address becomes the left location of the encompassing window. Simple arithmetic determines whether this location is Right, Middle or Left in the sampling buffer.

Accurate Measurement of Synchronization Edge

Once the edge is located, in the form a window containing the edge, the vertical synchronization states and the fully locked state includes an accurate, sub-sampling interval measurement of the edge of the trailing-synchronization pulse. In one embodiment, the result of this measurement is a 32-bit number complying with the fixed-point (integer, fractional part) data structure of the scanning pointer.

Figure 39:
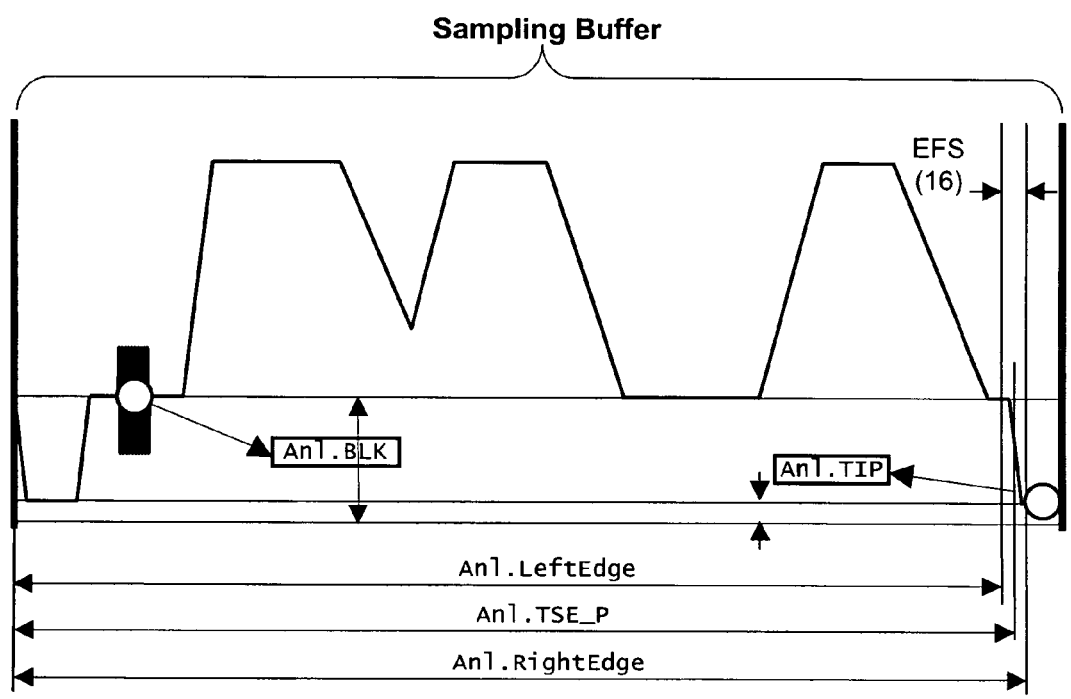
FIG. 39 illustrates how in one embodiment, a measurement of the edge of the trailing-synchronization pulse includes forming a sum of the samples contained in the window encompassing the edge.

Referring to FIG. 39, the measurement includes forming a sum of the samples contained in the window encompassing the edge as reported by the edge locating function LocateEdge.

The measurement also uses the previous accurate measurements for the black and sync tip levels as recorded in Anl.BLK and Anl.TIP.

The measurement for Anl.TIP will have been previously performed in the same buffer at the sync tip of the timing pulse whose initial edge is the subject of the measurement described here.

The measurement for Anl.BLK will have been previously performed in the same buffer at the blanking area (back-porch) that precedes the edge of synchronization that is the subject of the measurement described here.

The inventor has found that more accurate results are obtained with these locally measured levels than with the filtered reliable levels, especially when the DC component of the signal may not be stable.

Measuring Principle for Accurately Locating the Edge

Figure 40:
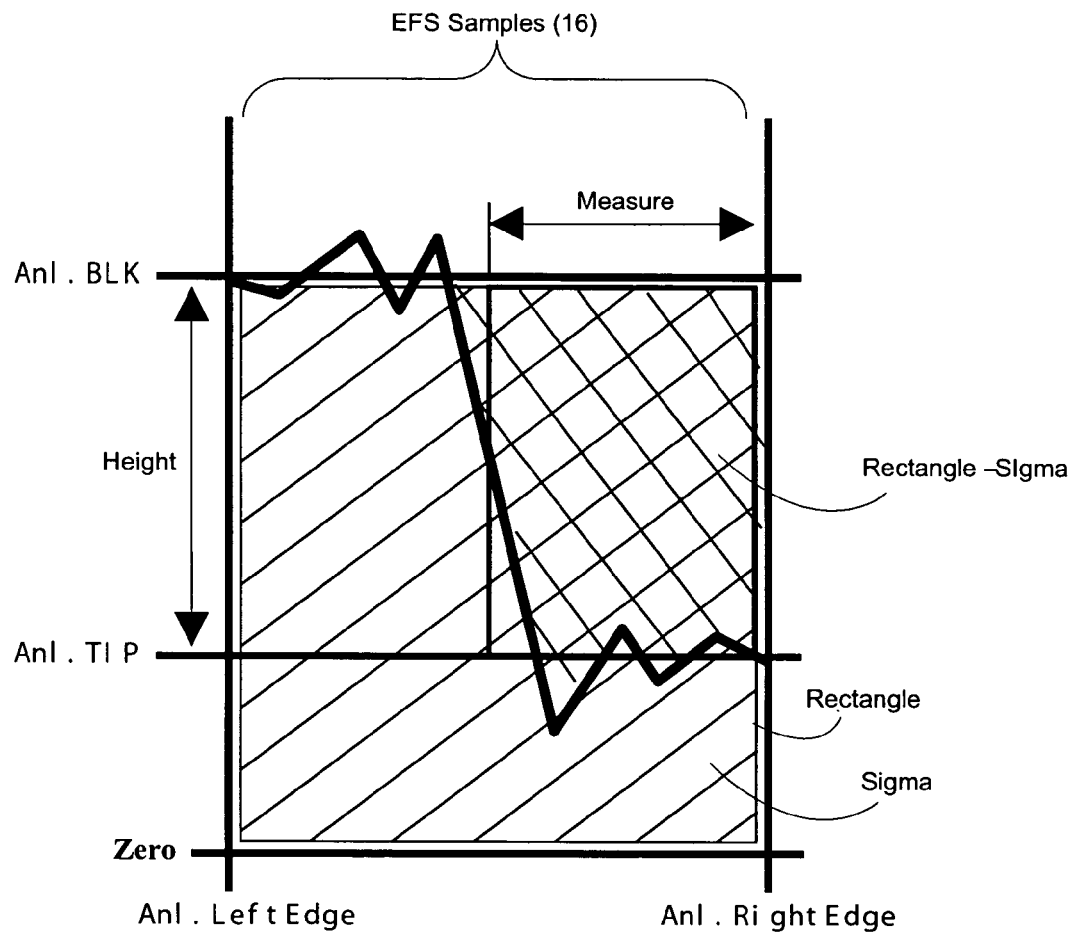
FIG. 40 shows as the area shaded with diagonal lines the computed sum of the samples belonging to a window according to an aspect of the invention.

The sum of the samples belonging to the window is computed, yielding the area under the signal trace. FIG. 40 shows the area shaded with diagonal lines and labeled Sigma.

In one embodiment, only the integer part of the measured Anl.BLK and Anl.TIP are kept. The quantity Height is the difference between the two values.

The area under the black level is called Rectangle.

The area shown cross-hatched in FIG. 40 is the difference between Sigma and Rectangle.

The targeted measurement, called Measure, is the width of a rectangle with a height equal to Height and an area equal to the above difference Rectangle-Sigma.

The division by Height is obtained from a pre-computed table returning a quantity $2^{16}$/Height.

In this manner, in one embodiment, the quantity Measure exhibiting a 16-bit fractional accuracy is obtained. The result is transferred into the variable TSE_P that takes this accuracy into account.

Auxiliary Global Tasks in Line Analysis

Changing State

In one embodiment, changing state includes a function called ChangeState that returns a transition code. Depending on the state, the transition code contains one or more of:

The success or failure of the function performed during the previous state.

Additional information about this success or failure, according to the indications shown in the state transition diagram (FIG. 16).

The wake-up condition for the next function.

A transition code used for reporting progress or for reporting error conditions.

In one embodiment, depending on the current state, changing state includes one or more of the following operations:
Updating state transition variables.
Maintaining line numbering. See below for more details.
Creating a new line record in the line analysis data structure.
Managing wake-up conditions for line analysis. See below for more details.
Determining the next state.
Creating the filtering chain for post-analysis filtering.

In addition, depending on the present state, in one embodiment, one or more of the following parameters are affected by or involved in the changing state process.

| Name | Description |
| --- | --- |
| Anl | Reference to the currently analyzed line record |
| Prv | Reference to the previously analyzed line record |
| Link | Reference to the lastly updated line record in the filtering chain |
| AnlState | Global variable reflecting the current analysis state |
| AnlAddr | Global variable reflecting the absolute starting location of the current sampling buffer |
| Prv.PAS | Analysis state associated to the line record Prv |
| Prv.NAS | Analysis associated to the line record succeeding to Prv |
| Prv.TSE_P | Trailing edge location measurement associated to the line record Prv |
| Anl.ALA | Absolute starting location of the sampling buffer associated to the line record Anl |
| Anl.SVS | Size of the sampling buffer associated to the line record Anl |
| Anl.Index | Index of the line record Anl in the line analysis data structure |
| Anl.Nextline | Index in the line analysis data structure of the line record following Anl in the filtering chain |
| Anl.Code | Full transition code issued by the function associated to the line record Anl |
| Anl.STR | Pass/Fail code issued by the function associated to the line record Anl |
| Anl.WUS | Wake-up condition issued by the function associated to the line record Anl |

Creating the Filtering Chain for Post-Line-Analysis Temporal Filtering

Following the line analysis processes, a refining process is applied to the horizontal phase and the black level. This is called post-line-analysis temporal filtering process, and is described in more detail in this description in a dedicated section. The inventor believes that the post analysis temporal filtering aspect of the invention is a significant contributor to performance of a frame grabber implementing aspects described herein.

Post-line-analysis temporal filtering uses information collected in the line records of the data structure built during line analysis. For example, valuable measurements are generated in the fully locked LOC state 1615.

As an aid to post-line-analysis filtering, in one embodiment, the line records support a chained list that distinguishes the fully locked line records from all other line records. The forming of this chained list is one of the functions of the Changing State process.

In one embodiment, each record in the line analysis data structure is identified by an index pointing to its position in the line analysis data structure. This index is held in the line record element Anl.Index for line Anl. The line record element Anl.NextLine contains the position of the next record in the filter chain, e.g., the next record that has been adequately provided with valuable information for filtering.

Thus, in one embodiment, the filtering chain does not follow the natural succession of video lines in the video signal. Reasons include:
Some Initial line records typically have had to wait for vertical synchronization to be completed.
At each new incoming video field, the method leaves the active video line region to await for the next new vertical synchronization edge.
The locked condition may be accidentally lost, then later recovered. This generates one or more unlocked records.

Thus, locked records may not be the ones that follow the natural succession of video lines.

Flow Chart of the Changing State Process

Figure 41:
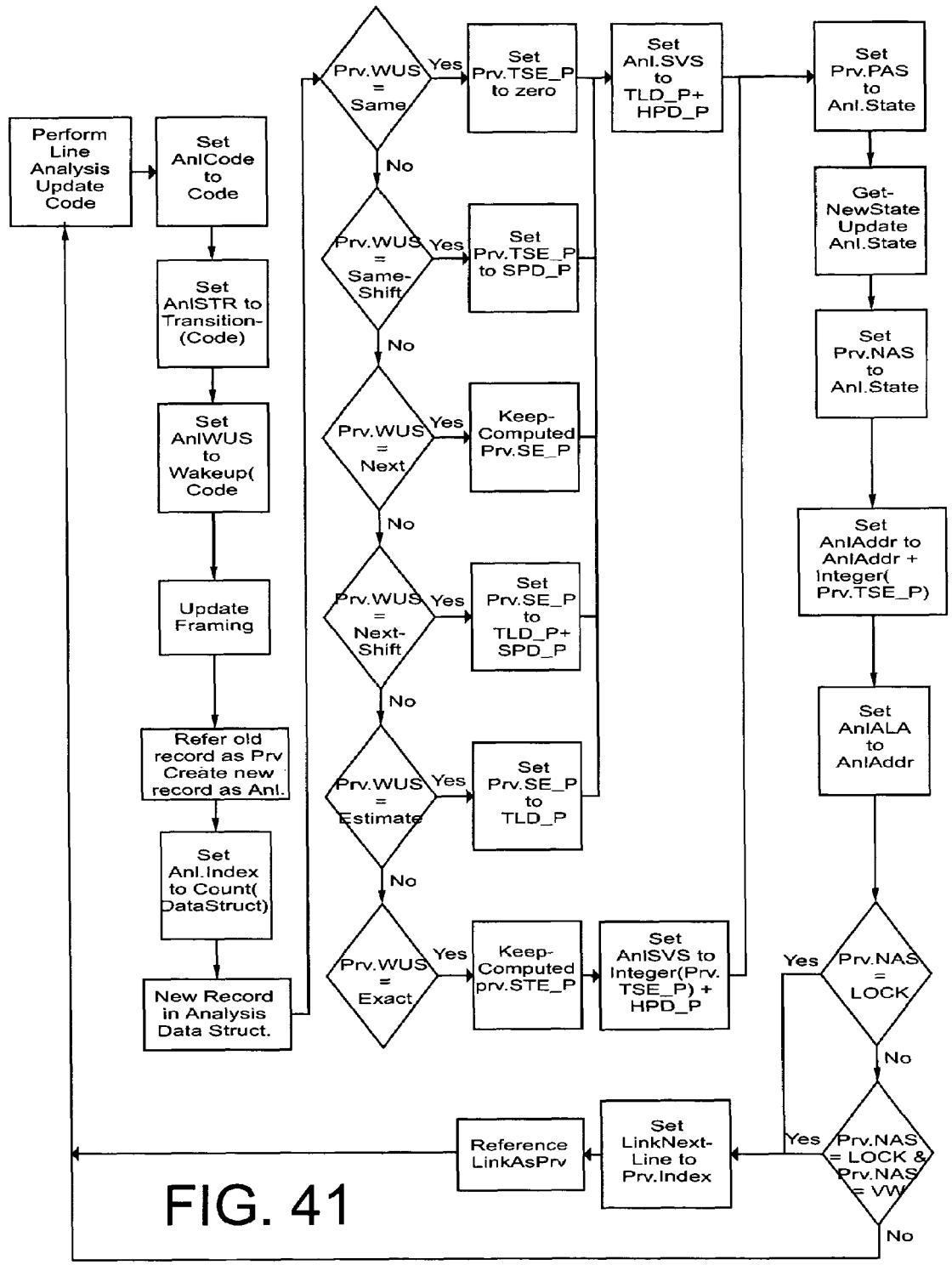
FIG. 41 shows a flow chart of one embodiment of the changing state process used in an embodiment of the invention.

FIG. 41 shows a flow chart of one embodiment of the changing state process. In this flow chart, Prv is the previous value of Anl, the line record, while the next line record is Anl. Some more variables and their meanings in the flow chart include: Anl.Code means state transition code; Anl.STR means Pass/Fail Code; Anl.WUS means wake-up style; WasLocked means memory of that record was locked; Anl.WasLocked means was locked; Prv means the Anl value for last record; Anl means new current line record; Anl.Index means index of record Anl; Anl.SVS means sampled video size; NomSVS means nominal sampled video size; Prv.PAS means Previous state; Prv.NAS means new state; AnlState means Global current state; AnlAddr means Global current buffer start address; Anl.ALA means new line record; and Link.NextLine means linking record for filter chain.

Maintaining Line Numbering

In this description, video signal lines are numbered according to the convention described earlier in the description. In each field, numbering starts at 1. The fields are denoted even or odd according to specified rules characterizing vertical synchronization. A non-interlaced signal is considered as made of a single even or odd field.

Each line record contains the following two line record elements denoted Anl.LNB and Anl.PAR characterizing the line contained in the associated sampling buffer:
Anl.LNB (Line Number) is an integer variable containing the conventional number of the line. In one embodiment, the value is zero if the line analysis process was not able to establish the line number.
Anl.PAR (Parity) contains an indication of the parity (Even or Odd) of the field the line belongs to. In one embodiment, the value is Unknown if the line analysis process was not able to establish the parity.

In addition, in one embodiment, two global variables denoted AnlLine and AnlParity reflect the same information at any time in the course of the line analysis.

During the locked states (VD 1613 and LOC), in one embodiment, the rule for incrementing line numbers is to increment the line number and to maintain the parity. Some state transitions include initializing the variables. How to detect those particular transitions where initialization occur is explained below.

Initialization

Initializing transitions are recognized by the association of a state and an exit condition from such state. In one embodiment, the initial values for the framing (initializing line numbers) are as shown in the table below.

| Distinctive association | | | PAL Initial Numbering | | NTSC Initial Numbering | |
|---|---|---|---|---|---|---|
| Exiting State | Exit condition | Description | Parity | Line Number | Parity | Line Number |
| BK | Pass_VP | Entering | Even | 1 | Even | 1 |
| BK | Pass_BVP | vertical | Odd | 1 | Odd | 1 |
| BVP | Pass_VP | pulse | Odd | 2 | Odd | 2 |
| VP | Pass_EVP | Leaving | Even | 3 | Odd | 4 |
| EVP | Pass_BK | vertical | Even | 4 | Odd | 5 |
| VP | Pass_BK | pulse | Odd | 4 | Even | 4 |

Flow Chart

Figure 42:
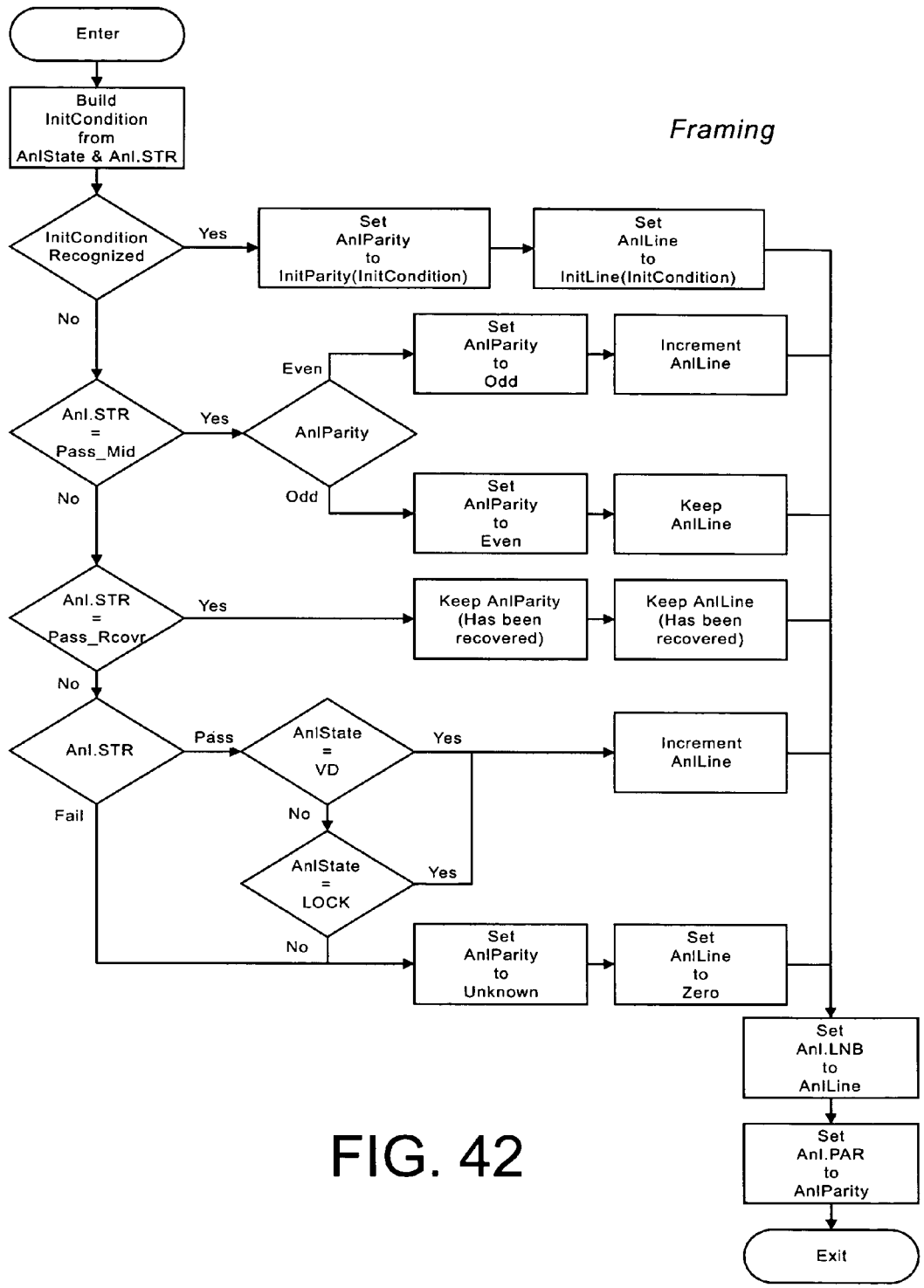
FIG. 42 shows the flow chart of one embodiment of a framing process that initializes line numbers used in an embodiment of the invention.

FIG. 42 shows the flow chart of one embodiment of the framing process that initializes line numbers.

Line Analysis Wake-Up Conditions

Recall that in one embodiment, there are 11 states and 5 different line analysis processes as described in the sections above. The line analysis processes have in common that they address a data set obtained from a directly sampled signal, and collected in the sampling buffer. In one embodiment, a process starts immediately after the sampling buffer is filled with an adequate number of samples. Such initiating of a line analysis process is called "waking-up the line analysis" or simply "wake-up" herein. In one embodiment, one or more of the processes are implemented by software code. One implementation of wake up uses an interrupt process, and of course, other implementations are possible.

FIG. 14 shows one structure for generating the address for filling the sampling buffer. In one embodiment, this signal also provides the basis for generating a signal when the buffer is full. In one embodiment, such a "full" signal wakes up the line analysis process in order to process the just-recorded video line. One implementation includes logic associated with the register that stores SVS, or programming the SVS register with the required length of the next sampling buffer.

Figure 43:
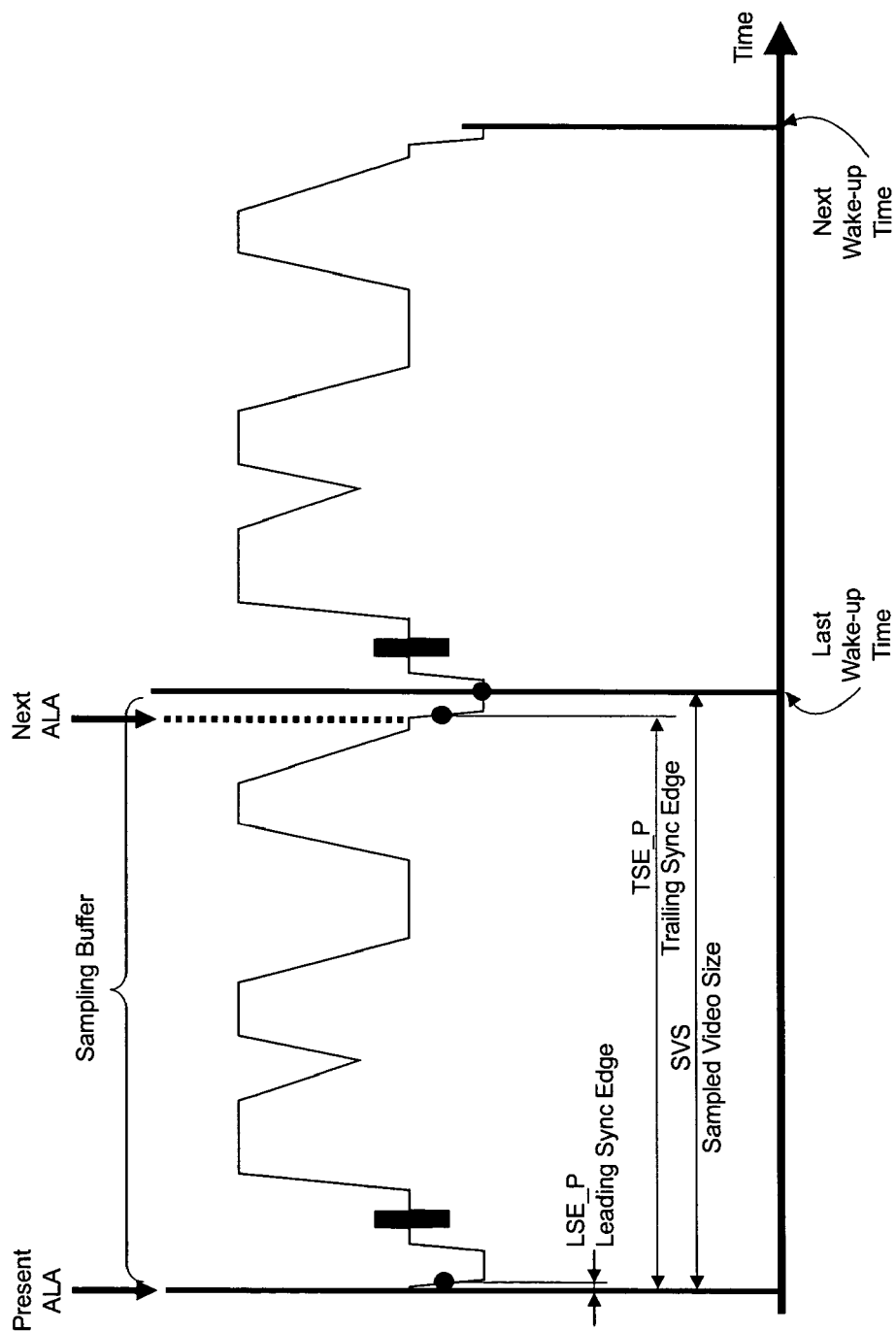
FIG. 43 graphically illustrates a wake-up mechanism, according to an aspect of the invention.

In one embodiment, in regular operation, successive sampling buffers have a slight overlap. FIG. 43 provides a graphical interpretation of such a wake-up mechanism.

Start of Sampling Buffer

The current address of the sampling buffer in the front-end memory is denoted ALA (for Absolute Line Address). The general rule is that the next sampling buffer starts at:

$$ALA[\text{Next}]=ALA[\text{Previous}]+\text{Integer}(TSE\_P[\text{Previous}]),$$

where the arguments Next and Previous are to be understood as relative to a transition between two states.

Thus, in one embodiment, the gap between two successive sampling buffers is the integer part of the measurement of the edge location for the trailing synchronization in the first buffer. In this manner, the first sample in the second sampling buffer always contains the edge of the leading synchronization pulse—being the trailing synchronization pulse of the previous sampling buffer.

In one embodiment, the value ALA is maintained in a global variable called AnlAddr as well as in the line record element Anl.ALA of the line record.

Length of Sampling Buffer

When it is not possible to compute the sampling buffer length more precisely, in one embodiment, a nominal length of the sampling buffer is used. This length, called the nominal length of the sampling buffer and denoted NomSVS, is given by:

$$NomSVS=TLD\_P+HDD\_P,$$

where TLD_P (for Total Line Duration) expresses in pointing units the nominal length of a video line according to a-priori knowledge of the video standard, and HPD_P (for Half Pulse Duration) expresses in pointing units the nominal length of half the horizontal synchronization pulse. In one embodiment, the nominal buffer length NomSVS (for Nominal Sampled Video Size) is stored as a global variable.

The actual computed value of the sampling buffer size is denoted by SVS and recorded in the line record element Anl.SVS of the line record. SVS can be-different from NomSVS.

Specifying the Wake-Up Conditions

There are six different styles for wake-up summarized in the following table.

| Wake-up style | Code | Wake-up description |
|---|---|---|
| Same | 1 | No buffer progression is needed |
| SameShift | 2 | Same line is rescanned with offset |
| Next | 3 | Wake-up for next line is required |
| NextShift | 4 | Wake-up for next line with one sync shift |
| Estimate | 5 | Estimated wake-up is required |
| Exact | 6 | Exact wake-up is required |

The wake-up style denoted "Same" is invoked when line analysis concludes in the following conditions:

| Analysis state | Meaning | Conclusion |
|---|---|---|
| SSL | Sub-sample before Level | Pass (Always) |
| SSH | Sub-sample before Horizontal | Pass (Always) |
| SL | Search Level | Pass |

The characteristics of the sampling buffers are as follows:

| | Previous Analysis State | Next Analysis State |
|---|---|---|
| Buffer Start | AnlAddr | AnlAddr |
| Buffer Length | TLD_P + HPD_P | TLD_P + HPD_P |

TLD_P (Total Line Duration) is the nominal duration of a video line.

HPD_P (Half Pulse Duration) is the nominal duration of half a horizontal synchronization.

The position and the size of the sampling buffer remain unchanged. The line analysis process operates on the same data set. The buffer size is nominal.

In one embodiment, the wake-up style "SameShift" is invoked when the analysis concludes in the following condition.

| Analysis state | Meaning | Conclusion |
| --- | --- | --- |
| LOC | Fully locked condition | Fail_Level |

The characteristics of the sampling buffers are as follows:

| | Previous Analysis State | Next Analysis State |
| --- | --- | --- |
| Buffer Start | AnlAddr | AnlAddr + SPD_P |
| Buffer Length | As previously obtained | TLD_P + HPD_P |

SPD_P (Synchronization Pulse Duration) is the nominal duration of a horizontal synchronization.

TLD_P (Total Line Duration) is the nominal duration of a video line.

HPD_P (Half Pulse Duration) is the nominal duration of half a horizontal synchronization.

The sampling buffer is shifted from one synchronization pulse in order to attempt a levels searching function in a more favorable area. The buffer size is nominal.

In one embodiment, the wake-up style "Next" is invoked when line analysis concludes in the following conditions:

| Analysis state | Meaning | Conclusion |
| --- | --- | --- |
| HS | Horizontal Synchronization | Pass |
| VD | Vertical Detected | Pass_Mid |

The characteristics of the sampling buffers are as follows:

| | Previous Analysis State | Next Analysis State |
| --- | --- | --- |
| Buffer Start | AnlAddr | AnlAddr + TSE_P |
| Buffer Length | As previously obtained | TLD_P + HPD_P |

TSE_P is the position of the synchronization edge in the sampling buffer just analyzed. This position is computed with low accuracy as an integer number.

TLD_P (Total Line Duration) is the nominal duration of a video line.

HPD_P (Half Pulse Duration) is the nominal duration of half a horizontal synchronization.

The sampling buffer is placed after the previous one with a half-synchronization pulse overlap. The buffer size is nominal In one embodiment, the wake-up style "NextShift" is invoked when the analysis concludes the following conditions:

| Analysis state | Meaning | Conclusion |
| --- | --- | --- |
| HS | Horizontal Synchronization | Fail_Line |
| VW, BK, VD, VP, BVP, EVP | Vertical Synchronization | Fail_Level |

The characteristics of the sampling buffers are as follows:

| | Prev. Analysis State | Next Analysis State |
| --- | --- | --- |
| Buffer Start | AnlAddr | AnlAddr + TLD_P + SPD_P |
| Buffer Length | As previously obtained | TLD_P + HPD_P |

TLD_P (Total Line Duration) is the nominal duration of a video line.

SPD_P (Synchronization Pulse Duration) is the nominal duration of a horizontal synchronization.

HPD_P (Half Pulse Duration) is the nominal duration of half a horizontal synchronization.

In one embodiment, the sampling buffer is placed after the previous one with an additional delay of one synchronization pulse in order to attempt a levels searching function in a more favorable area. The buffer size is nominal.

In one embodiment, the wake-up style "Estimate" is invoked when line analysis concludes in the following conditions:

| Analysis state | Meaning | Conclusion |
| --- | --- | --- |
| SL | Search Level | Fail_Level |
| HS | Horizontal Synchronization | Fail_Level |
| VW, BK, VD, VP, BVP, EVP | Vertical Synchronization | Fail_Line |
| LOC | Fully locked condition | Fail_Line |

The characteristics of the sampling buffers are as follows:

| | Previous Analysis State | Next Analysis State |
| --- | --- | --- |
| Buffer Start | AnlAddr | AnlAddr + TLD_P |
| Buffer Length | As previously obtained | TLD_P + HPD_P |

TLD_P (Total Line Duration) is the nominal duration of a video line.

HPD_P (Half Pulse Duration) is the nominal duration of half a horizontal synchronization.

The position of the synchronization edge in the sampling buffer is estimated by the nominal duration of a video line. The next sampling buffer is placed after the previous one. The buffer size is nominal.

In one embodiment, the wake-up style "Exact" is invoked when line analysis concludes in the following conditions.

| Analysis state | Meaning | Conclusion |
| --- | --- | --- |
| VS | Vertical Synchronization | Fail_Frame |
| VW or subsequent BK, VP, BVP, EVP | Vertical Wait | Pass_BK Pass_VID Pass_VP Pass_BVP Pass_EVP Pass_Rcovr |
| VD | Vertical Detected | Pass_BfrMin Pass_AtMin |
| LOC | Fully locked condition | Pass_BfrMax Pass_AtMax |

The characteristics of the sampling buffers are as follows:

|  | Previous Analysis State | Next Analysis State |
| --- | --- | --- |
| Buffer Start | AnlAddr | AnlAddr + Integer(TSE_P) |
| Buffer Length | As previously obtained | TSE_P + HPD_P |

TSE_P is the position of the synchronization edge in the sampling buffer just analyzed. This position is computed with high accuracy as a fractional number.

HPD_P (Half Pulse Duration) is the nominal duration of half a horizontal synchronization.

In one embodiment, the next sampling buffer is placed after the previous one. The first sample of the new buffer contains the leading synchronization. The size of the sampling buffer adapts to the measured position of the synchronization.

Lock Recovery in the LOC State 1615

One aspect of the invention is that that locked state (LOC) may be recovered without waiting for a next vertical synchronization pulse when a loss of synchronization occurs during the LOC state 1615. This is called Lock Recovery, and is another of the auxiliary global tasks of line analysis.

A synchronization loss is reported by an exit code Fail_Line or Fail_Level of the fully locked (state LOC) process. This determines a transition to one of the states that re-acquires horizontal synchronization.

When horizontal synchronization is re-acquired, the state VW 1603 (Vertical Wait) is reached. One embodiment includes a process that reports whether this state was reached because of a lock recovery or not. If it is because of a lock recovery, this process directly resumes the LOC state 1615 with consistent variables that are established by computation.

The Lock Recovery process uses a Boolean global variable WasLocked which is initialized as FALSE.

WasLocked becomes TRUE as soon as the vertical synchronization process recognizes the start of the active lines region in the video line (exit Pass_AtMin).

WasLocked becomes FALSE as soon as the fully locked (state LOC) process recognizes the end of the active lines region in the video line (exit Pass_AtMax).

A variable denoted LastLock maintains at any time a reference to the last line record that was known to have been in the fully locked state. In one embodiment, each time the fully locked (state LOC) process exits with Pass_BfrMax, the variable LastLock is updated with the analyzed line record of that line.

Flow Chart

Figure 44:
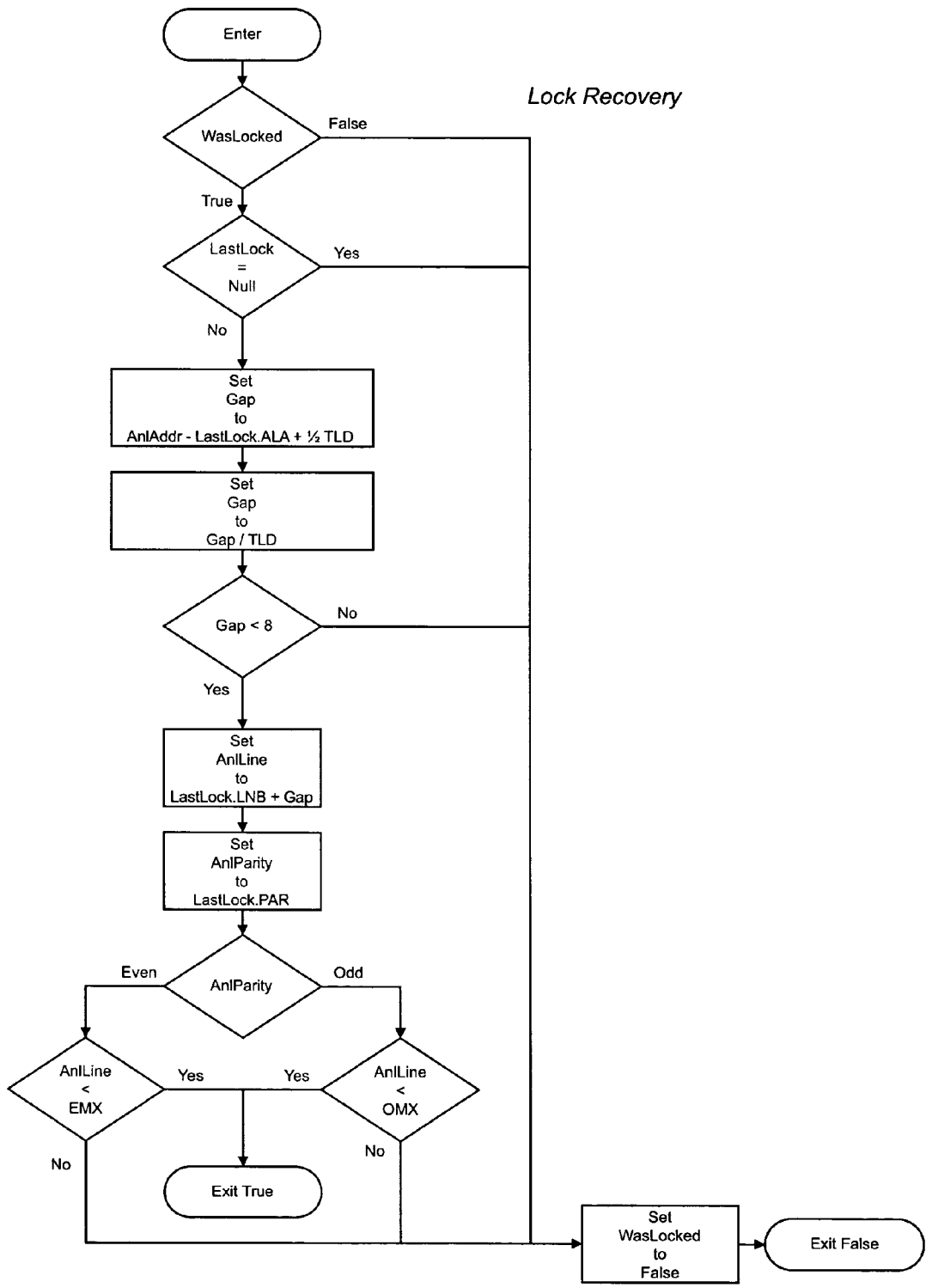
FIG. 44 shows the flow chart of one embodiment of a Lock Recovery process used in an embodiment of the invention.

FIG. 44 shows the flow chart of one embodiment of the Lock Recovery process.

Post-Line-Analysis Temporal Filtering

In one embodiment, after line analysis, two filtering processes are successively applied. One aims at obtaining a temporally filtered version of the black level. The other one aims at obtaining a temporally filtered version of the horizontal phase. For both processes, the originating data are collected in a LIFO (Last In First Out) stack structure. One embodiment uses two variants, called BlkLifo and PhsLifo respectively, for blanking filtering and phase filtering, respectively. Each of the stacks has a size denoted Size that is also the same size as the corresponding filtering operation. In one embodiment, a LIFO collects Size consecutive measurements from consecutive line records from the line analysis data structure.

Note that in this description, when line analysis completes perfectly for all lines, temporal filtering is carried out on consecutive lines. In alternate embodiments, every second line, or every third line, or some other arrangement may be used. However, in this description, it will be assumed that temporal filtering is carried out on consecutive lines assuming all of these completed line analysis successfully. The filters in general have different sizes.

In one embodiment, it may be that line analysis does not correctly conclude analysis or correctly restore all lines in perfect succession. There may be one or more lines in a succession for which there was loss of synchronization. Furthermore, beginning and/or ending of video fields may introduce irregularities in the flow of line records.

The above sub-section titled "Creating the filtering chain for post-line-analysis temporal filtering" creates a filtering chain designed to consistently track the line records that will be contributing to post-line-analysis filtering. In one embodiment, data is pushed into the filtering LIFOs according to the filtering chain so created. This progression along the filtering chain is not necessarily a simple one.

Figure 45:
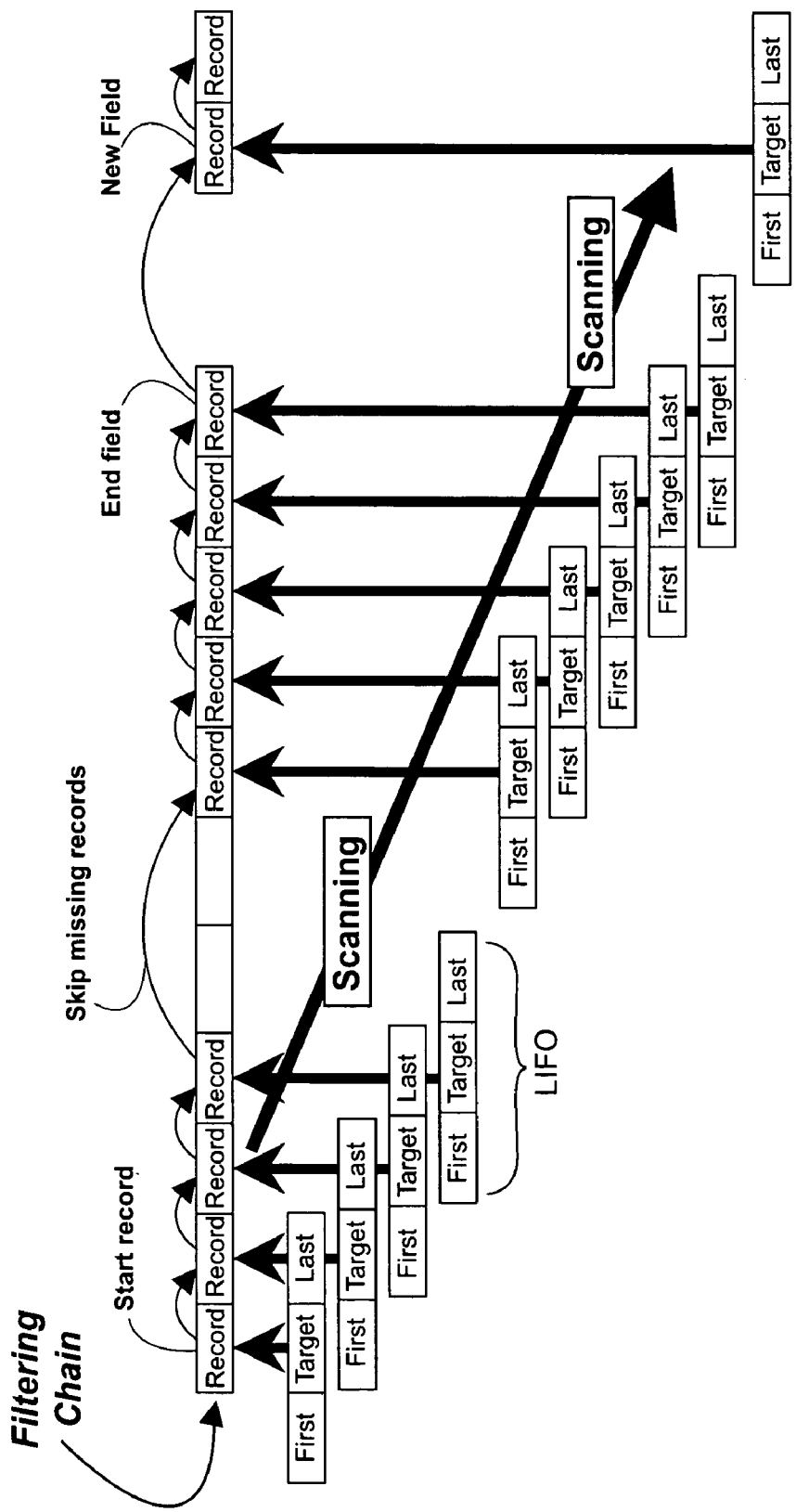
FIG. 45 shows an example of scanning with a last-in-first-out (LIFO) device of size 3, according to an aspect of the invention.

FIG. 45 shows an example with a LIFO device of size 3. At any time, the three sets of data for the three line records for the LIFO are referred to as "First", "Target", and "Last". The central element of the LIFO corresponds to the line record designated as the target of the filter, and thus called "Target". FIG. 45 shows successive positions during scanning of the line analysis data structure. The measurements contained in the three records in the LIFO provide the source data for the filter. A substitution strategy is included for when a record is missing. For example, two missing records are shown in FIG. 45.

Each filtering LIFO itself is a data structure, e.g., in the memory of the processing logic 221 in FIG. 2, that at any time holds all measurements contributing to the filtered result. This LIFO is centered on a line record designated as the target of the filter. As shown in the example of FIG. 45, the target advances in the line analysis data structure as the filtering progresses according to the filtering chain.

In one embodiment, the filtering LIFO has the following attributes:

| Attribute | Description |
| --- | --- |
| Size | Size of the LIFO, even or odd, at least equal to 1 |
| Records | Array of references to the line records providing valuable measurement. Defective line records are referred to by a Null value. |

-continued

| Attribute | Description |
| --- | --- |
| Top | Pointer to the last element entered in the LIFO. |
| Target | Pointer to the element targeted by the filter during progression. |
| AheadRecord | Reference to the next line record tracked by the progression. |
| AheadNextRecord | Reference to the line record preceding the one tracked by the progression |
| AheadNextIndex | Index in the line analysis data structure of the line record referred to by AheadNextRecord. |
| Ahead | Conventional video number of next line record tracked by the progression referred to by AheadRecord. |
| TopNumber | Conventional video number of the line record lastly entered in the LIFO. |
| State | State of the progression in the line analysis data structure, as required by the scanning method. Can be Init, Progress, NewField, Finish. |

The filtering chain provided in the line analysis data structure defines a sequence of line records. When no sequence breaks occur, the chain has sequential conventional line numbers. Sequence breaks are encountered in the filtering chain when jumping from one video field to the next field, and when the locked condition is temporarily lost during line analysis.

The filtering progression uses a variable denoted Ahead holding the conventional line number associated with a line record—the line record being scanned in the line analysis data structure. The filtering chain provides the sequence that the variable Ahead follows during progression.

For each line record absorbed by the progression, a variable denoted TopNumber holding an expected conventional line number is incremented.

In this description, the filtering progression is said to be phased when the two variables TopNumber and Ahead are equally valued. Otherwise, a phasing function is invoked. In one embodiment, TopNumber is made to continuously track Ahead.

Ahead exceeding TopNumber by more than one unit means that the filtering chain has a "hole" in its source records. In one embodiment, a "recovery" is then forced during which TopNumber is incremented without absorbing new line records.

Ahead becoming smaller than TopNumber means that the filtering chain has jumped from one field to the next field. In this case, a set of functions appropriate to a start of field is performed.

In one embodiment, the size of a LIFO may be even. The meaning of the central record of the LIFO requires a precise definition for such a case. FIG. 46 provides this definition for various LIFO sizes.

Because each LIFO contains data from several consecutive line records, it may be that the line record of a particular LIFO element does not exist in the filtering chain, i.e., there is no data for the filtering. When the LIFO element corresponds to a line record non-existent in the filtering chain, the data in the LIFO is either replaced by copies of data elements from the nearest neighboring line record towards the target, or deduced from such a neighboring record. The line record facing the target always exists by definition.

In one embodiment, a process scans the LIFO elements outwards from the target and propagates known data elements into orphan LIFO elements.

Figure 47:
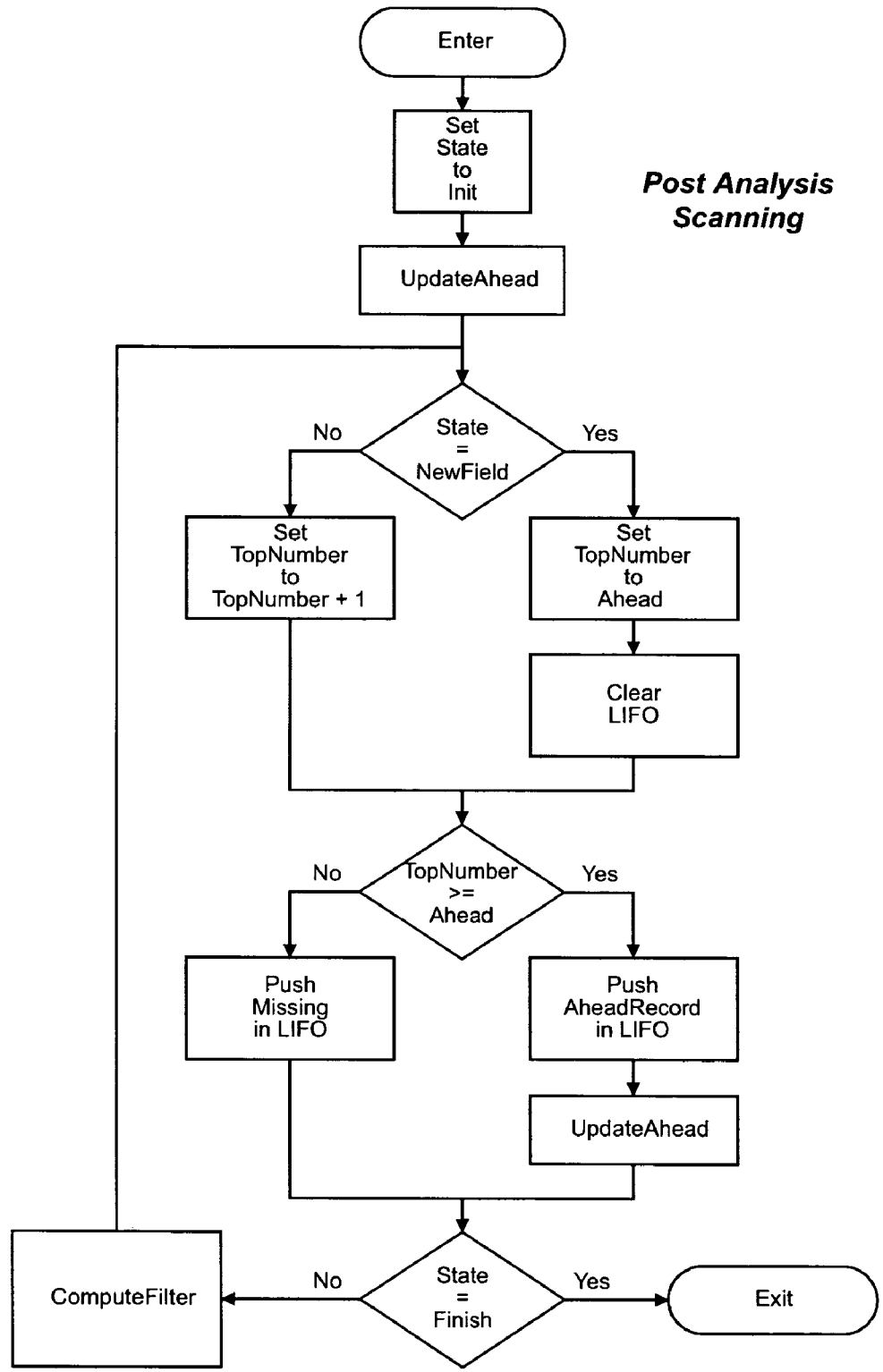
FIG. 47 shows a flow chart of one embodiment of scanning according to a filtering chain determined in line analysis, according to an aspect of the invention.

FIG. 47 shows a flow chart of one embodiment of scanning according to the filtering chain determined in line analysis.

Figure 48:
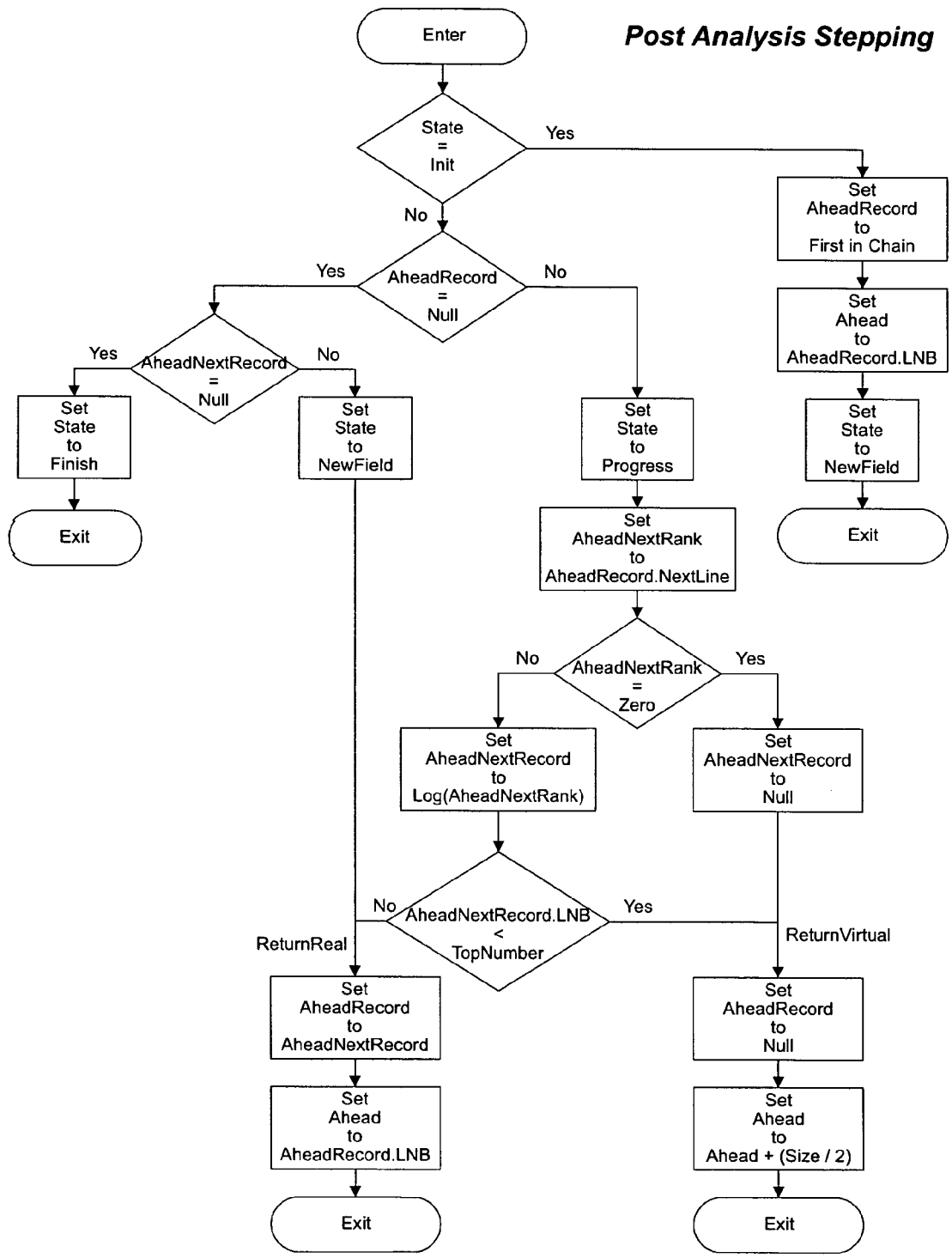
FIG. 48 shows a flow chart of one embodiment for progression of the LIFO, according to an aspect of the invention.

FIG. 48 shows a flow chart of one embodiment for progression of the LIFO.

Recall that two LIFO structures are used, one for post-line-analysis temporal filtering of blanking, and another for post-line-analysis temporal filtering of the phase. Each of these is now discussed.

Post-Line-Analysis Temporal Filtering of Blanking

For a given line record, the black level to be used in the post-processing functions, notably for black level restoration (clamping), is obtained by averaging a set of contiguous measurement around this line. In one embodiment, the number of lines contributing to this calculation is settable as a power of two determined by the settable high-level control parameter denoted LAC (Level Averaging Coefficient).

The size of the blanking filtering LIFO is therefore:

$$\text{Size}=2^{LAC}.$$

In one embodiment, the parameter LAC is adjusted between 0 and 6. The size of the filter therefore is between 1 (no filtering) and 64.

A relatively small LAC allows for fast tracking of black level variations, which happens for video signals that are AC coupled with too short a time constant. A relatively large LAC allows accommodating extremely noisy signals, while maintaining unvarying DC levels along the field. There is no absolute rule for setting the LAC parameter. The inventor has found that a good typical value is 4.

The source data for the blanking filter are the line record elements Anl.BLK of line records, obtained with a fractional accuracy as a result of the process(s) of the fully locked state. The blanking filtering results in a new line record element Anl.BLK_F . The suffix "_F" is used to denote the filtered nature of this element.

For filtering, the values Anl.BLK are transferred into the blanking LIFO.

Post-Line-Analysis Temporal Filtering of Phase

The resampling process requires relatively highly accurate timing measurements in the recorded video lines for accurate results. Two variables are introduced to represent these measurements: one is denoted ELD for Effective Line Duration, and the other is denoted ELS for Effective Leading Synchronization. In one embodiment, these are 32-bits variables representing a temporal location with the same accuracy as the scanning pointer.

Thus one has for each line a leading sync position ELS that provides a location in the front-end memory of the data, and also a length ELD.

In proper video, the leading sync position ELS increases linearly in time. Thus, in one embodiment, ELS is determined by carrying out a filtering operation that performs linear regression, i.e., fits a straight line from values obtained in line analysis for the sync positions.

ELD and ELS result from filtering the values Anl.TSE_P (Trailing Synchronization Edge) values measured by line analysis. The Anl.TSE_P values indicate with a good accuracy the position of the trailing synchronization in each sampling buffer. Each line record also holds a value Anl.ALA (Absolute Line Address) indicating their starting address.

The values Anl.TSE_P and Anl.ALA are transferred into the phase LIFO. This information form a contiguous neighborhood of lines contained in the phase LIFO is the source for computing the filtered values ELD and ELS.

ELS is the filtered location of the beginning of the full video line. ELD is the filtered duration of this full line. The resampling process directly uses these values, as described later in this document.

The "strength" of the phase filter is given by a settable high-level parameter denoted TAC (Timing Averaging Coefficient). Around the line to be filtered, the filtering method uses a linear regression formed from TAC+1 previous lines and TAC next lines. That is, since it is known that in a "perfect" signal, the quantities would vary linearly with time, filtering method fits a straight line around the values. This involves a neighborhood of 2×(TAC+1) lines, which in turn is the size of the phase filter.

In one embodiment, the parameter TAC is settable between 0 and 25. The size of the filter is therefore between 1 (no filtering) and 52.

A small TAC allows accommodating a large phase noise or phase variation, e.g., when the signal is known to be of low quality, e.g., issued by a low quality analog VCR. A large TAC improves the accuracy of the synchronization when the timing of the applied signals is stable, even if noise voltage is present in the video signal. There is no absolute rule for setting this parameter. The inventor has found that a good typical value is 10.

Figure 49:
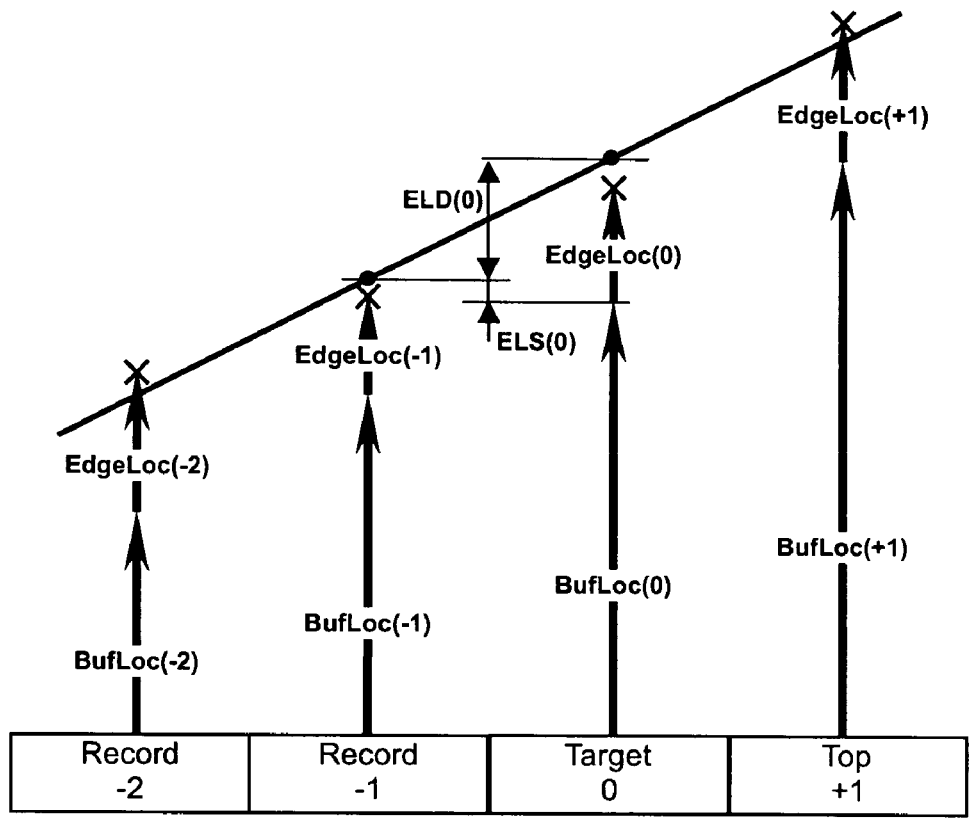
FIG. 49 illustrates, in simple form, the filtering process for fitting a straight line to the data according to an embodiment of the invention.

The filtering process for fitting a straight line to the data, known as linear regression, is illustrated in simple form in FIG. 49 for TAC=1, so a filter of length 4. The values to be computed, ELD and ELS, are each a linear combination of the measurements shown as crosses in the FIG. 49. Each cross corresponds to the sum of Anl.TSE_P and Anl.ALA for each contributing line buffer.

The function computing the filter realizes two linear combinations involving sums of products from two sets of coefficients.

The filtered value ELD is built by accumulating into a 64-bit variable called Duration herein. The filtered value ELS is build by accumulating into a 64-bit variable called Edge herein.

The multiplying coefficients are iteratively computed in variables called DurCoeff and EdgCoeff inside the loop scanning the participating records. These coefficients grow from quantities DurInc and EdgInc at each step in the loop, starting from DurFirst and EdgFirst.

After a multiply-accumulate, the accumulators are brought back to the pointing dynamic range using two factors called DurMult and EdgMult.

The quantities DurFirst, DurInc, DurMult, EdgFirst, EdgInc, EdgMult are computed off-line for different values of the parameter TAC. The computation uses standard linear regression to fit a straight line to the values obtained by the line analysis. How to so perform a linear regression would be known to those in the art.

Note that one aspect of the invention includes maintaining not just past values, but also future values. This is one advantage to maintaining the raw data in the front-end memory while carrying out line analysis. Still having this raw data provides for being able to carry out the linear regression also using "future" values to accurately provide the position of each sync pulse. Prior art solutions, because they process data as it comes, and do not keep raw data after it is processed, cannot achieve the same level of accuracy. They can only predict position from the past, not interpolate, e.g., using linear regression, to get an accurate measure of phase as described in this section.

Resampling After Line Analysis

Introduction

Recall that after line analysis, one embodiment includes post-analysis temporal filtering, resampling, and post-processing. This Section describes resampling, which is the operation yielding a sampled signal at a given frequency from an original sampled signal at another frequency. Resampling occurs once line analysis determines sufficient information about the raw data in the sampling buffer to construct video frames.

In this document, the resampling frequency is called DRR (Digital Resampling Rate), the reciprocal of which is DRP (Digital Resampling Period). In one embodiment, the resampling frequency is lower than the original sampling frequency, except when zooming is involved.

The following holds:

$$DRR = \frac{1}{DRP}.$$

Resampling Specification (Horizontal)

In this description, a video line reconstructed by resampling is characterized by three parameters. There are in fact four parameters defined, but they are related such that any fourth parameter can be deduced from the other three.

Figure 50:
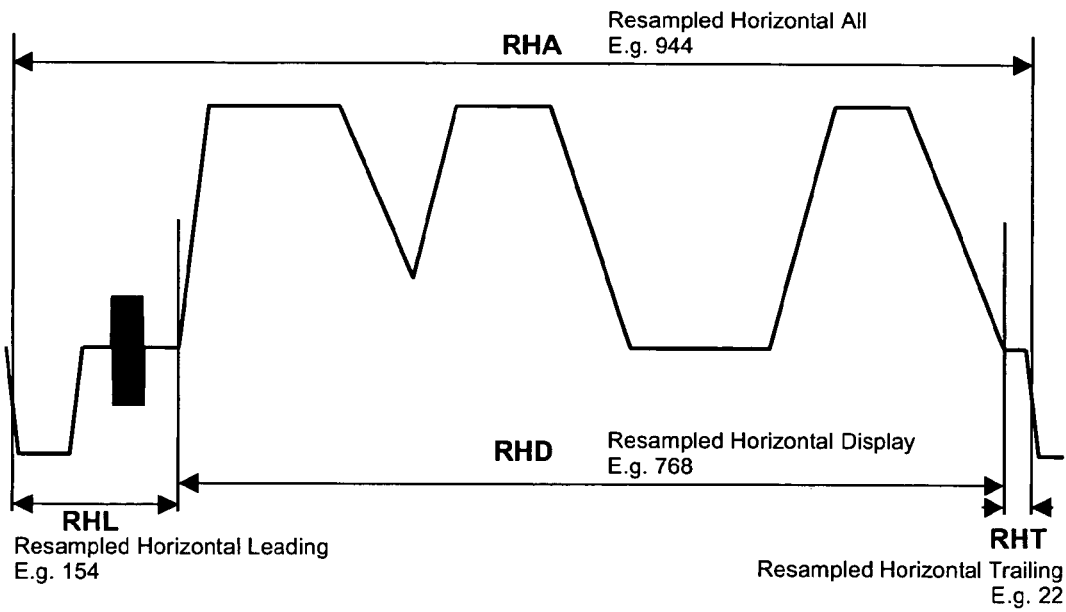
FIG. 50 shows a typical video line with resampling quantities according to an embodiment of the invention.

FIG. 50 shows a typical video line with resampling quantities. All quantities related to resampling are shown as an integer number of "resampled pixels". Denote by DRP the duration of a resampled pixel.

RHD denoted the resampled horizontal display region. In one embodiment, only the part covered by RHD is effectively resampled. In the overall width, denoted RHA for "Resampled Horizontal All", the quantity denoted by RHL for "Resampled Horizontal Leading" is the leading part, while the trailing part is denoted by RHT for "Resampled Horizontal Trailing."

As can be seen, $RHA=RHL+RHD+RHT.$

Relevant Parameters

The following parameter(s) are related to the process of resampling described herein: SPN (Scan Pointer Number) in bits, the total size of the scanning pointer, and SSU (Sub Sampling Uncertainty), the time gap in seconds, between two adjacent sub-sampling locations Scanning Pointer In one embodiment, resampling includes for each pixel carrying out an interpolation process that forms a weighted sum of existing pixels in the sampling buffer in a neighborhood of the desired resampled pixel. This is carried out by a convolution operation on the raw data in the sampling buffer using a convolution kernel that describes the weightings of the weighted sum. The information for resampling is that obtained by line analysis, and the specification of the desired resampling.

In one embodiment, this resampling operation uses a "scanning pointer". For each desired resampled pixel, this pointer accurately locates the neighborhood in the sampling buffer where the data samples contributing to the interpolation are fetched.

In one embodiment, the scanning pointer has a 32-bit structure with three fields. The first field, denoted SVN, has 14-bits and indicates as an integer the base address in the sampling buffer. The two remaining fields can be considered as fractional values smaller than unity refining the location between two sampling instants. Thus, the scanning pointer may be regarded as a fractional number having a whole integer part, and a fractional component. The fractional component consists of a second part and the third part of the pointer. The second part, denoted SSN (for sub-sampling number of bits) is a 6-bit value describing how (as a number of bits) the sampling interval is divided between two original samples. The third part, denoted SAN is a 12-bit value describing the number of bits used in the pointer below sub-sampling. This SAN field guarantees the precision of the scanning pointer after a number of increments are made that is equal to the length of the resampling buffer.

The least significant bit of the scanning pointer defines the smallest achieved unit of progression, and is called a "pointing unit" herein.

It would be clear to those in the art that many alternate structures to the pointer structure described herein can be used in alternate embodiments to point to a sub-sample. Furthermore, the numbers of bits used herein is by way of example, and not meant to be limiting.

Figure 51:
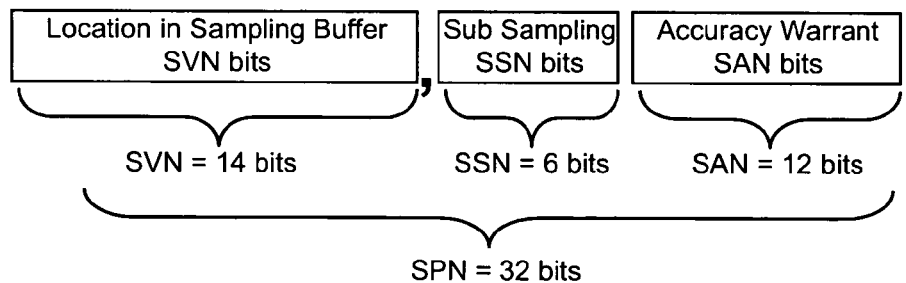
FIG. 51 shows a scanning pointer as used in one embodiment of the invention.

FIG. 51 shows a scanning pointer as used in one embodiment of the invention.

The term "resampling phase" is used herein to designate the inter-sample location of a desired resampled pixel. There are SSS possible resampling phases, with $SSS=2^{SSN}$, thus there are 64 resampling phases in the embodiment described. The resampling phase determines how the convolution kernel should be "phased" in front of the data contained in the sampling buffer to perform the computation.

Setting up the Initial Conditions for Resampling

The line analyzer provides the following two quantities to the resampling process:
- A pointer to the start of the active line. This pointer is denoted RAS_P, for Resampled Active Start, expressed in pointing units.
- A stepping increment for the scanning pointer. This increment is denoted DRP_P for Digital Resampling Period, expressed in pointing units.

Resampling a video line includes convolving by the interpolation kernel at successive locations spaced DRP_P pointing units apart, starting at RAS_P pointing units from the beginning of the sampling buffer, carried out for a count of a number, denoted RHD of pixels.

Convolution Kernel

Resampling includes an interpolation method that in one embodiment convolves the sampled data with a selected convolution kernel of a set of pre-selected convolution kernels.

Graphical View of the Interpolation

Figure 52:
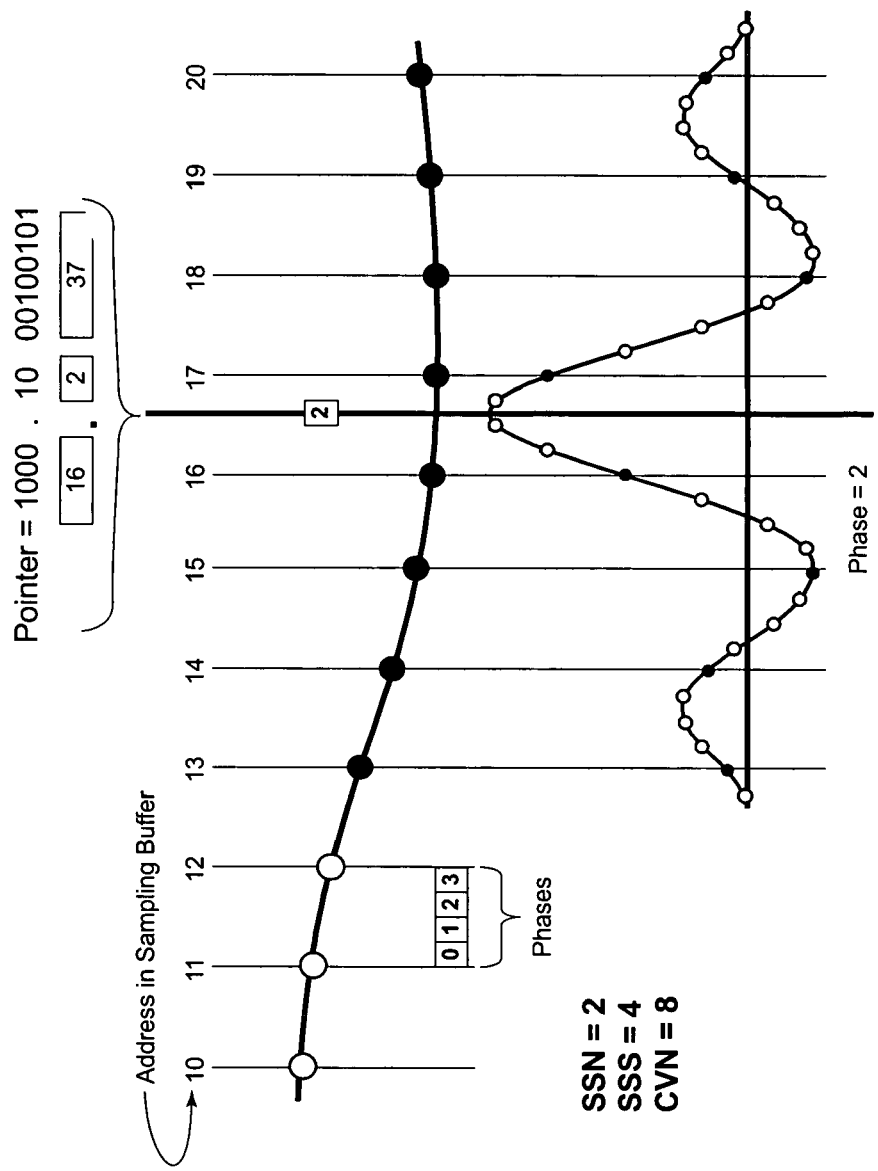
FIG. 52 provides a graphical view of the process of interpolation, with a convolution kernel that follows the well-known sinc (sin x/x) function, according to an aspect of the invention.

FIG. 52 provides a graphical view of the process of interpolation, with a convolution kernel that follows the well-known sinc (sin x/x) function. The resampling parameters shown in FIG. 52 are simplified for the purposes of illustrating the method. For the resampled value shown, samples addressed as 13, 14, . . . , 20 are used. The weights applied in the interpolation are the dark dots in the (sin x/x) function.

The Convolution Kernel

One aspect of the invention is that several convolution kernels may be used. One embodiment includes computing a set of convolution kernels in an off-line manner, according to sets of requirements. In operation, one the convolution-kernels is selected for the resampling process.

In addition to interpolation to produce a correctly sampled signal, one aspect of the invention is that the convolution kernel optionally includes one or more additional functions. Different embodiments provide one or more of: low-pass filtering with adjustable bandwidth, high-pass filtering for edge enhancing, called peaking herein, and notch filtering for color sub-carrier removal from color composite signal when monochrome decoding is requested. Such a notch filter is also called a "color trap" and the notch filtering "color trapping" herein.

In one embodiment, the relevant parameters for the convolution kernel are SHP (Shape), the general form (shape) of the interpolation filter, taking on one of the values LowPass, ColorTrap, PassBand, Peaking, or PeakTrap, and CVN (Number of convolution steps) that indicates the number of convolution steps required to create a single resampled value.

The following parameter values were found by the inventor to provide satisfactory performance.

A 12-bit resolution for each kernel coefficient. This corresponds to a coefficient span between −2048 and +2047.

The sum of the coefficients for a given kernel—its "weight"—is restricted to be a power of two. A parameter denoted KUV (Kernel Unitary Value) defines the weight of the kernel.

Amplitude recovery (recovery of the original amplitude) after convolution by bit-shifting. A parameter denoted KAS (Kernel Attenuation Shift) expresses the number of bits to shift after convolution to recover the original amplitude. Thus, $KUV=2^{KAS}$.

The number of convolution steps CVN lies between 8 and 26 according to the function assigned to the kernel.

Characteristics of a number of representative kernels as follows:

| Base Standard | Scanning | Recovered Resolution | ASR | DRR | Color Trap |
|---|---|---|---|---|---|
| PAL | Interlace | Broadcast | 20 MHz | 13.50 MHz | Yes |
|  |  | SquarePixel |  | 14.75 MHz |  |
| NTSC |  | Broadcast |  | 13.50 MHz |  |
|  |  | SquarePixel |  | 12.27 MHz |  |
| CCIR | Interlace or | Broadcast | 20 MHz | 13.50 MHz | No |
|  |  | SquarePixel |  | 14.75 MHz |  |
| EIA | Non-interlaced | Broadcast |  | 13.50 MHz |  |
|  |  | SquarePixel |  | 12.27 MHz |  |
| CCIR Double Speed | Non-interlaced | Broadcast | 40 MHz | 27.00 MHz | No |
|  |  | SquarePixel |  | 29.50 MHz |  |
| EIA Double Speed |  | Broadcast |  | 27.00 MHz |  |
|  |  | SquarePixel |  | 24.55 MHz |  |
| Industrial | Non-interlaced | N/A | 20 MHz | 18 MHz | N/A |
|  |  |  | 40 MHz | 20 MHz |  |
|  |  |  |  | 23 MHz |  |
|  |  |  |  | 25 MHz |  |
|  |  |  |  | 28 MHz |  |
|  |  |  |  | 32 MHz |  |
|  |  |  |  | 35 MHz |  |
|  |  |  |  | 40 MHz |  |

Size of the Resampled Image (Vertical Specification)

The following parameters relate to resizing in post-processing in the vertical dimension: RVD (Resampled Vertical Display), the number of lines making up a resampled image, and RVT (Resampled Vertical Trailing), the number of lines from the resampled image end to the vertical synchronization.

After temporal post-line-analysis filtering, the line analysis data structure contains all needed information to build a resampled image. More than one image can be built, each having different characteristics.

One embodiment provides user settable controls affecting the size of a resampled image.

Horizontal parameters were defined in the above description of the convolution operation. These horizontal quantities are expressed in resampled pixels. The total number of resampled pixels for a single line is denoted RHA, which can be adjusted. This is equivalent to adjusting the resampling frequency, thus allows for zooming or scaling in the horizontal direction.

The decoding processes described above do not directly provide for scaling or zooming in the vertical direction. The parameter denoted RVA is constant for the decoding process, and equals the total number of lines to be decoded. RVA is odd for an interlaced video standard.

The vertical location of any resampled image is defined by a parameter denoted RVL (Resampled Vertical Leading). For a non-interlaced video standard, this is the number of lines between the first conventional line as per the standard and the first required line. For an interlaced video standard, a mechanism is provided to enable the vertical positioning within one single line irrespective of interlace.

Vertical Scanning to Build a Complete Resampled Image

Vertical Indexing Tables (Off-Line Calculation)

Scanning the line analysis data structure in order to build a complete resampled image is not trivial because of one or more of the following:

Any interlacing.

The variety of vertical synchronization structures.

The required position and size of the image.

Any loss of synchronization that causes one or more locked line records to be missing in the middle of the image.

One embodiment uses two vertical indexing tables called EvenDecY and OddDecY to help generate a complete image. The index of these tables is a conventional line number, according to the definition described herein in the Section titled "Video signal conventions."

These tables provide a zero-based vertical coordinate (Y) locating the line in the image to be resampled. EvenDecY is used when the targeted line belongs to the even field, and OddDecY is used when the targeted line belongs to the odd field. Any line not belonging to the image to be resampled is valued -I in the tables.

An off-line computer program is used to build the vertical indexing tables. This program is used each time a user requests another vertical size or vertical position for the image to be resampled. The tables are then re-built using the off-line computer program. The method uses the decoding capabilities of the frame grabber, as defined earlier in this document in the decoding register that holds parameters VSC (Vertical Scanning Capability), CDC (Color Decoding Capability), SPC (Synchronization Pattern Capability).

FIG. 53 shows the pseudocode for such an off-line computer program. An implementation of this program uses variables, one for the case of standard interlaced, and another for the case of standard non-interlaced that express the total size of the frames and of the images. The interlaced version variable is floating-point and equal to a whole number+½. For traditional interlaced standards, this variable is 262.5 for NTSC and 312.5 for PAL.

Scanning the Line Analysis Data Structure

Lines from the line analysis data structure are scanned as long as the preceding stages of the decoder produce line records.

All line records are blindly tested. A line record is recognized as a bearer of valuable information if its line record element LNB is not zero. Recall that this line record element designates the conventional video line number, and that this numbering system starts at 1. Thus, for a line record, an LNB of zero is an indication of a useless line record.

In one embodiment, the off-line computed vertical indexing tables EvenDecY and OddDecY are applied to the line record elements LNB of the scanned line records to obtain the vertical coordinate in the to-be-resampled image, if it exists.

A line is resampled and stored at the appropriate vertical location in the final frame buffer, e.g., in the host memory or a separate memory in the frame grabber, if the indexing function provides a non-zero result.

Resampling in More Detail

Resampling in the horizontal dimension was discussed above, and is now discussed in more detail. A parameter that is related to sampling is DRN (Digital Resample Number of bits), the bit depth of the luminance data after resampling. The resampling rate is expressed by a parameter denoted DRR (Digital Resampling Rate).

$$DRR = RHA/TLD,$$

where RHA (Resampled Horizontal All) denotes the number of resampled pixels for the whole line, and TLD (Total Line Duration) denotes the duration in seconds of this whole line. The reciprocal of this frequency DDR is of course the resampling period DRP (Digital Resampling Period).

In one embodiment, the dynamic range for resampling is set by the user. The resampling dynamic range is given by a parameter denoted DRN and it's number of levels, DRL (Digital Resampling Levels), with $DRL=2^{DRN}$.

The resampling period is expressed as a fraction of the total line by a parameter denoted DRP_R (Digital Resampling Period Relative). The delay between the edge of the horizontal synchronization and the start of resampled part of the line is expressed as a fraction of the total line by a parameter denoted RHL_R (Resampled Horizontal Leading Relative).

In one embodiment, these relative delays are coded in fixed point on 22 bits. The value $2^{22}$, or i.e., U.S. Pat. No. 4,194,304, is the code for unity. The inventor has found that this provides accuracy for most applications. One can write:

$$DRP\_R = \frac{2^{22}}{RHA}$$

$$RHL\_R = \frac{RHL \times 2^{22}}{RHA}.$$

For each line to be resampled, an effective value for the resampling period is computed using the filtered measurement of the line duration, ELD (the Effective Line Duration), reported in the corresponding line record. This resampling period is called DRP_P (Digital Resampling Period), and is expressed in pointing units using 32 bits. As ELD can slightly vary from line to line, so can DRP_P, providing adaptation to possible timing instabilities. DRP_P is given by:

$$DRP\_P = \frac{ELD \times DRP\_R}{2^{22}}$$

For each line to be resampled, an effective location for the start of resampling is computed using the filtered measurement of the leading synchronization edge, ELS (the Effective Leading Synchronization), reported in the corresponding line record. The computation also uses ELD. This location for the start of resampling is called RAS_P (for Resampled Active Start), and is expressed in pointing units using 32 bits. As ELS and ELD can slightly vary from line to line, so can RAS_P, providing adaptation to possible timing instabilities. RAS_P is given by:

$$RAS\_P = ELS + \frac{ELD \times RHL\_R}{2^{22}}$$

ELS is typically between 0 and 1 sample periods, but can occasionally exceed this range because of jitter and noise in the signal. Therefore, in one embodiment, the variable ELS is a signed quantity.

RAS_P is forced to be always positive; the interval RHL is substantially larger than the possible variations of ELS.

The above-described RAS_P and DRP_P are thus positive 32-bit integer numbers representing a temporal location with the same resolution as the scanning pointer. They are used as-is by the resampling routine as the starting point and the increment, respectively, for the resampling loop.

Dynamic Range Modification

Figure 54:
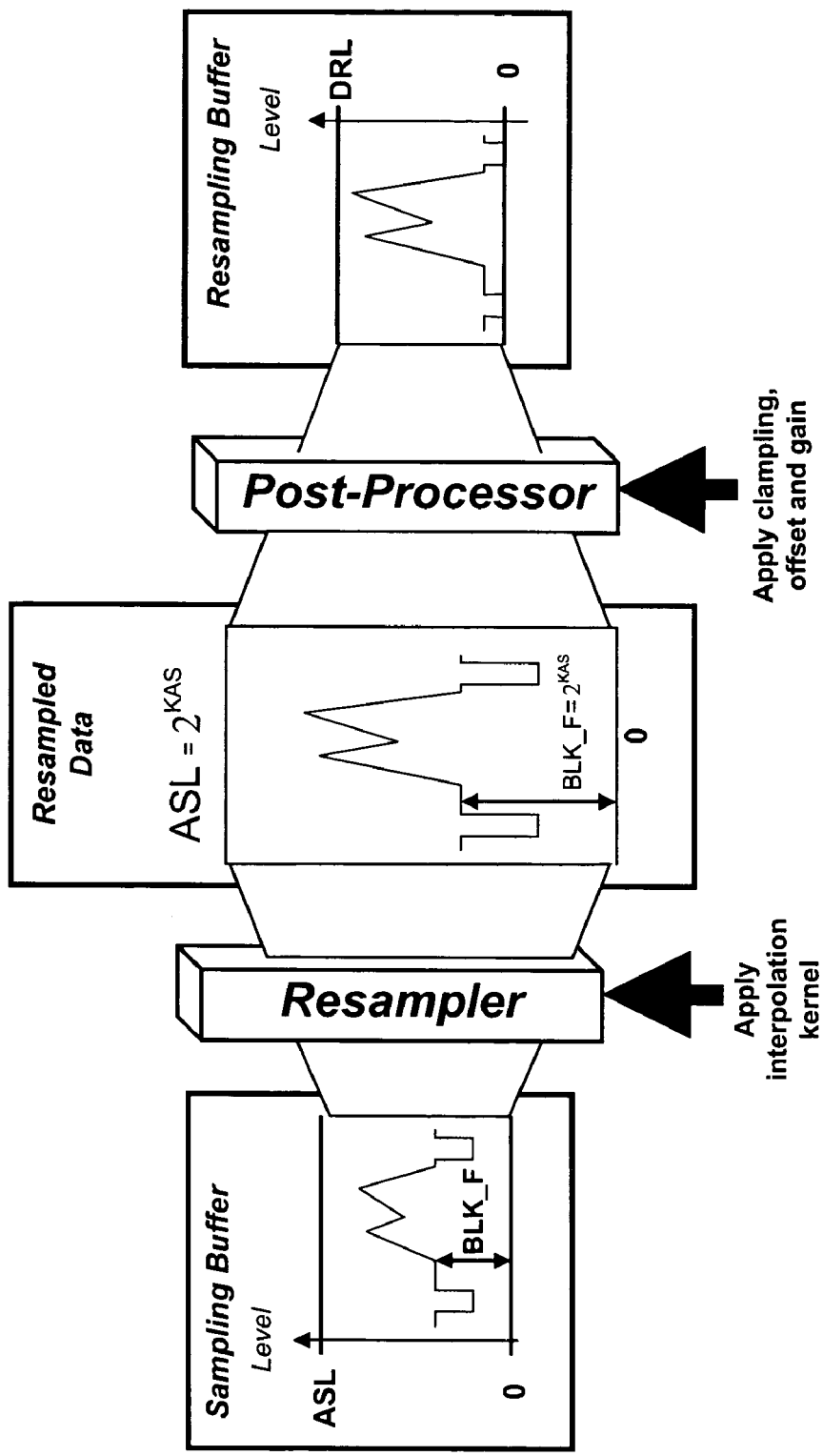
FIG. 54 shows a schematic diagram of the dataflow and actions performed by dynamic range modification during post-processing, according to an aspect of the invention.

FIG. 54 shows a schematic diagram of the dataflow and functions performed by dynamic range modification during post-processing.

Starting with the sampling buffer, convolving the interpolation kernel with the sampling buffer generates resampled data in an expanded dynamic range where values are represented by large integer numbers.

One aspect of modifying the dynamic range is to convert the dynamic range of the resampled post-convolution data to the required dynamic range of resampling buffer, which can differ from the original sampling buffer dynamic range. The parameter denoted KAS (Kernel Attenuation Shift) denotes a factor expressed by its power of two that returns the dynamic range after resampling back the dynamic range of the original sampling buffer.

Another aspect of modifying the dynamic range is to remove the DC component. This is called clamping, and is carried out according to the filtered measurement of the black level provided by BLK_F in the line records.

Another aspect of modifying the dynamic range it to provide a user-adjusted gain and a user adjusted offset.

According to yet another aspect, automatic gain correction is optionally applied. This is called the AGC feature (Automatic Gain Control).

According to yet another aspect, a look-up table transformation is applied.

Gain

The gain desired by a user is provided as a parameter denoted URG (User Required Gain). URG expresses a deliberate multiplying factor to be applied to the signal before applying a deliberate offset. In one embodiment, a range of URG from 0 to 8 is provided.

A value of one means rendering of the original amplitude such that the nominal amplitude of the luminance component in the video signal exactly occupies the output dynamic range. That output dynamic range is expressed by a parameter denoted DRL (Digital Resampling Levels). Values other than one proportionally vary the amplitude of the reconstructed signal.

The nominal amplitude of the luminance component in a standard video signal is 700 mV for PAL signals and 661 mV for NTSC signals. This is expressed by the parameter denoted SVA (Standard Video Amplitude).

The value Gain is computed off-line and held as a 16-bit fractional fixed-point quantity with a fractional accuracy of 10 bits. A floating point version denoted FltGain is first computed according to.

$$FltGain = \frac{DRL}{ASL} \times \frac{ASS}{SVA} \times URG$$

$$Gain = Integer(FltGain \times 2^{10}),$$

where ASS (Analog Sampling Span) is the digitizing voltage range of the A/D converter, DRL (Digital Resampling Levels) is the number of levels provided after resampling, and ASL (Analog Sampling Levels) is the number of levels provided by the A/D converter.

For example, if URG=1.2, SVA=0.7 Volts, ASS=2 Volts, and DRL=ASL=1024, then the value for FltGain is 3.429 and for Gain is 3511.

Offset

The offset desired by the user is provided by the user as a parameter denoted URO (User Required Offset). A zero value means that the black level of the original signal occupies the level zero in the resampled data.

The computation of offset takes into account the black level inherent in standard NTSC, expressed by the parameter denoted SBS (Standard Black Setup), which is 54 mV in NTSC. SBS is 0 mV in PAL.

The parameter denoted URO expresses a deliberate additive term to be applied to the digital signal after deliberate application of a gain. In one embodiment, URO has a range of −8 to +8. Positive values locate the black level above the zero value, and consequently brighten the reconstructed image. The value +1 locates the black level at the value DRL. Negative values locate the black level below the zero value, and consequently darken the reconstructed image. The value −1 locates the black level at −DRL.

However, the output signal is actually restricted to be in the range 0 to (DRL−1).

An offset control below −1 allows bringing back an over-amplified video signal into the observable output dynamic range.

The value Offset is computed off-line and held as a 16-bit fractional fixed-point data with a fractional accuracy of 2 bits. A floating version FltOffset is first computed. FltOffset and Offset are computed as $$FltOffset = DRL \times \left(URO - \frac{SBS}{SVA}\right)$$

$$Offset = Integer(FltOffset \times 2^2).$$

For example, if URO=0.2, SBS=0.054 Volts, SVA=0.661 Volts, and DRL=1024, then the value for FltOffset is 121.144 and for Offset is 485.

On-Line Computation

In one embodiment, the raw result of the interpolation (resampling) process for a pixel to be rebuilt, prior to modifying the dynamic range, is contained in a variable denoted MAC with enough bits to contain the sum of products involved in the convolution. This number of bits is ASN +KAS, where ASN (Analog Sampling Number of bits) is the number of bits of the direct sampling, e.g. 10, and KAS (Kernel Attenuation Shift) denoted the number of bits added by the convolution process, e.g. 11 or 12. Thus, in one embodiment, MAC has 22 bits.

In one embodiment, MAC, the result of the interpolation, is brought back to a 16-bit dynamic range by a right-shift operation of KAS−ASN bits. The result is stored in a variable denoted RsmData. Thus, RsmData stores $MAC \times 2^{16-ASN}/2^{KAS}$.

The filtered measurement BLK_F is subtracted from RsmData in order to restore the DC level. Thus, in one embodiment, RsmData is replaced by RsmData−BLK_F.

The off-line computed gain is then applied. For this, RsmData is replaced by $RsmData \times Gain/(2^{24-ASN})$. The exponent 24 comes from the addition of:

The size of the container for sampling data (+16).
The fractional accuracy of the gain control (+10).
The fractional accuracy of the offset control (−2).

The off-line computed offset is then applied. For this, RsmData is replaced by $[RsmData+Offset]/(2^2)$. The exponent 2 comes from the fractional accuracy of the offset control.

Finally, the result is saturated within the defined range for resampled data, i.e. between 0 and DRL−1. RsmData is replaced by Min(RsmData, DRL−1), then RsmData is replaced by Max(RsmData, 0).

Thus has been described a method and an apparatus to process video signals and to provide a frame grabber function, including blindly sampling input video signal or signals without such sampling being in any way synchronized to any characteristics of the video signal.

It should be appreciated that although the invention has been described in the context of various kinds of video signals and applications such as industrial vision and video surveillance, the invention is not limited to such contexts and applications, and may be utilized in various other applications and systems, for example in other systems that require real time capture of video data.

One embodiment of each of the methods described herein is in the form of a computer program that executes on a processing system, e.g., a one or more processors that are part of an FPGA that implements a frame grabber. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method, comprising:
accepting video samples of at least one video signal representing lines of at least one video image, at least one of the video signals including horizontal synchronization pulses at a sync tip level, the video samples formed by blindly sampling the least one video signal in a manner unsynchronized with the video signal or any synchronization signal related to the video signal;
storing the accepted video samples in a memory, the memory able to store at least one video line of video samples of each video signal; and
analyzing in real time sets of the accepted video samples of the at least one video signal, each set including at least one video line of samples of a video image, the analyzing to determine video characteristics of successive video lines of any image in the at least one video signal to provide information sufficient for decoding the video information in the video samples, the analyzing including determining the horizontal synchronization location in each line of the set of video samples of the at least one video signal which contains a horizontal synchronization pulse at a synch tip level and a back porch region at a black level,
the analyzing being at a rate that can keep up with the rate of storing the samples of the at least one video line in the memory, such that the method can decode video in real time.

2. A method as recited in claim 1, wherein the analyzing of a set includes:
   determining an initial value of the black level and an initial value of the sync tip level; and
   locating the horizontal synchronization pulse initially using the initial values of the black and the sync tip levels to determine the horizontal phase of the video samples in the memory.

3. A method as recited in claim 2, wherein the analyzing of a set further includes:
   determining whether the set includes a back porch region at a black level and a horizontal synchronization pulse at a sync tip level.

4. A method as recited in claim 2, wherein the determining of initial values of the black and sync tip levels includes determining a histogram of the levels, and determining the initial values of the black level and the sync tip level from the histogram.

5. A method as recited in claim 2, wherein the analyzing of a set includes:
   subsampling the set of samples, such that the determining of the initial values of the black and sync tip levels is carried out on subsamples of the set of samples.

6. A method as recited in claim 2, wherein the analyzing of a set includes:
   subsampling the set of samples, such that the initial locating of the horizontal synchronization pulse is carried out on subsamples of the set of samples.

7. A method as recited in recited in claim 2, further including updating the determined black level and sync tip level as analyzing is carried out on new sets of video samples.

8. A method as recited in claim 7, further comprising temporally filtering the black level and sync tip levels determined for different lines to provide temporally filtered versions of the black level and sync tip levels, and farther comprising temporally filtering the location of the horizontal synchronization to provide a temporally filtered version of the horizontal location.

9. A method as recited in claim 2, wherein the initial locating of the horizontal synchronization pulse uses thresholding with thresholds based on the determined black and sync tip levels.

10. A method as recited in claim 1, wherein at least one of the video signals includes vertical synchronization information, and wherein the analyzing of a set includes:
    ascertaining if the set includes an active video line, or a video line containing a vertical timing indicator.

11. A method as recited in claim 10, wherein the analyzing of a set further includes:
    in the case it has been ascertained that the set includes a video line contains a vertical timing indicator, waiting for active video lines; and
    assigning a line number to each video line,
such that the data in the memory for which vertical position has been determined can be vertically resampled to provide a vertically resampled video data.

12. A method as recited in claim 11, further comprising:
    vertically resampling data in the memory to provide vertically resampled video data.

13. A method as recited in claim 1, wherein the analyzing of a set operates in one of a set of states, the transition between the states being describable by a state transition diagram.

14. A method as recited in claim 1, wherein the memory is arranges as a first-in-first-out buffer for each video image in the one or more video signals.

15. A method as recited in claim 1, further comprising:
    keeping track of when it is likely that a complete line has been stored in the memory; and
    activating or re-activating the process carrying out the line analyzing to analyze the sampled data once there is at least one complete new line of samples stored in the memory.

16. A method as recited in claim 1, wherein the at least one video signal includes a multiplexed sequence of different video images, and wherein the analyzing properly decodes each video image in the multiplexed sequence, such that one or more of the images may be resampled with a negligible switching delay between each image such that the frame rate per video image is maintained.

17. A method as recited in claim 1, wherein the analyzing does not modify the video samples stored in the memory, and further, the analyzing such that data in the memory for which horizontal phase has been determined can be horizontally resampled to provide horizontally resampled video data.

18. A method as recited in claim 17, further comprising:
    horizontally resampling data in the memory to provide horizontally resampled video data.

19. A method as recited in claim 18, wherein the horizontal resampling uses interpolation according to a convolution kernel.

20. A method as recited in claim 1, further comprising:
    blindly sampling the least one video signal in a manner unsynchronized with the video signal or any synchronization signal related to the video signal, the blindly sampling producing the video samples.

21. A method as recited in claim 1, wherein the at least one or more video signal is of a plurality of kinds of video signal, such that the method is able to decode any one of a monochrome composite video signal, a color composite signal, a monochrome video signal with separate synchronization, the decoding including staffing the decoding it at any time according to a provided asynchronous reset signal.

22. A method as recited in claim 21, wherein the composite video signals that the method is able to decode can be interlaced or noninterlaced.

23. A method as recited in claim 1, further comprising, once the video line number and corresponding position in the memory of such video line number is known, keeping track of the current line number and, in the case of interlaced video, of the current field parity, such that, if the video signal is switched at some point from a first video source to another video source, when the data is switched back to the first video source, such switching can occur at the same vertical point for the first video source, such that there is no need to wait until the start of new field to re-synchronize to the first video source, to provide virtually instantaneous switching from one video source to another to achieve high frame rate per video source in a signal that includes a set of multiplexed video signals.

24. A method as recited in claim 1, further comprising, once the line number and corresponding position in the memory of such video line number is known, keeping track of the current line number and, in the case of interlaced video, of the current field parity, such that, in the case of an asynchronous reset signal is provided to capture a single frame, such a reset may occur anywhere in a video frame of the at least one video signal without the need to wait for a vertical blanking region.

25. A method as recited in claim 1, wherein the samples are unclamped and are of an unclamped video signal.

26. A method as recited in claim 1, wherein the analyzing includes creating pixel clock data.

27. An apparatus, comprising:
  means for accepting video samples of at least one video signal representing lines of at least one video image, at least one of the video signals including horizontal synchronization pulses at a sync tip level, the video samples formed by blindly sampling the least one video signal in a manner unsynchronized with the video signal or any synchronization signal related to the video signal;
  means for storing the accepted video samples, the means for storing able to store at least one video line of video samples of each video signal; and
  means for analyzing sets of the accepted video samples of the at least one video signal, the analyzing means coupled to the means for storing, each set including at least one video line of samples of a video image, the analyzing means including means for determining video characteristics of successive video lines of any image in the at least one video signal to provide information sufficient for decoding the video information in the video samples, the analyzing means including means for determining the horizontal synchronization location in each line of the set of video samples of the at least one video signal which contains a horizontal synchronization pulse at a synch tip level and a back porch region at a black level,
the analyzing by the means for analyzing being at a rate that can keep up with the rate of storing the samples of the at least one video line in the memory, such that the apparatus can decode video in real time.

28. An apparatus as recited in claim 27, wherein the analyzing means includes:
  means for determining an initial value of the black level and an initial value of the sync tip level in a set of samples; and
  means for locating the horizontal synchronization pulse in a set of samples, the means for locating initially using the initial values of the black and the sync tip levels to determine the horizontal phase of the video samples in the means for storing.

29. An apparatus as recited in recited in claim 28, further including means for updating the determined black level and sync tip level as analyzing is carried out on new sets of video samples.

30. An apparatus as recited in claim 27, wherein at least one of the video signals includes vertical synchronization information, and wherein the means for analyzing includes:
  means for ascertaining if the set includes an active video line, or a video line containing a vertical timing indicator.

31. An apparatus as recited in claim 30, wherein the means for analyzing includes:
  means for waiting for active video lines in the case it has been ascertained that the set includes a video line contains a vertical timing indicator; and
  means for assigning a line number to each video line,
such that the data in the means for storing for which vertical position has been determined can be vertically resampled to provide a vertically resampled video data.

32. A carrier medium carrying code to cause a processor of a processing system to carry out a method comprising:
  accepting video samples of at least one video signal representing lines of at least one video image, at least one of the video signals including horizontal synchronization pulses at a sync tip level, the video samples formed by blindly sampling the least one video signal in a manner unsynchronized with the video signal or any synchronization signal related to the video signal;
  storing the accepted video samples in a memory, the memory able to store at least one video line of video samples of each video signal; and
  analyzing in real time sets of the accepted video samples of the at least one video signal, each set including at least one video line of samples of a video image, the analyzing to determine video characteristics of successive video lines of any image in the at least one video signal to provide information sufficient for decoding the video information in the video samples, the analyzing including determining the horizontal synchronization location in each line of the set of video samples of the at least one video signal which contains a horizontal synchronization pulse at a synch tip level and a back porch region at a black level,
the analyzing being at a rate that can keep up with the rate of storing the samples of the at least one video line in the memory, such that the method can decode video in real time.

33. A carrier medium as recited in claim 32, wherein the analyzing of a set includes:
  determining an initial value of the black level and an initial value of the sync tip level; and
  locating the horizontal synchronization pulse initially using the initial values of the black and the sync tip levels to determine the horizontal phase of the video samples in the memory.

34. A carrier medium as recited in claim 33, wherein the determining of initial values of the black and sync tip levels includes determining a histogram of the levels, and determining the initial values of the black level and the sync tip level from the histogram.

35. A carrier medium as recited in recited in claim 33, further including updating the determined black level and sync tip level as analyzing is carried out on new sets of video samples.

36. A carrier medium as recited in claim 33, wherein the initial locating of the horizontal synchronization pulse uses thresholding with thresholds based on the determined black and sync tip levels.

37. A carrier medium as recited in claim 32 wherein at least one of the video signals includes vertical synchronization information, and wherein the analyzing of a set includes:
  ascertaining if the set includes an active video line, or a video line containing a vertical timing indicator.

38. A carrier medium as recited in claim 37, wherein the analyzing of a set further includes:
  in the case it has been ascertained that the set includes a video line contains a vertical timing indicator, waiting for active video lines; and
  assigning a line number to each video line,
such that the data in the memory for which vertical position has been determined can be vertically resampled to provide a vertically resampled video data.

39. A carrier medium as recited in claim 32, wherein the analyzing of a set operates in one of a set of states, the transition between the states being describable by a state transition diagram.

40. A carrier medium as recited in claim 32, wherein the at least one video signal includes a multiplexed sequence of different video images, and wherein the analyzing properly decodes each video image in the multiplexed sequence, such that one or more of the images may be resampled with a negligible switching delay between each image such that the frame rate per video image is maintained.

41. A carrier medium as recited in claim 32, wherein the analyzing does not modify the video samples stored in the memory, and further, the analyzing such that data in the memory for which horizontal phase has been determined can be horizontally resampled to provide horizontally resampled video data.

42. A carrier medium as recited in claim 32, wherein the at least one video signal is of a plurality of kinds of video signal, such that the method is able to decode any one of a monochrome composite video signal, a color composite signal, a monochrome video signal with separate synchronization, the decoding including staffing the decoding it at any time according to a provided asynchronous reset signal.

43. A carrier medium as recited in claim 42, wherein the composite video signals that the method is able to decode can be interlaced or noninterlaced.

44. A carrier medium as recited in claim 32, wherein the method further comprises, once the video line number and corresponding position in the memory of such video line number is known, keeping track of the current line number and, in the case of interlaced video, of the current field parity, such that, if the video signal is switched at some point from a first video source to another video source, when the data is switched back to the first video source, such switching can occur at the same vertical point for the first video source, such that there is no need to wait until the staff of new field to re-synchronize to the first video source, to provide virtually instantaneous switching from one video source to another to achieve high frame rate per video source in a signal that includes a set of multiplexed video signals.

45. A carrier medium as recited in claim 32, wherein the method further comprises, once the line number and corresponding position in the memory of such video line number is known, keeping track of the current line number and, in the case of interlaced video, of the current field parity, such that, in the case of an asynchronous reset signal is provided to capture a single frame, such a reset may occur anywhere in a video frame of the at least one video signal without the need to wait for a vertical blanking region.

46. A carrier medium as recited in claim 32, wherein the samples are unclamped and are of an unclamped video signal.

47. An apparatus, comprising:
a memory to accept and store video samples of at least one video signal representing lines of at least one video image, at least one of the video signals including horizontal synchronization pulses at a sync tip level, the video samples formed by blindly sampling the least one video signal in a manner unsynchronized with the video signal or any synchronization signal related to the video signal, the memory able to store at least one video line of video samples of each video signal; and
a line analyzer coupled to the memory to analyze sets of the accepted video samples of the at least one video signal, each set including at least one video line of samples of a video image, the analyzer arranged to determine video characteristics of successive video lines of any image in the at least one video signal to provide information sufficient for decoding the video information in the video samples, the analyzing including determining the horizontal synchronization location in each line of the set of video samples of the at least one video signal which contains a horizontal synchronization pulse at a synch tip level and a back porch region at a black level,
the analyzing by the line analyzer being at a rate that can keep up with the rate of storing the samples of the at least one video line in the memory, such that the analyzer can decode video in real time.

48. An apparatus as recited in claim 47,
wherein the analyzer is arranged to determine an initial value of the black level and an initial value of the sync tip level; and
wherein the analyzer is farther arranged to locate the horizontal synchronization pulse initially using the initial values of the black and the sync tip levels to determine the horizontal phase of the video samples in the memory.

49. An apparatus as recited in claim 48,
wherein the analyzer is farther arranged to determine whether the set includes a back porch region at a black level and a horizontal synchronization pulse at a sync tip level.

50. An apparatus as recited in claim 48, wherein the analyzer's determining of initial values of the black and sync tip levels includes determining a histogram of the levels, and determining the initial values of the black level and the sync tip level from the histogram.

51. An apparatus as recited in claim 48, wherein:
the analyzer is further arranged to subsample the set of samples, such that the analyzer's determining of the initial values of the black and sync tip levels is carried out on subsamples of the set of samples.

52. An apparatus as recited in claim 48, wherein:
the analyzer is further arranged to subsample the set of samples, such that the analyzer's initial locating of the horizontal synchronization pulse is carried out on subsamples of the set of samples.

53. An apparatus as recited in recited in claim 48, wherein:
the analyzer is further arranged to update the determined black level and sync tip level as analyzing is carried out on new sets of video samples.

54. An apparatus as recited in claim 53, wherein:
the analyzer is further arranged to temporally filter the black level and sync tip levels determined for different lines to provide temporally filtered versions of the black level and sync tip levels, and to temporally filter the location of the horizontal synchronization to provide a temporally filtered version of the horizontal location.

55. An apparatus as recited in claim 48, wherein the analyzer's initial locating of the horizontal synchronization pulse uses thresholding with thresholds based on the determined black and sync tip levels.

56. An apparatus as recited in claim 47, wherein at least one of the video signals includes vertical synchronization information, and wherein the analyzer is arranged to ascertain if the set includes an active video line, or a video line containing a vertical timing indicator.

57. An apparatus as recited in claim 56, wherein the analyzer is further arranged:
to wait for active video lines in the case it has been ascertained that the set includes a video line contains a vertical timing indicator; and
to assign a line number to each video line,
such that the data in the memory for which vertical position has been determined can be vertically resampled to provide a vertically resampled video data.

58. An apparatus as recited in claim 57, further comprising:
a resampler coupled to the memory to vertically resample data in the memory to provide vertically resampled video data using the results of the analysis by the analyzer.

59. An apparatus as recited in claim 47, wherein the analyzer is arranged to operate on the set in one of a set of states, the transition between the states being describable by a state transition diagram.

60. An apparatus as recited in claim 47, wherein the memory is arranges as a first-in-first-out buffer for each video image in the one or more video signals.

61. An apparatus as recited in claim 47, wherein the analyzer is further arranged to keeping track of when it is likely that a complete line has been stored in the memory; and wherein the apparatus is arranged to activate or re-activate the analyzer to analyze the sampled data once there is at least one complete new line of samples stored in the memory.

62. An apparatus as recited in claim 47, wherein the at least one video signal includes a multiplexed sequence of different video images, and wherein the analyzer is arranged to properly decode each video image in the multiplexed sequence, such that one or more of the images may be resampled with a negligible switching delay between each image such that the frame rate per video image is maintained.

63. An apparatus as recited in claim 47, wherein the analyzer is arranged to not modify the video samples stored in the memory, and further, the analyzer is arranged such that data in the memory for which horizontal phase has been determined can be horizontally resampled to provide horizontally resampled video data.

64. An apparatus as recited in claim 63, further comprising:
a resampler coupled to the memory to horizontally resample data in the memory to provide horizontally resampled video data according to information from the analysis by the analyzer.

65. An apparatus as recited in claim 47, further comprising:
an analog-to-digital converter coupled to the memory to produce the video samples by blindly sampling the least one video signal in a manner unsynchronized with the video signal or any synchronization signal related to the video signal.

66. An apparatus as recited in claim 47, wherein the at least one or more video signal is of a plurality of kinds of video signal, such that the apparatus is able to decode any one of a monochrome composite video signal, a color composite signal, a monochrome video signal with separate synchronization, the decoding including starting the decoding it at any time according to a provided asynchronous reset signal.

67. An apparatus as recited in claim 66, wherein the composite signals that the apparatus is able to decode can be interlaced or noninterlaced.

68. An apparatus as recited in claim 47, wherein the analyzer is arranged, once the video line number and corresponding position in the memory of such video line number is known, to keep track of the current line number and, in the case of interlaced video, of the current field parity, such that, if the video signal is switched at some point from a first video source to another video source, when the data is switched back to the first video source, such switching can occur at the same vertical point for the first video source, such that there is no need to wait until the start of new field to re-synchronize to the first video source, to provide virtually instantaneous switching from one video source to another to achieve high frame rate per video source in a signal that includes a set of multiplexed video signals.

69. An apparatus as recited in claim 47, wherein the analyzer is arranged, once the line number and corresponding position in the memory of such video line number is known, to keep track of the current line number and, in the case of interlaced video, of the current field parity, such that, in the case of an asynchronous reset signal is provided to capture a single frame, such a reset may occur anywhere in a video frame of the at least one video signal without the need to wait for a vertical blanking region.

70. An apparatus as recited in claim 47, wherein the samples are unclamped and are of an unclamped video signal.

71. A method of recovering video synchronization information from a set of sampled video data, the method comprising:
accepting a set of samples of an analog video signal, the analog video including synchronization information, including a back porch region at a black level and a horizontal synchronization pulse at a sync tip level, the analog video signal further including a vertical blanking region, the set of samples obtained by blindly sampling the video signal in a manner unsynchronized with the video signal or any synchronization signal related to the video signal;
analyzing the set of the video samples that includes a single line of video data, the analyzing in using the set of samples, and including:
determining an initial value of the black and the sync tip levels;
using the initial value of the black and the sync tip levels to locate the horizontal synchronization pulse;
determining if the set includes an active video line, or a line containing a vertical timing indicator;
in the case it has been determined that the line contains a vertical timing indicator, detecting a vertical synchronization pulse to determine the line numbers of subsequent video lines; and
storing information obtained about the analyzed video line; and
resampling the set of samples using the information obtained and stored about the analyzed video line, and desired resampling characteristics,
the analyzing being at a rate that can keep up with the rate of accepting the samples of the at least one video line in the memory, such that the apparatus can decode video in real time.

72. A method to recover synchronization information from an analog video signal, comprising:
blindly sampling the analog video signal without clamping to form raw sampled data;
storing the raw sampled data in a memory;
keeping track of when it is likely that a complete video line has been stored in the memory; and
activating or reactivating a line analysis computer program operating on a processor to analyze the raw sampled data once there is at least one new line of raw sampled data stored in the memory;
wherein the line analysis program determines information about the video properties of the stored raw sampled data, the information including the black level and the sync tip level, the line analysis further using the determined sync tip level and black level to determine the location of any horizontal synchronization pulse and the length of the video line in the memory,
the line analysis program operating at a rate that can keep up with the rate of storing the raw sampled data of video signal in the memory, such that the method can decode video in real time. FIG. 50

* * * * *